US010123068B1

(12) United States Patent
Morris et al.

(10) Patent No.: US 10,123,068 B1
(45) Date of Patent: *Nov. 6, 2018

(54) SYSTEM, METHOD, AND PROGRAM PRODUCT FOR GENERATING GRAPHICAL VIDEO CLIP REPRESENTATIONS ASSOCIATED WITH VIDEO CLIPS CORRELATED TO ELECTRONIC AUDIO FILES

(71) Applicant: Tunespotter, Inc., New York, NY (US)

(72) Inventors: Marc Anthony Morris, New York, NY (US); Grant Lyons, Wilton, CT (US)

(73) Assignee: TUNESPOTTER, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,040

(22) Filed: Dec. 12, 2017

Related U.S. Application Data

(63) Continuation of application No. 14/710,452, filed on May 12, 2015, now Pat. No. 9,848,228.

(60) Provisional application No. 61/991,962, filed on May 12, 2014.

(51) Int. Cl.
*H04L 29/06* (2006.01)
*H04N 21/43* (2011.01)
*H04N 5/92* (2006.01)
*H04N 21/2368* (2011.01)
*H04N 19/42* (2014.01)
*H04N 19/44* (2014.01)
*H04N 21/434* (2011.01)
*H04N 5/926* (2006.01)

(52) U.S. Cl.
CPC ....... *H04N 21/4307* (2013.01); *H04N 5/9206* (2013.01); *H04N 5/9265* (2013.01); *H04N 19/42* (2014.11); *H04N 19/44* (2014.11); *H04N 21/2368* (2013.01); *H04N 21/4341* (2013.01); *H04N 21/4348* (2013.01)

(58) Field of Classification Search
CPC ..................... H04L 2463/101; H04N 21/4307
USPC ........................................................ 709/217
See application file for complete search history.

(56) References Cited

U.S. PATENT DOCUMENTS

2014/0255001 A1  9/2014  Malagon et al.
2016/0149956 A1  5/2016  Birnbaum et al.

*Primary Examiner* — Adnan M Mirza
(74) *Attorney, Agent, or Firm* — Amster, Rothstein & Ebenstein LLP

(57) ABSTRACT

Systems, methods, and program products for matching electronic audio files (such as songs) to associated electronic video work excerpts or electronic video clips from movies, televisions shows or advertisements in accordance with one or more sync licenses and generating and providing graphical representations of such video clips are disclosed.

15 Claims, 60 Drawing Sheets

FIG. 32C

SYSTEM, METHOD, AND PROGRAM PRODUCT FOR GENERATING GRAPHICAL VIDEO CLIP REPRESENTATIONS ASSOCIATED WITH VIDEO CLIPS CORRELATED TO ELECTRONIC AUDIO FILES

CROSS-REFERENCE TO RELATED APPLICATIONS

This application is a continuation of and claims the benefit of and priority to U.S. patent application Ser. No. 14/710,452 filed May 12, 2015, which claims the benefit of and priority to U.S. Patent Application Ser. No. 61/991,962, filed May 12, 2014. The entire contents of these applications are incorporated herein by reference as if fully set forth herein.

FIELD

The present invention generally relates to systems, methods, and program products for matching electronic audio files (such as songs) to associated electronic video work excerpts or video clips from movies, televisions shows or advertisements in accordance with one or more sync licenses.

SUMMARY

Systems, methods, and program products for matching electronic audio files (such as songs) to associated electronic video work excerpts or electronic video clips from movies, televisions shows or advertisements in accordance with one or more sync licenses are disclosed.

In embodiments, one or more electronic audio work stored on a user's device or in association with a user on a social media website may be identified. In embodiments, the one or more electronic audio works may be one or more songs in a music library on a user device or stored in a cloud system or associated with a user's account, to name a few. In embodiments, the one or more electronic audio works may be one or more songs in a user's playlist on a user device or stored in a cloud system or associated with a user's account, to name a few. The identified electronic audio work may then be matched, using one or more computers, to one or more electronic media works excerpts. Each excerpt may be a portion of a television show, a movie, or an advertisement which contains such music in accordance with a sync license. The identified excerpts may then be displayed as thumbnails or video on a user's device. When selected the video excerpt may be played in full. A user may also be provided an option to watch and/or purchase the full television show, movie or advertised product associated with the video excerpt.

In embodiments, a user may search for an electronic audio work on a social media website. The identified electronic audio work may then be matched, using one or more computers, to one or more electronic media works excerpts. Each excerpts may be a portion of a television show, a movie or an advertisement which contains such music in accordance with a sync license. The identified excerpts may then be displayed as thumbnails or video on a user's device. When selected the video except may be played in full. A user may also be provided an option to watch and/or purchase the full television show, movie or advertised product associated with the video excerpt.

In embodiments, the user may interact via one or more websites, one or more application programming interfaces ("API") operating on a mobile device or other computing device, dedicated hardware device, to name a few.

In embodiments, a user's collection of copies of electronic audio works may be converted to one or more video clips containing all, a portion of, or a version of the electronic audio works.

In embodiments, a user's collection of electronic audio works (such as songs) may be converted to one or more video clips from sync-licensed movies, television shows, commercials, and video games.

In embodiments, video clips containing sync-licensed electronic audio works may be automatically generated from a larger electronic video work.

In embodiments, video clip representations may be provided to a user. Video clip representations of a video clip can include images extracted from various locations within the video clip, reduced size images (e.g., thumbnail images) related to a video clip, cover images corresponding to a video clip or larger electronic video work, reduced size video clips (e.g., compressed or otherwise reduced size on computer-readable media, video clips with the length cropped), and/or automatically playable video clips (e.g., video clips that are programmed to begin playing with or without audio when displayed or when activated, e.g., by interaction with a cursor or software pointer), to name a few.

In embodiments, advertisement services may be provided based upon users' musical preferences and one or more electronic audio work contained in an advertisement.

In embodiments, an electronic video work may be processed to generate one or more electronic video excerpts or electronic video clips associated with the electronic video work. An electronic video track of the electronic video work may be accessed and analyzed using one or more computers to identify electronic video features reflecting a change in scene, such as vertical blanking intervals, changes in background, to name a few. An electronic audio track of the electronic video work may be accessed and analyzed using one or more computers to identify electronic audio features reflecting the presence and/or absence of music. The identified electronic video features and electronic audio features are correlated with locations within the electronic video work, e.g., time tracks. One or more relevant electronic media works excerpts or electronic media work clips are identified and electronically bookmarked, using the one or more computers, indicating proposed start and stop locations within the electronic video works. In embodiments, a user may, using the one or more computers, manually adjust the bookmarks to refine the start and stop locations of one or more electronic video work excerpts or electronic video clips. The bookmarks are saved using the one or more computers. The electronic media works are segmented using the one or more computers in accordance with the books to generate one or more electronic media work excerpts or electronic media work clips. The one or more electronic media works excerpts or electronic media work clips are stored for later retrieval and play back. In embodiments, the electronic audio features and/or electronic video features associated with the one or more electronic media works excerpts or electronic media work clips may be analyzed using the one or more computers to generated electronic identification information and/or electronic tags identifying the respective electronic media work excerpt or electronic media work clip. In embodiments the analysis may be performed manually or checked and/or corrected manually after electronic generation. The electronic identification information and/or electronic tags are stored electronically in association with the electronic media work excerpt or electronic media work clips.

In embodiments, a method can comprise receiving, at a video clip platform computer system comprising one or more computers from a user electronic device, an electronic request for correlation of one or more audio works in an audio music library associated with a user of the user electronic device; obtaining, by the video clip platform computer system, respective audio work metadata associated with each of the one or more audio works; accessing, by the video clip platform computer system, one or more correlation databases stored on non-transitory computer-readable memory and comprising correlation data identifying correlations between audio works identified by audio work metadata and video clips containing corresponding audio works; determining, by the video clip platform computer system using the respective audio work metadata and the correlation data, one or more video clips corresponding to at least some of the one or more audio works; obtaining, by the video clip platform computer system, graphical video clip representation data for rendering one or more graphical video clip representations each associated with one of the one or more video clips, wherein each rendered graphical video clip representation comprises a video clip preview graphical element and a video clip identification information graphical element; transmitting, from the video clip platform computer system to the user electronic device, the graphical video clip representation data; receiving, at the video clip platform computer system from the user electronic device, an electronic selection of a rendered graphical video clip representation, the electronic selection comprising an electronic request to play the respective video clip associated with the selected rendered graphical video clip representation; retrieving, by the video clip platform computer system from a video clip database stored on non-transitory computer-readable memory, the respective video clip associated with the selected rendered graphical video clip representation; and transmitting, from the video clip platform computer system to the user electronic device, at least a portion of the respective video clip.

In embodiments, the respective audio work metadata can comprise an audio work identifier. In embodiments, at least one of the one or more audio works can correspond to a plurality of video clips.

In embodiments, the method may further comprise verifying, by the video clip platform computer system, that each of the one or more audio works is authorized for correlation to one or more corresponding video clips.

In embodiments, the method may further comprise the step of determining, by the video clip platform computer system, that each of the one or more video clips comprises a respective audio work pursuant to a valid sync license.

In embodiments, obtaining, by the video clip platform computer system, graphical video clip representation data can comprises accessing, by the video clip platform computer system, at least video clip preview data and video clip identification information; and configuring, by the video clip platform computer system, the graphical video clip representation data based at least in part upon the video clip preview data, the video clip identification information, and a graphical video clip representation electronic layout model that specifies location parameters and styling parameters for the video clip preview graphical element and the video clip identification information graphical element within an electronic display window.

In embodiments, the video clip preview graphical element can comprise one or more frames of the respective video clip. In embodiments, the video clip preview graphical element can comprise a rendered element configured for playback of at least a portion of the respective video clip.

In embodiments, the video clip identification information graphical element can comprise text rendered on a portion of the graphical video clip representation. In embodiments, the video clip identification information graphical element can comprise title information for the corresponding audio work, artist information for the corresponding audio work, and/or video work information identifying a video work that contains the respective video clip.

In embodiments, each rendered graphical video clip representation can further comprise at least one graphical video control element to play the video clip associated with the rendered graphical video clip representation. Each rendered graphical video clip representation may comprise at least one graphical sharing element to transmit to one or more other user electronic addresses information associated with the video clip associated with the rendered graphical video clip representation. Each rendered graphical video clip representation can comprise at least one information access element to access additional information associated with the video clip associated with the rendered graphical video clip representation.

In embodiments, transmitting, from the video clip platform computer system to the user electronic device at least a portion of the respective video clip can comprise streaming the respective video clip to the user electronic device.

In embodiments, the method can further comprise receiving, at the video clip platform computer system from the user electronic device, an electronic request to purchase a video work that contains a video clip associated with a rendered graphical video clip representation; generating, by the video clip platform computer system, machine-readable instructions for facilitating purchase of the video work, wherein the machine-readable instructions comprise an electronic address at which the video work may be purchased; and providing, by the video clip platform computer system to the user electronic device, the machine-readable instructions.

In embodiments, the method can further comprise receiving, at the video clip platform computer system from the user electronic device, an electronic request to access from an online video work provider a video work that contains a video clip associated with a rendered graphical video clip representation; generating, by the video clip platform computer system, machine-readable instructions for accessing the online video work provider, wherein the machine-readable instructions comprise an electronic address at which the video work may be accessed; and providing, by the video clip platform computer system to the user electronic device, the machine-readable instructions. In embodiments, the machine-readable instructions can comprise user account credentials for the online video work provider.

In embodiments, the method can further comprise receiving, at the video clip platform computer system from the user electronic device, an electronic request to purchase a product or service associated with a video clip associated with a rendered graphical video clip representation; generating, by the video clip platform computer system, machine-readable instructions for accessing an online marketplace for purchasing the product or service, wherein the machine-readable instructions comprise an electronic address; and providing, by the video clip platform computer system to the user electronic device, the machine-readable instructions. In embodiments, the video clip may be a commercial.

In embodiments, a method may comprise receiving, at a video clip platform computer system comprising one or more computers from a user electronic device, an electronic request for correlation of one or more audio works in an audio music library associated with a user of the user electronic device; obtaining, by the video clip platform computer system, respective audio work metadata associated with each of the one or more audio works; accessing, by the video clip platform computer system, one or more correlation databases stored on non-transitory computer-readable memory and comprising correlation data identifying correlations between audio works identified by audio work metadata and video clips containing corresponding audio works; determining, by the video clip platform computer system using the respective audio work metadata and the correlation data, one or more video clips corresponding to at least some of the one or more audio works; generating, by the video clip platform computer system, machine-readable graphical video clip representation generation instructions to cause the user electronic device to render one or more graphical video clip representations each associated with one of the one or more video clips, wherein each rendered graphical video clip representation comprises a video clip preview graphical element and video clip identification information graphical element; transmitting, from the video clip platform computer system to the user electronic device, the machine-readable graphical video clip representation generation instructions; receiving, at the video clip platform computer system from the user electronic device, an electronic selection of a rendered graphical video clip representation, the electronic selection comprising an electronic request to play the respective video clip associated with the selected rendered graphical video clip representation; retrieving, by the video clip platform computer system from a video clip database stored on non-transitory computer-readable memory, the respective video clip associated with the selected rendered graphical video clip representation; and transmitting, from the video clip platform computer system to the user electronic device, at least a portion of the respective video clip.

In embodiments, the machine-readable graphical video clip representation generation instructions comprise first instructions for retrieving at least video clip preview data and video clip identification information and second instructions for generating the one or more rendered graphical video clip representations based at least in part upon the video clip preview data, the video clip identification information, and a graphical video clip representation electronic layout model that specifies location parameters and styling parameters for the video clip preview graphical element and the video clip identification information graphical element within an electronic display window.

In embodiments, the video clip platform computer system may receive from a user electronic device associated with a first user an electronic request for correlation of one or more audio works in an audio music playlist associated with a second user. The video clip platform computer system may correlated the audio music playlist to one or more video clips and generate instructions for rendering a graphical video clip representation associated with each video clip.

A method can comprise receiving, at a video clip platform computer system comprising one or more computers from a user electronic device, an electronic search request comprising a portion of an audio work; transmitting, from the video clip platform computer system to an audio identification platform computer system, the portion of the audio work; receiving, at the video clip platform computer system from the audio identification platform computer system, one or more audio work identifications and corresponding respective audio work metadata; accessing, by the video clip platform computer system, one or more correlation databases stored on non-transitory computer-readable memory and comprising correlation data identifying correlations between audio works identified by audio work metadata and video clips containing corresponding audio works; determining, by the video clip platform computer system using the respective audio work metadata and the correlation data, one or more video clips corresponding to at least some of the one or more audio identifications; generating, by the video clip platform computer system, machine-readable graphical video clip representation generation instructions for causing the user electronic device to render one or more graphical video clip representations each associated with one of the one or more video clips, wherein each rendered graphical video clip representation comprises a video clip preview graphical element and video clip identification information graphical element; transmitting, from the video clip platform computer system to the user electronic device, the machine-readable graphical video clip representation generation instructions; receiving, at the video clip platform computer system from the user electronic device, an electronic selection of a rendered graphical video clip representation, the electronic selection comprising an electronic request to play the respective video clip associated with the selected rendered graphical video clip representation; retrieving, by the video clip platform computer system from a video clip database stored on non-transitory computer-readable memory, the respective video clip associated with the selected rendered graphical video clip representation; and transmitting, from the video clip platform computer system to the user electronic device, at least a portion of the respective video clip.

In embodiments, a user electronic device may transmit to a video clip platform computer system comprising one or more computers an electronic request for correlation of one or more audio works in an audio music library associated with a user of the user electronic device. The user electronic device may receive from the video clip platform computer system graphical video clip representation data for rendering one or more graphical video clip representations each associated with a video clip, wherein each rendered graphical video clip representation comprises a video clip preview graphical element and a video clip identification information graphical element. The graphical video clip representation data may have been generated by the video clip platform computer system by obtaining respective audio work metadata associated with each of the one or more audio works; accessing one or more correlation databases stored on non-transitory computer-readable memory and comprising correlation data identifying correlations between audio works identified by audio work metadata and video clips containing corresponding audio works; determining using the respective audio work metadata and the correlation data one or more video clips corresponding to at least some of the one or more audio works; accessing for each of the one or more video clips video clip preview data and video clip identification information; accessing a graphical video clip representation electronic layout model that specifies location parameters and styling parameters for the video clip preview graphical element and the video clip identification information graphical element within an electronic display window; and configuring the graphical video clip representation data based upon the video clip preview data, the video clip identification information, and the graphical video clip representation electronic layout model. The user electronic device may render on a display screen operatively connected to the user electronic device an electronic display of the one or more graphical video clip representations using the graphical video clip representation data. The user electronic device may receive a user input comprising an electronic selection of a rendered graphical video clip representation, the electronic selection comprising an electronic request to play the respective video clip associated with the selected rendered graphical video clip representation. The user electronic device may transmit to the video clip platform computer system, an electronic request to play the respective video clip. The user electronic device may receive at least a portion of the respective video clip. The user electronic device may display on the display screen the at least a portion of the respective video clip.

In embodiments, a video clip platform computer system may comprise one or more processors; a communication portal comprising communication interface hardware operatively connected to the one or more processors and corresponding communication software configured to transmit and receive data; and non-transitory computer-readable memory operatively connected to the one or more processors. The memory may have stored thereon data stored in one or more databases, such data including audio work data comprising audio work metadata and received audio work identification information identifying one or more audio works to be correlated to corresponding video clips; media work correlation data identifying correlations between audio works identified by audio work metadata and video clips containing corresponding audio works; video clip identification data comprising video clip metadata; video clip data comprising electronic video clip files; a graphical video clip representation electronic layout model that specifies location parameters and styling parameters for the video clip preview graphical element and the video clip identification information graphical element within an electronic display window; and video clip presentation data comprising graphical video clip representation data for rendering one or more graphical video clip representations each associated with a video clip, wherein each rendered graphical video clip representation comprises a video clip preview graphical element and a video clip identification information graphical element. The memory may also have stored thereon one or more modules configured to run on the one or more processors, including a media work data import module configured to obtain the audio work identification information; a media work correlation module configured to determine using the audio work metadata and the media work correlation data, one or more video clips corresponding to received audio work identification information; and a video clip production module configured to generate the video clip presentation data using the video clip identification data, the video clip data, and the graphical video clip representation electronic layout model. In embodiments, the received audio work identification information can comprise at least one of audio work titles, audio work identifiers, audio work search results, audio work playlist information, audio library information.

BRIEF DESCRIPTION OF THE DRAWINGS

Exemplary embodiments of the present invention will be described with references to the accompanying figures, wherein:

FIG. 5B is a flow chart of an exemplary process for generating video clip representations in accordance with exemplary embodiments of the present invention;

FIGS. 32A-F are exemplary screen shots of user interfaces for accessing video clip representations corresponding to audio works contained in a video work in accordance with exemplary embodiments of the present invention;

DETAILED DESCRIPTION

The present invention generally relates to systems, methods, and program products for matching electronic audio files (such as music) to associated electronic video work excerpts or electronic video clips from movies, movie trailers, televisions shows, fashion runway shows, video games, or advertisements in accordance with one or more sync licenses. Video works and video clips can comprise visual video as well as corresponding audio.

Figure 1A:
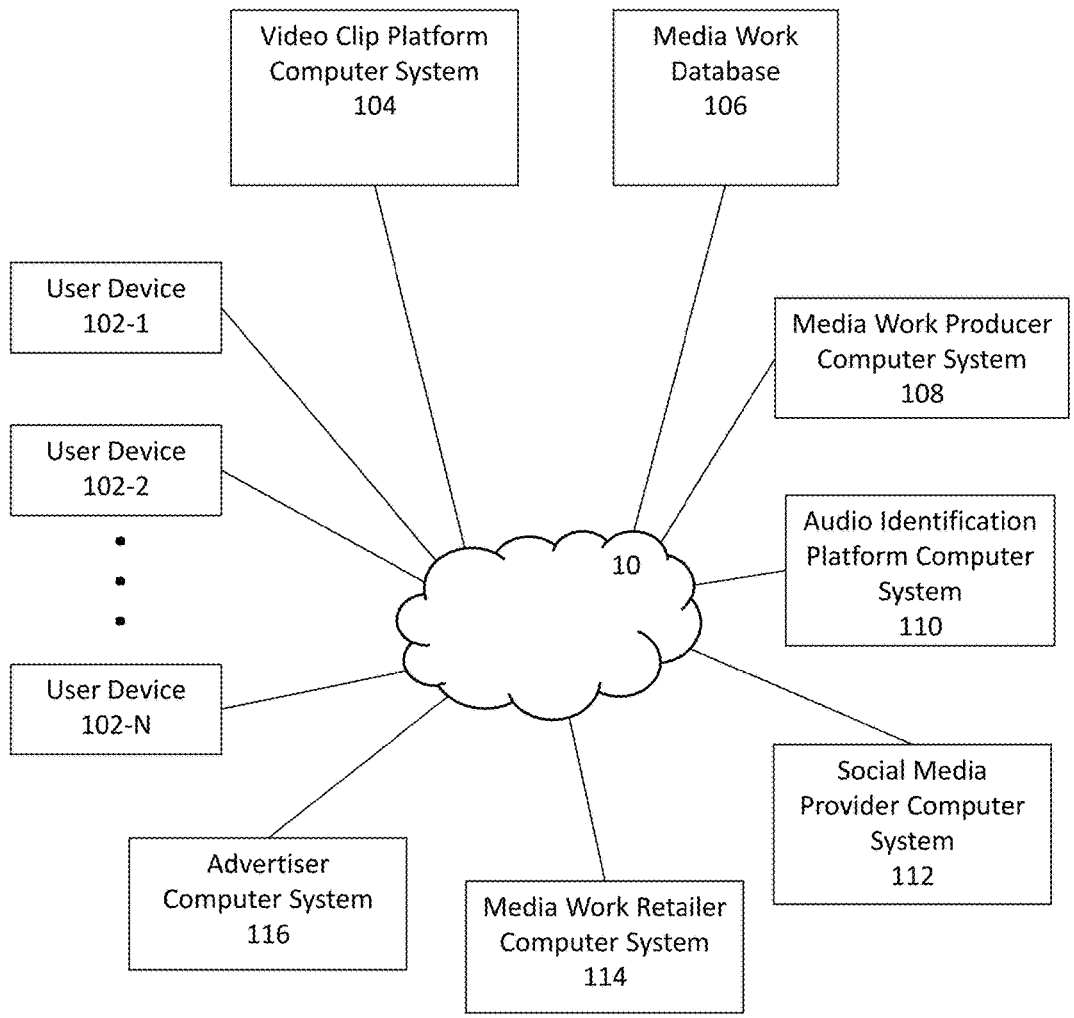
FIG. 1A is a schematic diagram of possible participants in and components of an exemplary system for converting electronic audio works to one or more video clips in accordance with exemplary embodiments of the present invention.

FIG. 1A is a schematic diagram of possible participants in and components of an exemplary system for converting electronic audio works to one or more video clips in accordance with exemplary embodiments of the present invention. Such a system can provide interactivity with the converted video clips, as described herein.

Any of the participants and components in a video clip conversion system can comprise a computer system having one or more computers and/or one or more processors. Computers can include servers and user devices, as described herein. The computers may store data in one or more databases stored on storage devices having computer-readable memory. Storage devices can include hard drives, flash memory, tapes, disks, CDs, DVDs, memory cards, server farms, and any hardware necessary to read and/or write to such memory, such as disk drives, automatic or robotic disk loaders, CD drives, memory card writers, to name a few. The computers may also have one or more software module running on one or more processors. In embodiments, software module may provide user interfaces for interacting (e.g., inputting data and/or receiving data) with a computer system. Accordingly, any of the computers may also include input devices (e.g., keyboards, cameras, touchscreens, microphones) with accompanying software (e.g., speech-to-text software) and/or display devices (e.g., monitors, touchscreens, projectors (e.g., 2-D, 3-D, and/or holographic projectors, to name a few).

Computer systems can also include communication portals, which may handle, process, support, and/or perform wired and/or wireless communications (e.g., transmitting and/or receiving data). Communication portals can comprise hardware (e.g., hardware for wired and/or wireless connections) and/or software. In embodiments, communications portals can include one or more communications chipsets, such as a GSM chipset, CDMA chipset, LTE chipset, Wi-Fi chipset, Bluetooth chipset, to name a few, and/or combinations thereof. Wired connections may be adapted for use with cable, POTS (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include any cellular or cellular data connections (e.g., digital cellular, PCS, CDPD, GPRS, EDGE, CDMA2000, 1×RTT, Ev-DO, HSPA, UMTS, 3G, 4G, and/or LTE, to name a few), Bluetooth, Wi-Fi, radio, satellite, infrared connections, and/or other electromagnetic waves for transporting signals or data packets, to name a few. Interface hardware and/or software, which may be used to communicate over wired and/or wireless connections, may comprise any of Ethernet interfaces (e.g., supporting a TCP/IP stack), X.25 interfaces, T1 interfaces, and/or antennas, to name a few. Such interface software and/or hardware can enable one or more computer systems to connect directly and/or indirectly, such as through a data network 10, as shown in FIG. 1A. A data network 10 can be the Internet, a local area network, or an intranet, to name a few.

Still referring to FIG. 1A, a system for conversion of audio works to video clips or video work excerpts can include one or more user device 102 (e.g., 102-1, 102-2, . . . , 102-N), a video clip platform computer system 104, a media work database 106, a media work producer computer system 108, an audio identification platform computer system 112, a social media provider computer system 112, a media work retailer computer system 114, and an advertiser computer system 116.

A user device 102 can be a user electronic device, such as a computer, laptop computer, tablet computer, mobile phone, smart phone, PDA, portable media player, television, stereo, ancillary device (e.g., wearable smart devices or networked appliances), and/or speaker system, to name a few.

A video clip platform computer system 104 can perform any of the processes described herein, including processes to generate video clip representations, provide video clips representations corresponding to audio works, play video works for a user, organize video works (e.g., into playlists or collections), and/or share video clip representations with other users, to name a few.

A media work database 106 can store and/or provide access to metadata describing one or more media work, including video works and/or audio works. A media work producer computer system 108 may be operated by a creator or producer of media works, such as a movie studio, television studio, commercial studio, or record label, to name a few. An audio identification platform computer system 112 may be a system that can identify an audio work and/or provide audio work metadata based upon an audio work search sample, such as an abbreviated portion of an audio work. Such a system may use a non-exhaustive near neighbor search to compare an audio work search sample to a reference audio work sample, which may be an audio work fingerprint. A social media provider computer system 112 may provider social media services, such as connections and communication among users, including sharing comments and/or media works. A media work retailer computer system 114 may sell or offer for sale copies of media works (e.g., physical copies such as those that can be delivered via disc, electronic downloadable copies, or streaming of media works, to name a few). In embodiments, a media work retailer computer system 114 may offer subscriptions to access media works, e.g., on a streaming basis. An advertiser computer system 116 can include one or more companies attempting to use advertisements to promote products or services. An advertiser computer system 116 can also include advertising agencies and advertising networks, which can provide electronic advertisements over a data network, such as the Internet.

Figure 2:
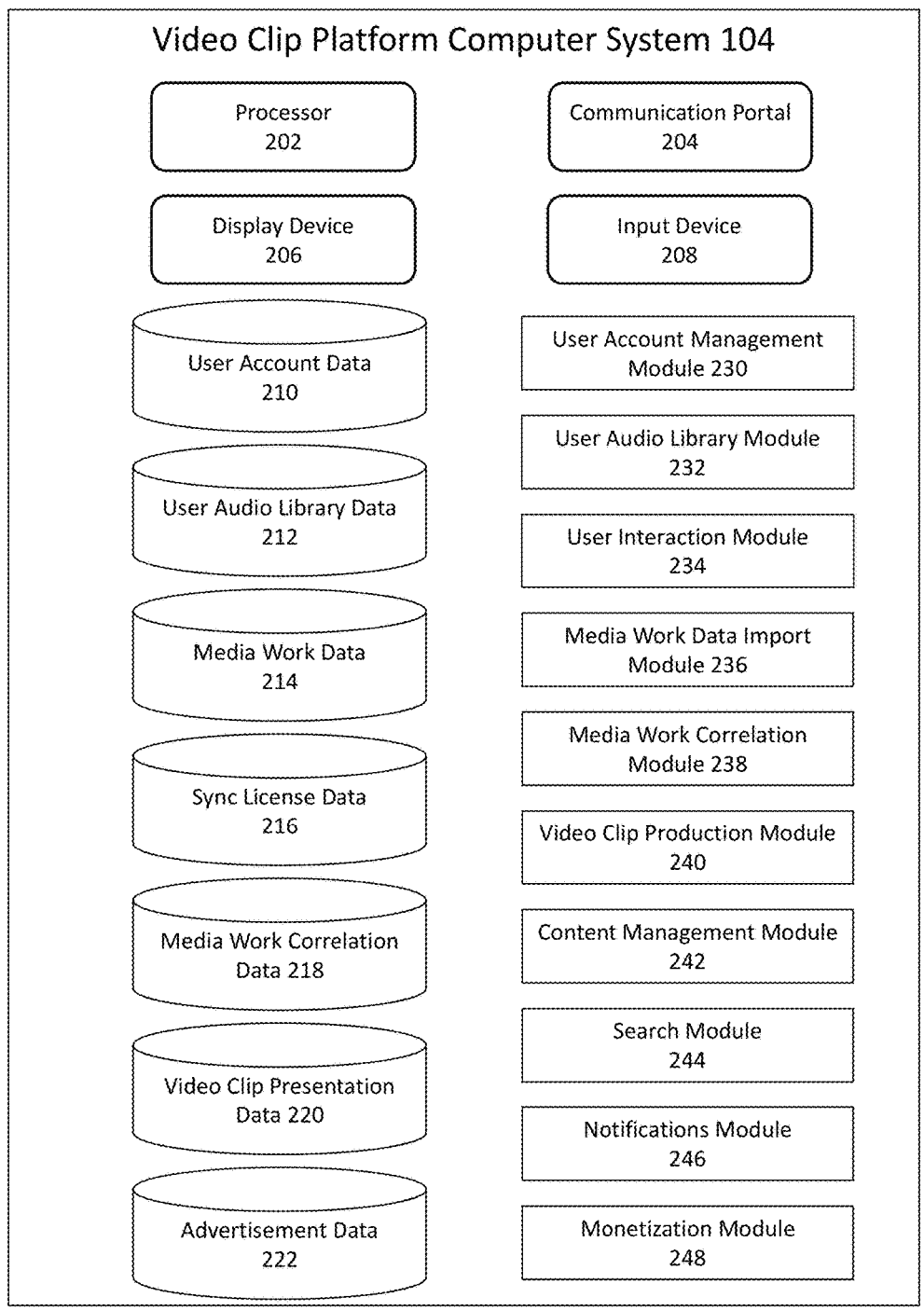
FIG. 2 is a block diagram of the data and modules of an exemplary video clip platform computer system in accordance with exemplary embodiments of the present invention.

FIG. 2 is a block diagram of the data and modules of an exemplary video clip platform computer system in accordance with exemplary embodiments of the present invention. Such a computer system may comprise one or more computers and/or one or more processors 202. The video clip platform computer system can include a communication portal 204, one or more display devices 206 (e.g., monitors, projectors), and/or one or more input devices 208 (e.g., a keyboard, mouse, touch screen, microphone, and/or camera, to name a few).

A video clip platform computer system 104 may comprise non-transitory computer-readable memory operatively connected to the one or more processors 202 and having stored thereon data, which may be stored in one or more databases. Such data can include user account data 210, user audio library data 212, media work data 214, sync license data 216, media work correlation data 218, video clip presentation data 220, and/or advertisement data 222, as described herein. One or more particularly programmed software modules may also be stored on the computer-readable memory and configured to run on the one or more processors 202. Software modules can include computer-readable code comprising machine readable instructions, variable values, and/or logical processing rules. These modules can include a user account management module 230, user audio library module 232, user interaction module 234, media work data import module 236, media work correlation module 238, video clip production module 240, content management module 242, search module 244, notifications module 246, and/or monetization module 248. In embodiments, one or more of these modules may perform processes described with respect to other modules. In embodiments, one or more other modules may perform any of the processes described herein.

Turning to the data stored by and/or accessed by the video clip platform computer system 104, user account data 210 can comprise user login credentials, such as a username and/or password. User account data 210 can also comprise a user name (e.g., first and/or last name), address, electronic address (e.g., email address), telephone number (e.g., mobile device number), device type identifiers (e.g., for one or more authorized user electronic devices), billing information (e.g., credit card number and/or security code, bank account information, to name a few), and/or demographic information (e.g., age, residence location, ethnicity, and/or gender). In embodiments, user account data 210 may include user location data, which may be used to ensure that a geographic license restrictions are enforced (e.g., no playback outside the United States), to ensure that location-based settings and information is accurate, and/or to ensure that advertisement information (such as a store location) is relevant. User account data 210 may also include user preferences, user settings and/or user profile information (e.g., information identifying favorite musical artists, favorite songs, favorite genres, favorite videos, to name a few).

User audio library data 212 may comprise audio work identification data for one or more audio works in a user's audio library. In embodiments, an audio library may be a collection of audio works stored on a particular user electronic device, such as a smart phone or a personal computer.

In embodiments, the audio works may be stored using a cloud storage service (e.g., a remote server that provides access to stored copies of audio works). An audio library may comprise a computer directory containing audio works. In embodiments, an audio library may comprise one or more playlists, which may be local playlists or remotely stored playlists. Such playlists may be playlists on a music streaming service. In embodiments, user audio library data 212 may identify audio works associated with one or more other users, such as users associated as friends through social media or celebrity users. User audio library data 212 can comprise audio work identifiers (e.g., unique alphanumeric sequences assigned to each audio work), audio work metadata (e.g., title information, artist information, album information, and/or audio work duration, to name a few), and/or audio samples (e.g., abbreviated portions of the audio works from which audio recognition processes may be performed).

Media work data 214 may comprise one or more databases of media work identification data (e.g., identifiers) and/or metadata (e.g., titles, artist names, album names, genres, to name a few). Accordingly, media work data 214 can include audio work data identifying and/or describing a plurality of audio works. Media work data 214 can include video work data identifying and/or describing complete video works (e.g., movies) and/or can include video clip data identifying and/or describing video clips (e.g., portions of video works, such as an excerpt from a movie). In embodiments, media work data 214 may categorize and/or identify media works to be used in providing a categorized display of media works, e.g., through a website or downloadable application. For example, a featured content section may present particular video clips for display to users. Other categorizations can present video clips organized (e.g., alphabetically) by artist name, song name, and/or genre. Media work data 214 may include indications of popular media works (e.g., a number of views or a number of indications of "likes"). In embodiments, popularity may be measured over a period of time, such as to identify trending video clips that are popular in a given (e.g., current) time period.

Sync license data 216 may comprise data identifying media works for which sync licenses exist. For example, sync license data 216 may indicate that an audio work is licensed for inclusion in one or more video works. Sync license data 216 may be used to determine whether video clips exist corresponding to a particular audio work or whether the use of an audio work in a particular video clip is an authorized use. In embodiments, sync license data 216 may be provided by one or more record label companies.

Media work correlation data 218 can comprise correlation data identifying correlations between audio works and video clips containing corresponding audio works. In embodiments, corresponding audio works contained in a video clip may be alternate versions of an audio work to which the video clip is correlated, such as versions performed by different artists, recorded in different settings (e.g., a live recording, a studio recording), to name a few. In embodiments, the correlation data may comprise media work identifiers (e.g., audio work identifiers, video work identifiers, video clip identifiers), which may be used to indicate which works are correlated. The correlation data may also include media work metadata, such as title information and/or artist information. In embodiments, metadata and/or audio work identifiers may be compared against correlation data to determine correlated video clips for one or more audio works. Media work correlation data 218 may indicate portions of a video work that are correlated to audio works. These portions may be indicated by location information describing locations within the video work, which location information may comprise playback times. The video clip platform computer system 104 may be used to generate the media work correlation data 218. In embodiments, correlation data may be accessed from remote data sources, e.g., a third-party server.

Video clip presentation data 220 may comprise graphical video clip representation data for rendering one or more graphical video clip representations each associated with a video clip. A rendered graphical video clip representation can comprise a video clip preview graphical element and video clip identification information graphical elements. Accordingly, video clip presentation data 220 can include video clip preview data and video clip identification information. Video clip preview data can include data for rendering an image preview, such as an album cover, movie cover, or one or more frames from a video clip, and/or data for rendering a video preview of a video clip. In embodiments, a video clip preview graphical element may have a reduced size (e.g., reduced height and width dimensions compared to the dimensions corresponding to the full available video clip resolution, and/or reduced resolution). Video clip identification information can include metadata (e.g., title information, artist information) for the video clip, the corresponding audio work, and/or a video work (e.g., a movie) that contains the video clip. In embodiments, a video clip identification graphical element can comprise text rendered on a portion of the graphical video clip representation.

Rendered graphical video clip representations can also comprise graphical video control elements to control playback of the video clip associated with the representation. Video control elements can include rendered buttons to play, pause, stop, fast forward, rewind, skip playback location, add or remove captions, adjust playback window size, and/or adjust playback resolution. A rendered graphical video clip representation can also comprise graphical sharing elements to transmit to one or more electronic addresses associated with other users or user accounts information associated with a video clip associated with the respective representation. Sharing elements can include buttons for emailing information and/or transmitting information through a social media platform. An information access element may comprise a rendered button to access additional information associated with the video clip. In embodiments, such information may be located on a reverse side of a rendered graphical video clip representation, and an animation (e.g., a flip animation) may be rendered to display the additional information on the reversed side. In embodiments, user comments and/or ratings may be rendered as part of a graphical video clip representation.

A graphical video clip representation electronic layout model may specify location parameters and styling parameters for the constituent graphical elements, such as the video clip preview graphical element and the video clip identification information graphical element, within an electronic display window. An electronic layout model may comprise a template. In embodiments, an electronic layout model may comprise particular computer code, such as cascading styles sheet (CSS) code. The code may set sizes (e.g., widths and/or heights) of elements, fonts for text, sizes for text, colors, and/or positions of elements (e.g., relative to each other and/or relative to other points such as relative to an electronic window or physical display screen), to name a few. In embodiments, a graphical video clip representation may be rendered as a video clip card, which may have a rectangular shape. Decks of such cards may be displayed, which may allow a user to select different cards from within the deck. For example, a single audio work may be correlated to a plurality of video clips. The corresponding video clip representations may be rendered as a stacked deck of cards; each card may be offset from the previous card so that it is at least partially viewable and/or selectable. A stream (e.g., scrolling display) of video cards may also be provided, as described herein.

In embodiments, video clip presentation data 220 may include pre-rendered graphical video clip representations. In embodiments, a pre-rendered representation may comprise image data. A user input may correspond to a particular portion of the rendered image, which the computer system may interpret to determine the desired input. In embodiments, a pre-rendered representation may comprise graphical video clip representation data processed by the video clip platform computer system according to the electronic layout model. In other embodiments, a user device may receive the constituent data from which the device may render the graphical video clip representation according to the layout model.

Advertisement data 222 may identify one or more products or services associated with a video clip. Advertisement data 222 may identify one or more locations (e.g., electronic addresses, such as URLs) at which such products or services may be purchased or at which additional information about such products or services may be obtained. Advertisement data 222 may also identify one or more advertisers (e.g., companies providing the advertised products or services). Advertisement data 222 can include metrics regarding conversions and/or re-directs to advertiser electronic addresses (e.g., advertiser websites).

Turning to the software modules, a user account management module 230 may provide access to a website or downloadable application (e.g., mobile app) that interfaces with the video clip platform computer system 104. Accordingly, a user account management module 230 may verify login credentials and/or process user settings and/or preferences. For example, user inputs may be received, settings variables may be changed in response to the inputs, and the updated settings variables may be stored.

A user audio library module 232 may obtain (e.g., access and/or receive) user audio library data 212. The user audio library module 232 may analyze audio library data 212 to obtain and/or extract audio work identifiers and/or audio work identification data (such as song names from the metadata).

A user interaction module 234 can process user inputs received via a website or downloadable application that interfaces with the video clip computer system 104. Such inputs may comprise electronic selections that comprise electronic requests to save (e.g., bookmark) graphical video clip representations, submit comments associated with video clips associated with respective graphical video clip representations, create playlists of video clips, share graphical video clip representations with other users (e.g., via the website or downloadable application, via third-party social media platforms, via SMS or other cellular data message, and/or via email, to name a few). Other user electronic requests may comprise requests to play a video clip or otherwise control playback of a video clip (e.g., pause, skip forward, skip back, fast forward, rewind). The user interaction module 234 may receive the electronic request or the associated user electronic selection and determine an action to perform in response to the request.

A media work data import module 236 may obtain media work data, such as metadata and/or unique identifiers. Such data may correspond to one or more audio work, video clip, and/or video work identified by the video clip platform computer system 104. For example, following correlation of an audio work to one or more video clips, the video clip platform computer system 104 may access metadata associated with each of the one or more video clips, which metadata may have been imported (e.g., from one or more third party computer systems, such as a movie studio computer system) using the media work data import module 236.

A media work correlation module 238 may match audio works to video clips containing corresponding audio works. In embodiments, correlation data may comprise audio work identifiers and video clip identifiers of correlated video clips. In embodiments, the identifiers may be unique alphanumeric sequences. In other embodiments, the identifiers may comprise metadata such as title information. The media work correlation module 238 may compare one or more audio work identifiers against audio work identifiers in the correlation data to determine matching records. For each matching record in the correlation data, the corresponding video clip identifiers associated with that record may be obtained. Accordingly, the correlation data may be pre-processed and/or pre-generated so that correlations between audio works and video clips may be determined quickly by the computer system, e.g., in response to a user request to sync an audio library or in response to a user search for a video clips matching a particular audio work, where audio work identifying information comprises the search query (e.g., a text search string). In embodiments, the media work correlation module 238 may be used to generate correlation data, as described herein with respect to FIGS. 5A-B and FIG. 6.

A video clip production module 240 may generate graphical video clip representations. The video clip production module 240 may provide graphical video clip representations to show results of a search for one or more audio works, to show results of audio library syncing, in response to a video clip being shared and transmitted from a first user to a second user, and/or in order to generate a stream of video clip representations for display on a user device, to name a few. The video clip production module 240 may access video clip presentation data 220, such as video clip preview data and video clip identification information. The video clip production module 240 may transform that data according to rules and parameters set by the electronic layout model in order to generate the graphical video clip representation data for transmission to user devices. In embodiments, the video clip production module 240 may obtain video clip preview data from one or more remote data sources (e.g., video production studios). In other embodiments, the video clip production module 240 may generate the video clip preview data, e.g., by extracting one or more video frames from the video clip and/or by converting the video clip into a different video file format or to a different resolution. The video clip production module 240 may generate video clip identification information by accessing media work data 214 and retrieving certain metadata for each video clip (e.g., title information for the audio work contained in the clip, artist information for the audio work, and title information for the video work from which the video clip is excerpted).

A content management module 242 may control the categorization of video clips accessible through a website and/or downloadable application that interfaces with the video clip platform computer system 104. The content management module 242 may determine which graphical video clip representations to display in a stream of representations for a user (e.g., a scrollable sequence of graphical video clip representations). The stream may be based on a user's stored preferences (e.g., genre of interest) and/or user preference data determined by a user account management module 230 based upon the user's interaction history (e.g., comparison to other saved video clips). In embodiments, the stream may include video clips saved by a user, video clips sent to a user, currently popular video clips, and/or video clips saved by other users whom the user may be following or tracking, to name a few. The content management module 242 may also categorize video clips by genre, artist, album, and/or alphabetically by song title. The content management module 242 may allow administrator users to set featured video clips, which settings may be stored in a database, and corresponding graphical video clip representations can then be accessed by users via a designated portion (e.g., a featured video menu) of the graphical user interface.

A search module 244 may allow a user to search by text string, e.g., for an artist name, song title, movie title, actor, and/or genre, to name a few. The search module 244 may compare the search query against media work identification data (e.g., metadata) to determine media work identifiers that can then be correlated to video clips. In embodiments, the search query may be compared directly to the correlation data without first determining media work identifiers. In embodiments, an audio search may be performed using at least a portion of an audio work. An audio work identification computer system may determine one or more audio works that correspond to the portion of the audio work. Video clips correlated to the audio work search results may then be determined. In embodiments, the audio work identification computer system may be a third-party computer system and/or may be accessed using an application programming interface (API).

A notifications module 246 may generate and/or transmit one or more notifications to a user device, which may be associated with a user account. Notifications may indicate when a video clip is shared with a user, when a video work is download and/or purchased and available for playback, when a second user submits a comment associated with a first user, and/or when another user saves or watches a video clip, to name a few. Notification data may be send to a user electronic device, where a notification comprising the notification data may be rendered and displayed.

A monetization module 248 may download and/or stream advertisements to a user electronic device. In embodiments, a monetization module 248 may track conversions due to advertisements or purchase options selected by a user. Purchase options can include purchases of audio works, video works, subscriptions for audio and/or video streaming services, products related to video clips (e.g., products or services promoted in a commercial or otherwise featured in a video clip). A monetization module 248 may calculate revenue owed by the advertiser to the administrators of the video clip platform computer system 104.

A video clip platform computer system may comprise one or more processors; a communication portal comprising communication interface hardware operatively connected to the one or more processors and corresponding communication software configured to transmit and receive data; and non-transitory computer-readable memory operatively connected to the one or more processors. The memory may have stored thereon data stored in one or more databases, such data including audio work data comprising audio work metadata and received audio work identification information identifying one or more audio works to be correlated to corresponding video clips; media work correlation data identifying correlations between audio works identified by audio work metadata and video clips containing corresponding audio works; video clip identification data comprising video clip metadata; video clip data comprising electronic video clip files; a graphical video clip representation electronic layout model that specifies location parameters and styling parameters for the video clip preview graphical element and the video clip identification information graphical element within an electronic display window; and video clip presentation data comprising graphical video clip representation data for rendering one or more graphical video clip representations each associated with a video clip, wherein each rendered graphical video clip representation comprises a video clip preview graphical element and a video clip identification information graphical element. The memory may also have stored thereon one or more modules configured to run on the one or more processors, including a media work data import module configured to obtain the audio work identification information; a media work correlation module configured to determine using the audio work metadata and the media work correlation data, one or more video clips corresponding to received audio work identification information; and a video clip production module configured to generate the video clip presentation data using the video clip identification data, the video clip data, and the graphical video clip representation electronic layout model. In embodiments, the received audio work identification information can comprise at least one of audio work titles, audio work identifiers, audio work search results, audio work playlist information, audio library information.

Figure 3:
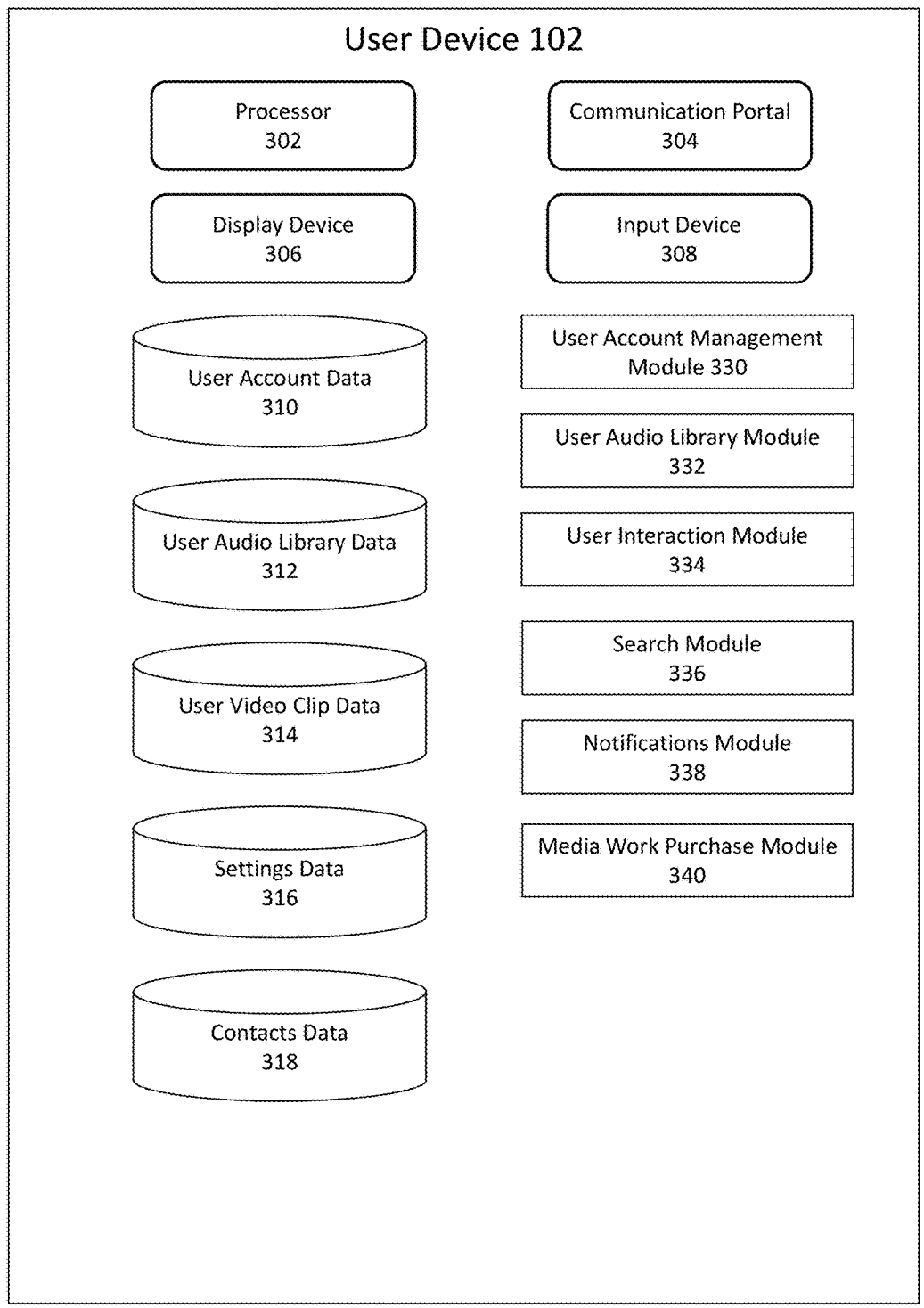
FIG. 3 is a block diagram of the data and modules of an exemplary user device in accordance with exemplary embodiments of the present invention.

FIG. 3 is a block diagram of the data and modules of an exemplary user device in accordance with exemplary embodiments of the present invention. A user electronic device 102 can include one or more processors 302, a communication portal 304, one or more display devices 306 (e.g., monitors, projectors, touchscreens), and/or one or more input devices 308 (e.g., keyboards, mice, touchscreens, microphones, cameras). The user electronic device 102 can include non-transitory computer-readable memory operatively connected to the one or more processors 302. Memory may be local memory contained within the user device or physically connected thereto and/or memory can comprise remote memory accessible via a data network. The memory may have stored thereon, in one or more databases, data such as user account data 310, user audio library data 312, user video clip data 314, settings data 316, and/or contacts data 318. The user electronic device 102 may also include one or more software modules stored on the computer-readable memory and configured to run on the one or more processors 302. Such modules can include a user account management module 330, a user audio library module 332, a user interaction module 334, a search module 336, a notifications module 338, and/or a media work purchase module 340, to name a few. In embodiments, one or more of these modules may perform processes described with respect to other modules. In embodiments, one or more other modules may perform any of the processes described herein.

Turning to the data received, generated, stored, and/or updated by the user device 102, user account data 310 may comprise login credentials, which may be stored in local memory. Additional user account data 310 is described with respect to FIG. 2 as the user account data 210 of the video platform computer system 104. User audio library data 312 is also described with respect to FIG. 2 as user audio library data 212. It can include data identifying one or more audio works (e.g., songs) in a user's audio library, which may be locally stored on the user device, stored remotely (e.g., in cloud storage), and/or available from a remote streaming source (e.g., a streaming music service).

User video clip data 314 may comprise electronic video files for one or more video clips saved by a user. In embodiments, such video files may be stored remotely, e.g., by the video clip platform computer system, which may stream the video data to the user device for playback. The user device may store identifiers for the users's saved video clips. In embodiments, video clip identifiers may also be stored remotely, e.g., on one or more servers of the video clip platform computer system.

Settings data 316 can comprise data identifying user settings and/or preferences. Settings can include privacy settings (e.g., identifying which other users can access or view data about the user) and/or notification settings (e.g., identifying a format for notifications, such as email or push notifications on a mobile device).

Contacts data 318 can include information identifying one or more contacts associated with a user. Contacts data 318 can include names, aliases (e.g., usernames), phone numbers, email addresses, and/or social media handles or usernames, to name a few.

Turning to the modules, a user account management module 330 may manage user data and settings. Such a module may receive user inputs (e.g., settings changes), store such settings, implement such settings, and/or transmit such settings to the video clip platform computer system.

A user audio library module 332 may analyze a user's audio library to determine its contents. Accordingly, the user audio library module 332 may access audio work identification data for audio works in local storage and/or remote storage. In embodiments, the user audio library module 332 may determine the audio work identification data based at least upon the electronic audio works themselves. The module may access one or more user media service accounts (e.g., music streaming service accounts) to retrieve user playlist information.

A user interaction module 334 may process user inputs, such as selections of graphical elements on a display screen and/or data inputs, such as text entry. The user interaction module 334 may interpret such inputs, which can include selection of video clips, selection of graphical elements on a graphical video clip representation (e.g., to play a video clip, share a video clip, or comment on a video clip), and/or creation of playlists comprising video clips, to name a few.

A search module 336 may execute searches based on user queries. Queries can comprise text strings (e.g., artist names, song names, genres, video work names, video work associated information, such as actor names, producer names, production studios, to name a few). Queries may comprise audio clips, which may be excerpted portions of an audio work or alternate versions of an audio work (e.g., a user singing a song). Audio clip queries may be transmitted to a music identification computer system for audio work identification. In response to user queries, the search module 336 may retrieve graphical video clip representations for video clips matching the queries.

A notifications module 338 may receive, generate, display, and/or provide notifications to a user. For example, a notifications module 338 may determine that a triggering event (e.g., a comment posted by a friend) occurred and that a corresponding notification should be generated and displayed. The notifications module 338 may determine the form of a notification based upon settings data 316. In embodiments, the notifications module 338 may utilize a template for generating notifications and/or may display a pre-generated and stored notification.

Figure 4:
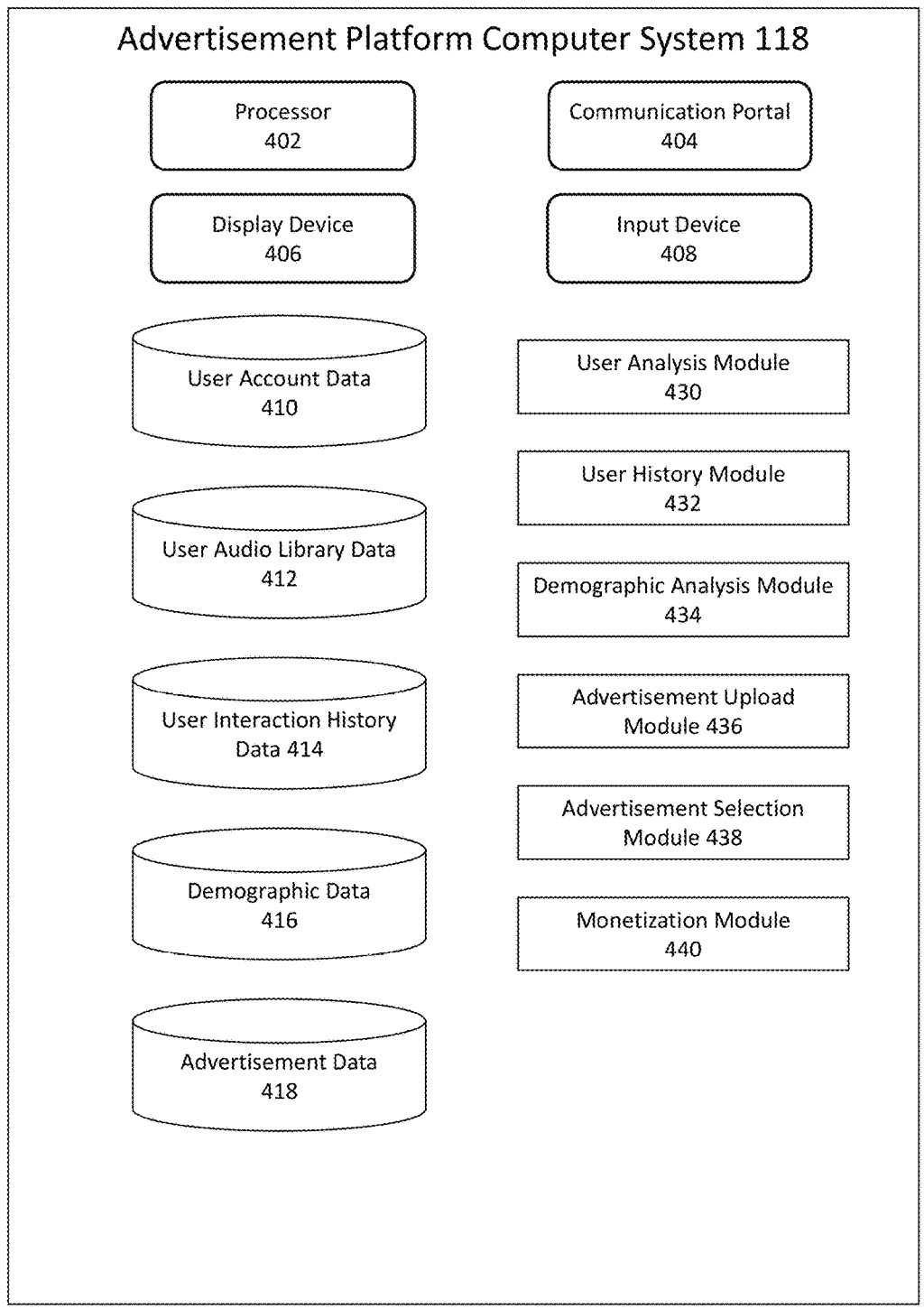
FIG. 4 is a block diagram of the data and modules of an exemplary advertisement platform computer system in accordance with exemplary embodiments of the present invention.

FIG. 4 is a block diagram of the data and modules of an exemplary advertisement platform computer system 118 in accordance with exemplary embodiments of the present invention. An advertisement platform computer system 118 can include one or more processors 402, a communication portal 404, one or more display devices 406 (e.g., monitors, projectors, touchscreens), and/or one or more input devices 408 (e.g., keyboards, mice, touchscreens, microphones, cameras). The advertisement platform computer system 118 can include non-transitory computer-readable memory operatively connected to the one or more processors 402. Memory may be local memory contained within the user device or physically connected thereto and/or memory can comprise remote memory accessible via a data network. The memory may have stored thereon, in one or more databases, data such as user account data 410, user audio library data 412, user interaction history data 414, demographic data 416, and/or advertisement data 418. The advertisement platform computer system 118 may also include one or more software modules stored on the computer-readable memory and configured to run on the one or more processors 402. Such modules can include a user analysis module 430, a user history module 432, a demographic analysis module 434, an advertisement upload module 436, an advertisement selection module 438, and/or a monetization module 440, to name a few. In embodiments, one or more of these modules may perform processes described with respect to other modules. In embodiments, one or more other modules may perform any of the processes described herein.

Turning to the data, user account data 410 and user audio library data 412 are described with respect to FIG. 2 as user account data 210 and user audio library data 212, respectively. User audio library data 212 may include synthesized musical preference info, which may describe a user's musical preferences based upon a user's musical library (from which musical preference patterns may be determined), profile information (e.g., identifying favorite artists or genres), and/or history of interaction with a video clip platform computer system, as described herein (e.g., selecting video clips containing certain audio works, storing such video clips, purchasing music or video works through a partner streaming or download service, indicating like of an audio work or artist, and/or commenting about an audio work, to name a few).

User interaction history data 414 may identify user's actions on a website or downloadable application that interfaces with a video clip platform computer system. In embodiments, such interaction history data 414 may be obtained from logs, such as server logs. Such interaction history can include selecting video clips, playing video clips, search queries, purchases, downloads, and/or streaming of media works, and/or indicating like of a particular media work, to name a few.

Demographic data 416 may indicate demographic information about a user, such as geography, ethnicity, age, gender, to name a few. Demographic data 416 may be accessed from a third-party provider and may comprise a generalized demographic profile (e.g., estimating an annual income) based upon one or more particular demographic data.

Advertisement data 418 can include advertisements that are available to display to a user (e.g., images, videos, and/or audio advertisements) and/or metadata about the available advertisements (e.g., a song or genre of music included in the advertisement).

Turning to the modules, a user analysis module 430 may generate a user musical preference profile, based at least in part upon user audio library data 412 and/or user interaction history data 414.

A user history module 432 may track user interaction, identify interactions of importance (e.g., interactions of a predefined type, interactions exceeding a threshold frequency, such as multiple views of a video clip, to name a few), and/or update user interaction history data 414.

A demographic analysis module 434 may analyze user profile data to extrapolate additional demographic data. The module may access demographic data or demographic models from remote sources and implement such models using data known about a user (e.g., age and gender).

An advertisement upload module 436 may provide an interface to advertisers (including middleman advertisement services) to upload one or more advertisements for display to users, e.g., of the video clip platform computer system.

An advertisement selection module 438 may determine one or more advertisements to provide to a user based upon the user's user audio library data 412 (e.g., musical preference data), user interaction history data 414, and/or demographic data 416. These data may be scored based on weighting factors (e.g., weighting for general importance, such as gender and/or weighting for frequencies of occurrence, such as an artist or genre of song often played, to name a few). The scored data may be correlated to a musical preference model indicating likely musical preferences of a user (e.g., a probability distribution of musical preferences and/or one or more probabilities for different genres, songs, or artists). The advertisement selection module 438 may then compare a user's musical preference model to musical characteristic information associated with available advertisements in order to determine advertisements to provide to the user. In embodiments, a ranking of advertisements may be provided. In embodiments, audio work recommendations for inclusion in advertisements may be provided to advertisers. In embodiments, musical preference models may be analyzed against demographic data 416 to determine a demographic musical preference model that indicates likely musical preferences based on a range of demographic information and/or based on bins of demographic information (e.g., males, 20-30 years old, in the northeast of the United States).

A monetization module 440 may track conversions from advertisements, purchases from media streaming or download services, and/or sales of advertising models and data.

Figure 5A:
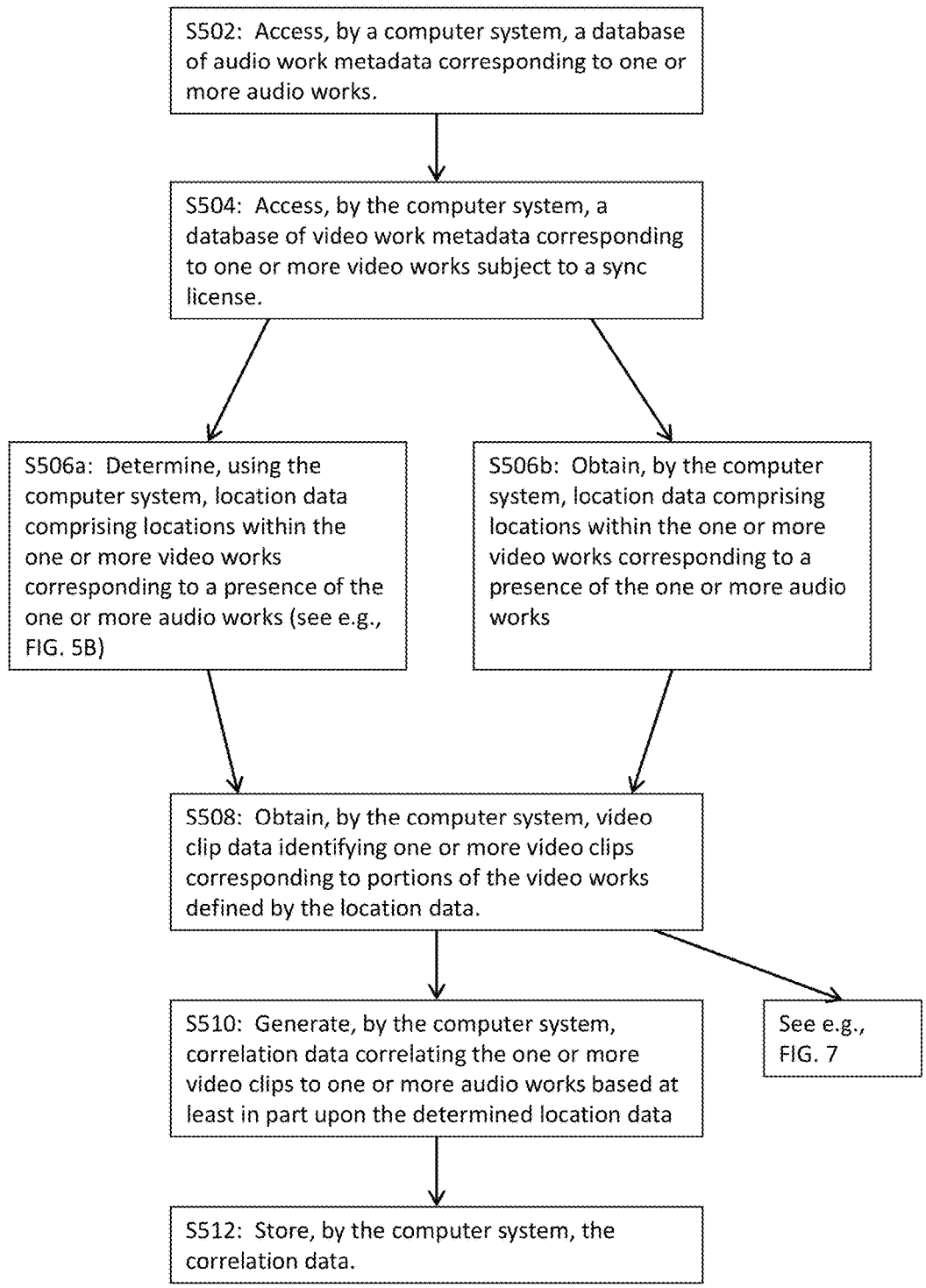
FIG. 5A-B are flow charts of exemplary processes for mapping electronic audio works to video clips and generating video clip representations in accordance with exemplary embodiments of the present invention.
Figure 5B:
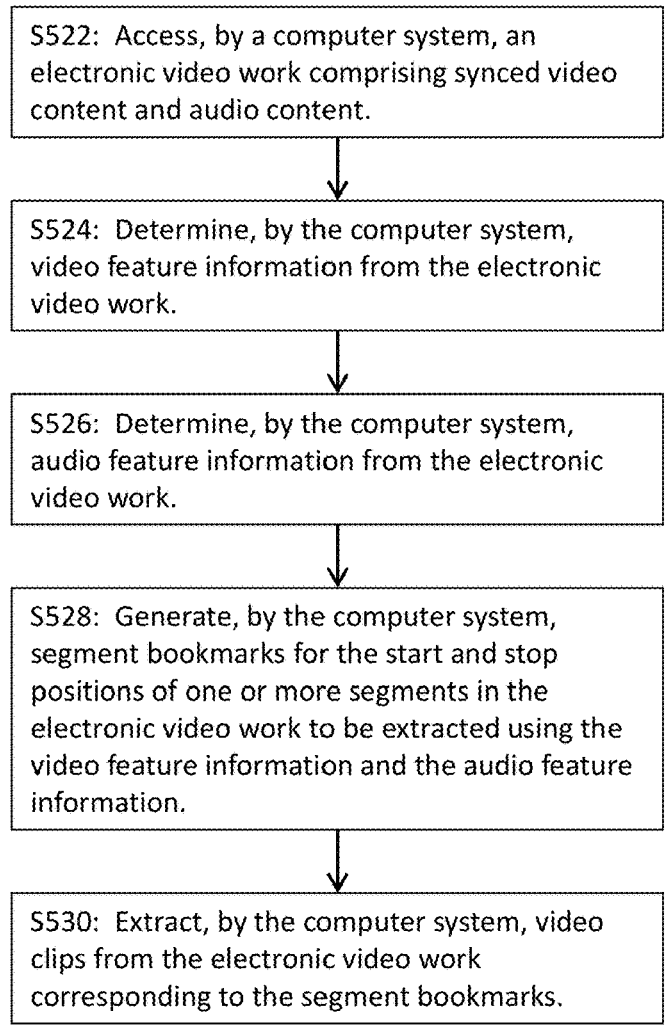

FIGS. 5A-B are flow charts of exemplary processes for mapping electronic audio works to video clips and generating video clip representations in accordance with exemplary embodiments of the present invention. A user's collection of copies of electronic audio works may be converted to one or more video clips containing all, a portion of, or a version of the electronic audio works. In embodiments, a user's collection of electronic audio works (such as songs) may be converted to one or more video clips from sync-licensed movies, television shows, commercials, and video games. Accordingly, one or more electronic audio work stored on a user's device or in association with a user on a social media website may be identified. The one or more electronic audio works may be one or more songs in a music library on a user device or stored in a cloud system or associated with a user's account, to name a few. The one or more electronic audio works may be one or more songs in a user's playlist on a user device or stored in a cloud system or associated with a user's account, to name a few. The identified electronic audio work may then be matched, using one or more computers, to one or more electronic media works excerpts. Each excerpt may be a portion of a television show, a movie, or an advertisement which contains such music in accordance with a sync license.

Referring to FIG. 5A, in a step S502 a computer system may access a database of audio work metadata corresponding to one or more audio works. Audio work metadata can include artist information, production information (e.g., producer, year of release), album information (e.g., title and/or release date), and/or track information (e.g., track name). Audio work metadata may also identify similar versions of an audio work, such as cover songs.

In a step S504, the computer system may access a database of video work metadata corresponding to one or more video works. The video work metadata can include data identifying audio works contained within the video works. The database can comprise data obtained via optical character recognition of packaging for media works.

In embodiments, the computer system may access electronic copies of the one or more video works.

In a step S506a, the computer system may be used to determine location data comprising locations within the one or more video works corresponding to a presence of the one or more audio works. Such locations within the one or more video works can correspond to run times of the video works. The determination of location data and/or extraction of video clips based upon the location data may be automated. FIG. 5B illustrates an exemplary process for determining location data, which may then be used to generate video clips, which may be portions of the video work that are extracted according to the location data.

In an alternate step S506b, the computer system may obtain location data comprising locations within the one or more video works corresponding to a presence of the one or more audio works. Obtaining location data can comprise accessing and/or retrieving the location data from one or more databases. Obtaining location data can comprise receiving the location data at the computer system, e.g., via transmission across a data network.

Figure 7:
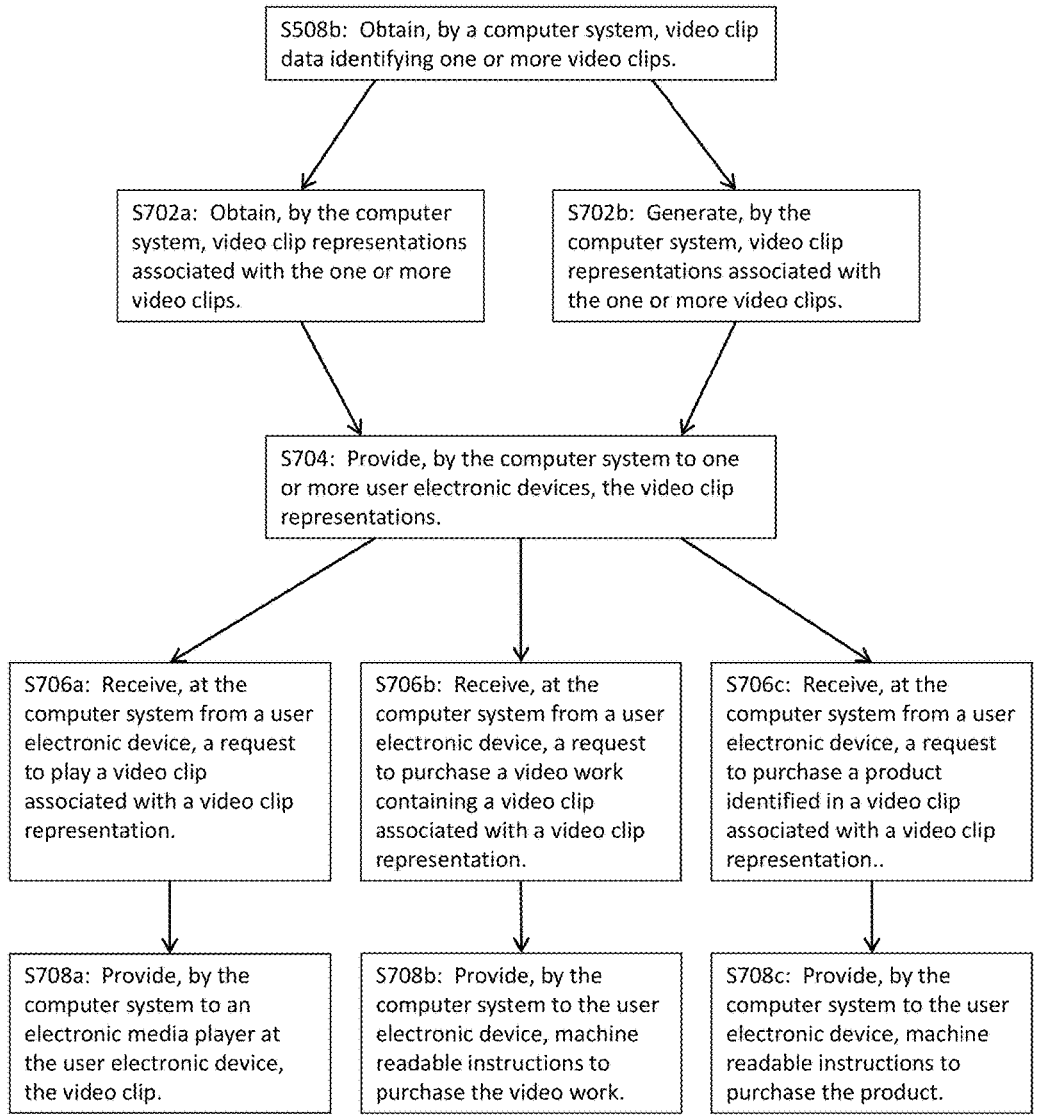
FIG. 7 is a flow chart of an exemplary process for providing video clip representations to a user device in accordance with exemplary embodiments of the present invention.

In a step S508, the computer system can obtain video clip data identifying one or more video clips corresponding to portions of the video works defined by the location data. The video clip data can comprise any of video clip metadata or one or more database identifier, e.g., corresponding a location of the one or more video clips in one or more databases. FIG. 7 describes additional processes that may be performed after video clip data is obtained.

In a step S510, the computer system may generate correlation data correlating the one or more video clips to one or more audio works based at least in part upon the determined location data. The correlation data may map an audio work, such as a song, to one or more video clips containing that audio work (e.g., exact matches) or similar versions of that audio work (e.g., cover versions).

In a step S512, the computer system may store electronically the generated correlation data.

In embodiments, the computer system may further obtain video clip representations associated with the one or more video clips. Obtaining video clip representations can comprise extracting images from one or more video works or video clips and/or accessing one or more images from a database, to name a few. The video clip representations can be thumbnail images or video clips having a reduced display size, to name a few.

In embodiments, the computer system may further obtain the one or more video clips. Obtaining the one or more video clips can comprise extracting a video portion from a larger video work and/or accessing video clips from a video clip database, to name a few.

Referring to FIG. 5B, video clips containing sync-licensed electronic audio works may be automatically generated from a larger electronic video work. The process illustrated by FIG. 5B may be performed as step S506a of FIG. 5A.

In a step S522, the computer system may access an electronic video work comprising synced video content and audio content.

In a step S524, the computer system may determine video feature information from the electronic video work. In embodiments, the video feature information can comprise video location data comprising start and/or end locations of scene changes, color changes, black screens, and/or fades within the electronic video work, to name a few. The step of determining video feature information can comprise the steps of identifying a presence of text in a first portion of the electronic video work, extracting the text from the first portion of the electronic video work, correlating the text to fields in a video work metadata database, and storing the text in the video work metadata database.

In a step S526, the computer system may determine audio feature information from the electronic video work. In embodiments, the audio feature information can comprise music identification information. Audio feature information can comprise audio location data corresponding to start and/or end times of one or more audio works and/or locations of periods of silence and/or variations in decibel level, pitch, and/or rhythm, to name a few.

In a step S528, the computer system may generate segment bookmarks for the start and stop positions of one or more segments in the electronic video work to be extracted using the video feature information and the audio feature information. The segments bookmarks may be adjusted (e.g., via a user interface for adjustment and/or editing of segment bookmarks, as depicted in FIG. 6).

In a step S530, the computer system can extract video clips from the electronic video work corresponding to the segment bookmarks.

Figure 6:
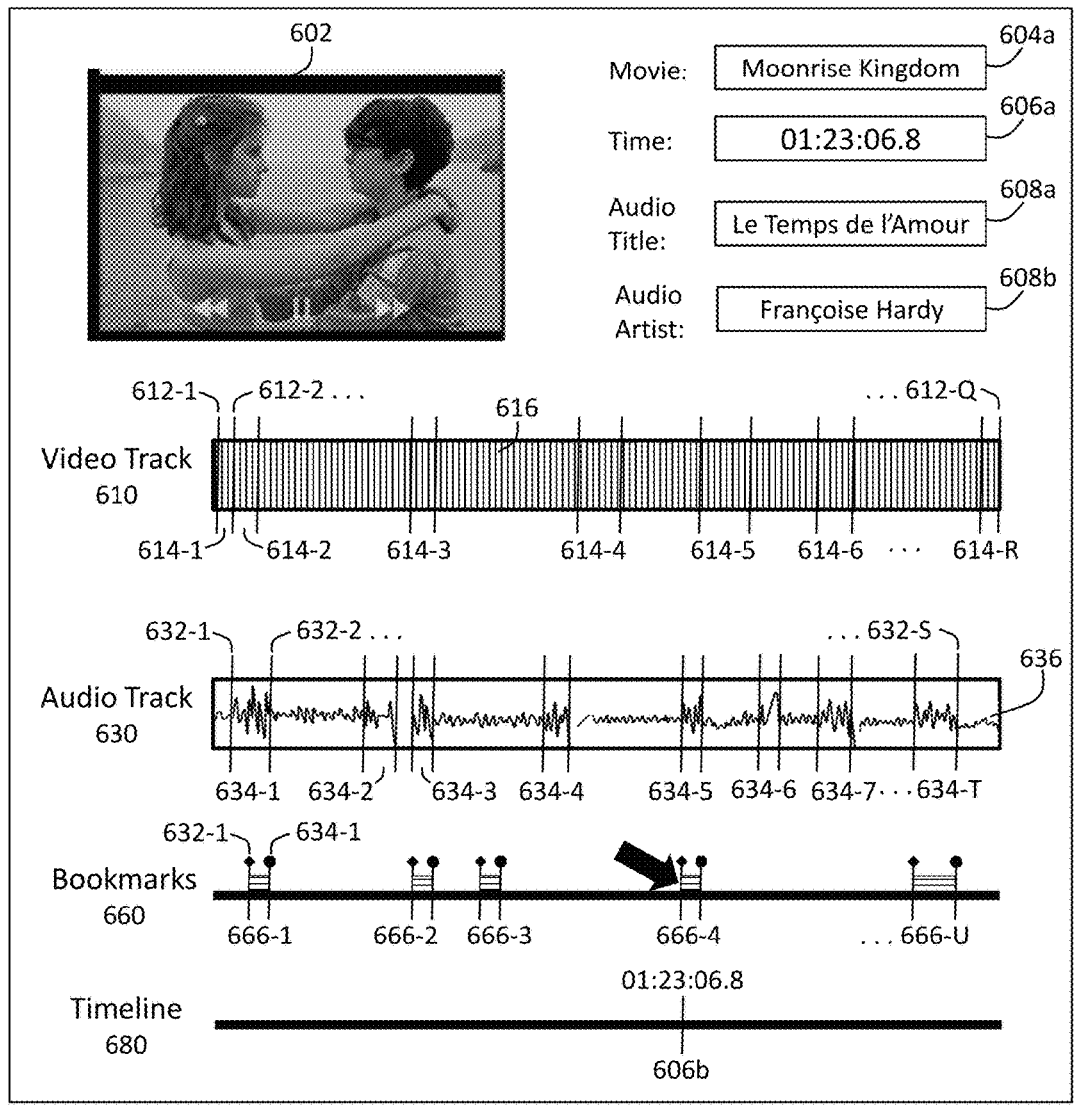
FIG. 6 is an exemplary screen shot of an interface for identifying and indexing video and corresponding audio portions of a video media work that contains electronic audio works in accordance with exemplary embodiments of the present invention.

FIG. 6 is an exemplary screen shot of an interface for identifying and indexing video and corresponding audio portions of a video media work that contains electronic audio works in accordance with exemplary embodiments of the present invention. Video metadata 604 and/or audio metadata 608 for each bookmark may be populated automatically, e.g., using a content identification system, or may be populated via input of the metadata using the user interface. Video metadata 604 can include a video work title 604a, e.g., movie title. Audio work metadata 608 can include an audio work title 608a and/or an audio work artist 608b.

In embodiments, an electronic video work may be processed to generate one or more electronic video excerpts or electronic video clips associated with the electronic video work. An electronic video track 610 of the electronic video work may be accessed and analyzed using one or more computers to identify electronic video features 612 reflecting a change in scene, such as vertical blanking intervals, changes in background, to name a few. Electronic video features 612 may define start and end points of electronic video segments 614.

An electronic audio track 630 of the electronic video work may be accessed and analyzed using one or more computers to identify electronic audio features 632 reflecting the presence and/or absence of music in the electronic audio wave 636. The electronic audio features 632 may define start and end points of electronic audio segments 634.

The identified electronic video features 612 and electronic audio features 632 are correlated with locations within the electronic video work, e.g., time tracks. A graphical user interface may show the timeline 680. A current playback time 606 may correspond to the video frame displayed in video player 602. The playback time may be indicated on the timeline 680, e.g., playback time 606b, and/or may be indicated in a playback time display 606a. The playback time may enable a user to adjust electronic bookmarks corresponding to start and end points of an audio work within the video work.

In embodiments, the electronic audio segments 634 may be compared against the electronic video segments 614 to determine overlapping segments, e.g., overlapping based upon playback time. One or more relevant electronic media works excerpts or electronic media work clips are identified and electronically bookmarked, using the one or more computers, indicating proposed start locations 632 and stop locations 634 within the electronic video works. In embodiments, a user may, using the one or more computers, manually adjust the bookmarks 666 to refine the start and stop locations of one or more electronic video work excerpts or electronic video clips. The bookmarks are saved using the one or more computers. The electronic media works are segmented using the one or more computers in accordance with the books to generate one or more electronic media work excerpts or electronic media work clips. The one or more electronic media works excerpts or electronic media work clips are stored for later retrieval and play back. In embodiments, the electronic audio features 632 and/or electronic video features 612 associated with the one or more electronic media works excerpts or electronic media work clips may be analyzed using the one or more computers to generated electronic identification information and/or electronic tags identifying the respective electronic media work excerpt or electronic media work clip. In embodiments the analysis may be performed manually or checked and/or corrected manually after electronic generation. The electronic identification information and/or electronic tags are stored electronically in association with the electronic media work excerpt or electronic media work clips.

FIG. 7 is a flow chart of an exemplary process for providing video clip representations to a user device in accordance with exemplary embodiments of the present invention. In embodiments, video clip representations may be provided to a user. Video clip representations of a video clip can include images extracted from various locations within the video clip, reduced size images (e.g., thumbnail images) related to a video clip, cover images corresponding to a video clip or larger electronic video work, reduced size video clips (e.g., compressed or otherwise reduced size on computer-readable media, video clips with the length cropped), and/or automatically playable video clips (e.g., video clips that are programmed to begin playing with or without audio when displayed or when activated, e.g., by interaction with a cursor or software pointer), to name a few.

In a step S702a, the computer system may obtain video clip representations associated with the one or more video clips. The step of obtaining video clip representations can comprise extracting images from one or more video works or video clips and/or can comprise accessing one or more images from a database. In embodiments, the video clip representations can be thumbnail images, video clips electronically packaged to have a reduced display size, video clips electronically packaged to play automatically (e.g., as a user scrolls past them), and/or compact feature representations. Each video clip representation can include a plurality of still-images extracted from the corresponding video clip.

In an alternate step S702b, the computer system may generate video clip representations associated with the one or more video clips, as described herein.

In a step S704, the computer system can provide the video clip representations to one or more user electronic devices.

A user device may provide a user with a user interface with a plurality of options associated with a video clip representation. Accordingly, in a first option, in a step S706a the computer system can receive from a user electronic device, a request to play a video clip associated with a video clip representation. In a step S708a, the computer system can provide to an electronic media player at the user electronic device, the video clip. Providing the video clip can comprise retrieving, by the computer system, the video clip from a video clip database and/or transmitting, from the computer system, to the user electronic device, the video clip.

In a second option, in a step S706b, the computer system may receive from a user electronic device, a request to purchase a video work containing a video clip associated with a video clip representation. In embodiments, the computer system can receive a request to purchase an audio work corresponding to a video clip. In a step S708b, the computer system may provide to the user electronic device, machine readable instructions to purchase the video work. The machine readable instructions can comprise any of a link to an online retailer, a link to download the video work, and/or a link to stream the video work, to name a few.

In a third option, in a step S706c, the computer system can receive from a user electronic device, a request to purchase a product identified in a video clip associated with a video clip representation. In a step S708c, the computer system can provide to the user electronic device, machine readable instructions to purchase the product. In embodiments, the machine readable instructions can comprise a link to an online retailer and/or a link to register for a subscription.

In an additional step, the computer system may obtain the one or more video clips. The step of obtaining the one or more video clips can comprises extracting a video portion from a larger video work and/or accessing video clips from a video clip database. The video clips may then be displayed as thumbnails or video on a user's device. When selected the video clip or excerpt may be played. A user may also be provided an option to watch and/or purchase the full television show, movie, or advertised product associated with the video excerpt.

Figure 8:
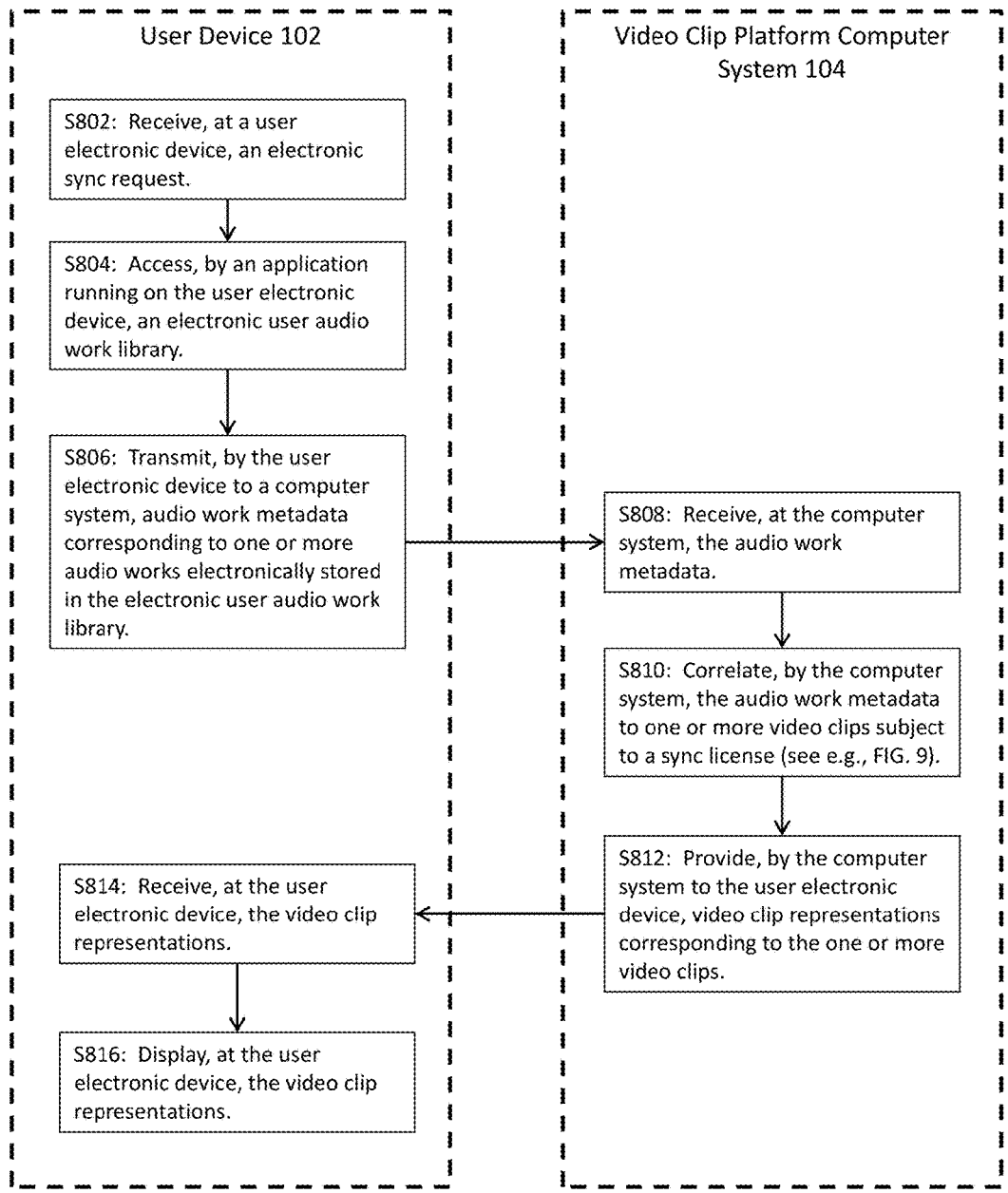
FIG. 8 is a flow chart of an exemplary process for synchronizing a collection of electronic audio works to one or more video clips in accordance with exemplary embodiments of the present invention.

FIG. 8 is a flow chart of an exemplary process for synchronizing a collection of electronic audio works to one or more video clips in accordance with exemplary embodiments of the present invention.

In a step S802, a user device 102 may receive a user input comprising an electronic sync request.

In a step S804, an application (e.g., a software module) running on the user electronic device may access an electronic user audio work library associated with the user, e.g., by accessing audio work identification information, such as metadata, for the audio works in the library.

In a step S806, the user electronic device may transmit to a video clip platform computer system 104 the audio work metadata corresponding to one or more audio works electronically stored in the electronic user audio work library. In a step S808, the video clip platform computer system 104 may receive the audio work metadata.

In a step S810, the video clip platform computer system 104 may correlate the audio work metadata to one or more video clips, as described herein. In embodiments, the video clips available for correlation may be subject to a sync license.

In a step S812, the video clip platform computer system 104 may provide to the user electronic device 102 video clip representations (or date for generating such representations) corresponding to the one or more video clips determined via the correlating step. Generation of the video clip representations is described herein. In a step S814, the user electronic device 102 may receive the video clip representations or the video clip representation data.

In a step S816, the user electronic device 102 may render and/or display the video clip representations on a display device operably connected to the user electronic device 102.

In embodiments, a user electronic device may transmit to a video clip platform computer system comprising one or more computers an electronic request for correlation of one or more audio works in an audio music library associated with a user of the user electronic device. The user electronic device may receive from the video clip platform computer system graphical video clip representation data for rendering one or more graphical video clip representations each associated with a video clip, wherein each rendered graphical video clip representation comprises a video clip preview graphical element and a video clip identification information graphical element. The graphical video clip representation data may have been generated by the video clip platform computer system by obtaining respective audio work metadata associated with each of the one or more audio works; accessing one or more correlation databases stored on non-transitory computer-readable memory and comprising correlation data identifying correlations between audio works identified by audio work metadata and video clips containing corresponding audio works; determining using the respective audio work metadata and the correlation data one or more video clips corresponding to at least some of the one or more audio works; accessing for each of the one or more video clips video clip preview data and video clip identification information; accessing a graphical video clip representation electronic layout model that specifies location parameters and styling parameters for the video clip preview graphical element and the video clip identification information graphical element within an electronic display window; and configuring the graphical video clip representation data based upon the video clip preview data, the video clip identification information, and the graphical video clip representation electronic layout model. The user electronic device may render on a display screen operatively connected to the user electronic device an electronic display of the one or more graphical video clip representations using the graphical video clip representation data. The user electronic device may receive a user input comprising an electronic selection of a rendered graphical video clip representation, the electronic selection comprising an electronic request to play the respective video clip associated with the selected rendered graphical video clip representation. The user electronic device may transmit to the video clip platform computer system, an electronic request to play the respective video clip. The user electronic device may receive at least a portion of the respective video clip. The user electronic device may display on the display screen the at least a portion of the respective video clip.

Figure 9A:
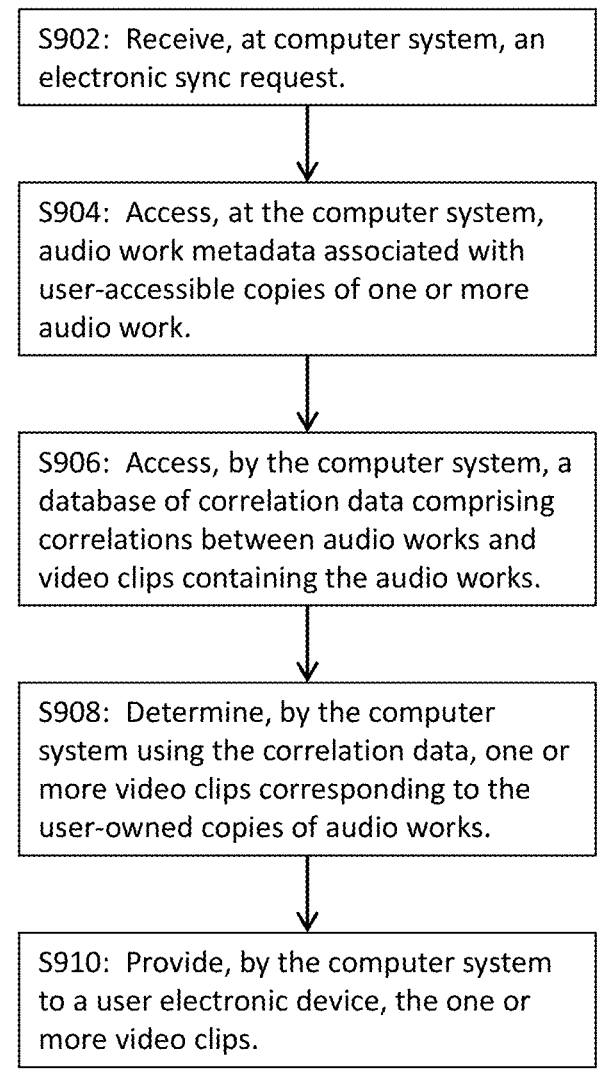
FIGS. 9A-B are flow charts of exemplary processes for correlating a collection of electronic audio works to one or more video clips in accordance with exemplary embodiments of the present invention.

FIG. 9A is a flow chart of an exemplary process for correlating a collection of electronic audio works to one or more video clips in accordance with exemplary embodiments of the present invention.

In a step S902, the computer system, may receive an electronic sync request.

In a step S904, the computer system may access audio work metadata associated with user-accessible copies of one or more audio work. The user-accessible copies can comprise user-owned copies of the one or more audio works, which may be electronic media files, e.g., .mp3 files. In other embodiments, the user-accessible copies can comprises copies licensed for playback by the user. The user-accessible copies can comprise audio works accessible via a subscription or media streaming service. In embodiments, the computer system may obtain and/or access a listing of audio works associated with the electronic sync request. The computer system may then verify that each audio work in the listing is authorized for playback by the user and/or is authorized for correlation to one or more video clips that may be displayed by the user.

In a step S906, the computer system may access a database of correlation data comprising correlations between audio works and video clips containing the audio works.

In a step S908, the computer system may determine using the correlation data, one or more video clips corresponding to the user-owned copies of audio works In a step S910, the computer system may provide the one or more video clips to a user electronic device, which corresponds to step S704 of FIG. 7. Accordingly, the video clips may be provided as video clip representations, which may be rendered on a display device operably connected to the user device (e.g., an integrated touch screen). From the video clip representations, a user can select options to play a video clip, purchase associated audio or video works, access associated audio or video works via online media streaming services, and/or purchase products associated with the video clip.

Figure 9B:
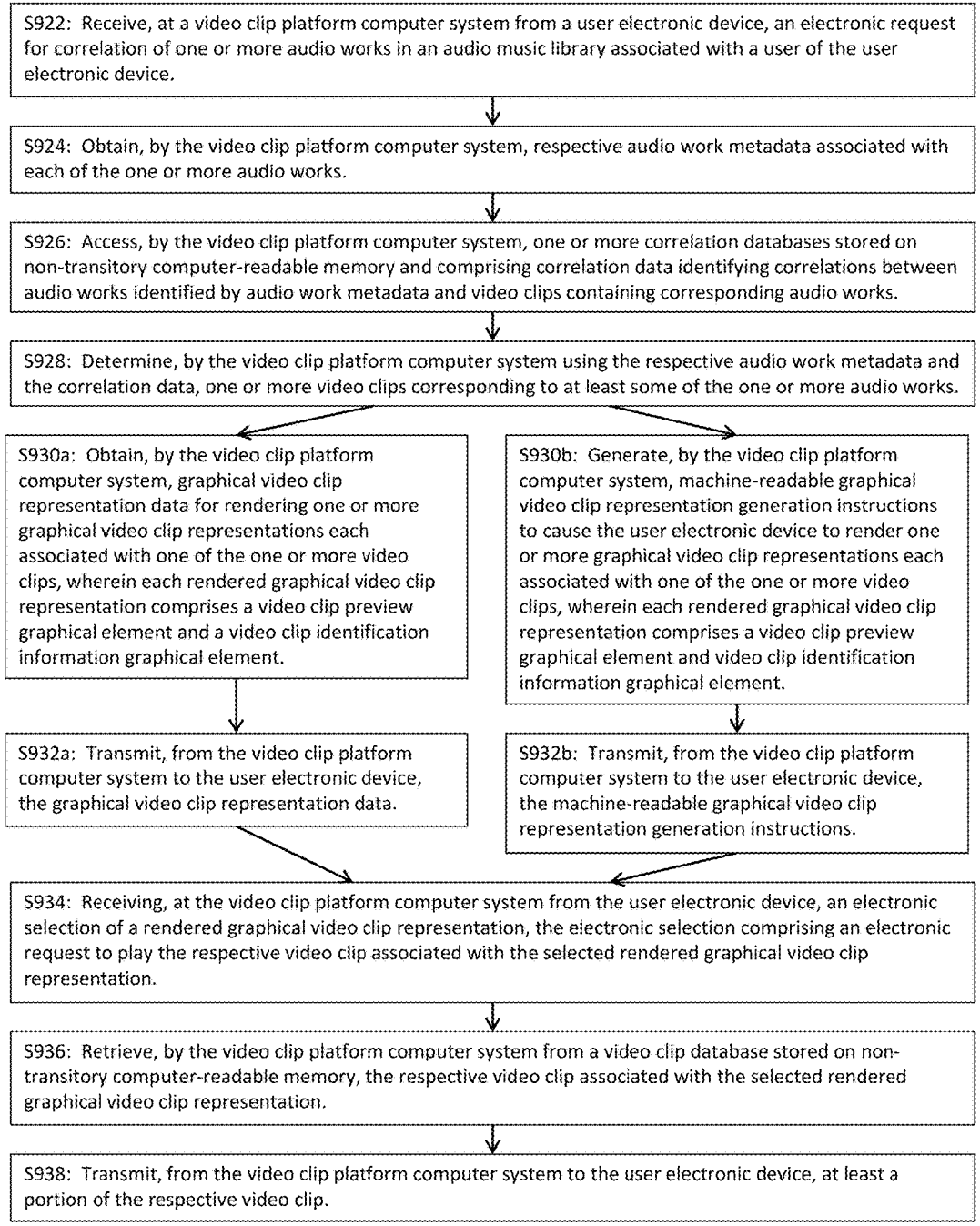

FIG. 9B is a flow chart of another exemplary process for correlating a collection of electronic audio works to one or more video clips in accordance with exemplary embodiments of the present invention.

In a step S922, a video clip platform computer system comprising one or more computers may receive from a user electronic device an electronic request for correlation of one or more audio works in an audio music library associated with a user of the user electronic device. In embodiments, an audio music library may be stored on the user electronic device (e.g., in local memory or a memory device operatively connected to the user electronic device, such as via a cable or a local wireless data network). In other embodiments, the audio music library may be stored on a remote memory device or service, such as a cloud storage device. The video clip platform computer system may use a user's login credentials for the remote memory device or service to access the audio works. In still other embodiments, the audio music library may comprise a media streaming service, which may comprise one or more audio playlists. The video clip platform computer system may access the media streaming service using the user's respective login credentials. In embodiments, the video clip platform computer system may receive an electronic request for correlation of one or more audio works in an audio music library or playlist associated with a second user (e.g., a friend, a celebrity user, to name a few).

In a step S924, the video clip platform computer system may obtain respective audio work metadata associated with each of the one or more audio works. Such audio work metadata may be obtained from the user electronic device, from a music streaming service associated with the user of the user electronic device, from an audio work identification computer system, and/or from a third-party metadata provider computer system, to name a few. Audio work metadata can comprise audio work identifiers (e.g., unique alphanumeric sequences for each audio work).

In a step S926, the video clip platform computer system may access one or more correlation databases stored on non-transitory computer-readable memory and comprising correlation data identifying correlations between audio works identified by audio work metadata and video clips containing corresponding audio works. In embodiments, corresponding audio works contained in the video clips may be different versions of the audio work (e.g., performed by a different artist, recorded in a studio, recorded live, to name a few).

In a step S928, the video clip platform computer system may determine using the respective audio work metadata and the correlation data, one or more video clips corresponding to at least some of the one or more audio works. In embodiments, an audio work may correspond to a plurality of video clips. For example, the audio work may have been included in different movies. The video clip platform computer system may determine the plurality of available video clips. Available video clips may be video clips subject to a sync license. In embodiments, only audio works for which a user owns a copy or for which a user is licensed to play or stream the audio work may be correlated to video clips. Accordingly, the video clip platform computer system may verify that each of the one or more audio works is authorized for correlation to one or more corresponding video clips. The video clip platform computer system may determine that each of the one or more video clips comprises a respective audio work pursuant to a valid sync license.

In a step S930a, the video clip platform computer system may obtain graphical video clip representation data for rendering one or more graphical video clip representations each associated with one of the one or more video clips, wherein each rendered graphical video clip representation comprises a video clip preview graphical element and a video clip identification information graphical element. In embodiments, obtaining graphical video clip representation data can comprise accessing, by the video clip platform computer system, at least video clip preview data and video clip identification information. Obtaining graphical video clip representation data can also comprise configuring, by the video clip platform computer system, the graphical video clip representation data based at least in part upon the video clip preview data, the video clip identification information, and a graphical video clip representation electronic layout model that specifies location parameters and styling parameters for the video clip preview graphical element and the video clip identification information graphical element within an electronic display window.

In a step S932a, the video clip platform computer system may transmit to the user electronic device, the graphical video clip representation data.

In embodiments, the graphical video clip representations may be generated by the user electronic device. The video clip platform computer system may generate machine-readable instructions, which can dictate how the user electronic device should render the representations, including which data to access.

Accordingly, in a step S930b, the video clip platform computer system may generate machine-readable graphical video clip representation generation instructions to cause the user electronic device to render one or more graphical video clip representations each associated with one of the one or more video clips, wherein each rendered graphical video clip representation comprises a video clip preview graphical element and video clip identification information graphical element.

In a step S932b, the video clip platform computer system may transmit to the user electronic device, the machine-readable graphical video clip representation generation instructions.

In embodiments, the machine-readable graphical video clip representation generation instructions can comprise first instructions for retrieving at least video clip preview data and video clip identification information and second instructions for generating the one or more rendered graphical video clip representations based at least in part upon the video clip preview data, the video clip identification information, and a graphical video clip representation electronic layout model that specifies location parameters and styling parameters for the video clip preview graphical element and the video clip identification information graphical element within an electronic display window. The electronic layout model may comprise a template. In embodiments, the electronic layout model may comprise instructions in a markup language (e.g., HTML) and/or styling instructions (e.g., CSS).

In embodiments, a video clip preview graphical element can comprise a one or more frames of the respective video clip. A single frame may be displayed as an image. A plurality of frames may be displayed as cycling images (e.g., showing different scenes from the video clip), which may be selected from pre-defined locations within a video clip. In embodiments, a video clip preview graphical element can comprise a rendered element (e.g., a rectangular display window) configured for playback of at least a portion of the respective video clip. Accordingly, the preview element may be a video preview that loops through a portion of the video clip or that plays the entire clip. For example, the video clip may be played with or without audio when a user hovers over it with a pointer or when it is part of the primary graphical video clip representation displayed (e.g., the uppermost representation visible in a scrollable stream of representations).

In embodiments, the video clip identification information graphical element can comprise text rendered on a portion of the graphical video clip representation. The video clip identification information graphical element can comprise title information for the corresponding audio work, artist information for the corresponding audio work, and/or information identifying a video work that contains the respective video clip (such as video title information, release date, studio information, actor information, to name a few).

In embodiments, graphical video clip representations may comprise additional elements, such as at least one graphical video control element to play the video clip associated with the rendered graphical video clip representation. Such a graphical video control element may be selected by the user to request playback of the video clip. Other elements can include at least one graphical sharing element to transmit to one or more other user electronic addresses (e.g., associated with other usernames) information associated with the video clip associated with the rendered graphical video clip representation. The representation can include an information access element to access additional information associated with the video clip associated with the rendered graphical video clip representation. In embodiments, such additional information may be displayed following an animated transition, e.g., a horizontal flip to show a reverse side of the graphical video clip representation.

In a step S934, the video clip platform computer system may receive from the user electronic device, an electronic selection of a rendered graphical video clip representation, the electronic selection comprising an electronic request to play the respective video clip associated with the selected rendered graphical video clip representation.

In a step S936, the video clip platform computer system may retrieve from a video clip database stored on non-transitory computer-readable memory, the respective video clip associated with the selected rendered graphical video clip representation.

In a step S938, the video clip platform computer system may transmit to the user electronic device, at least a portion of the respective video clip. Transmitting at least a portion of the respective video clip can comprise streaming the respective video clip to the user electronic device.

In embodiments, a user can select one or more options from a graphical video clip representation. For example, a user can select an option to purchase a video work that contains the video clip and/or related video clips (e.g., other television episodes in the same series as the episode containing the video clip, video works with the same actors or directors as in the video work containing the video clip, to name a few). Accordingly, the video clip platform computer system may receive from the user electronic device an electronic request to purchase a video work that contains a video clip associated with a rendered graphical video clip representation. The video clip platform computer system may generate machine-readable instructions for facilitating purchase of the video work, wherein the machine-readable instructions comprise an electronic address at which the video work may be purchased (e.g., a website URL). The machine-readable instructions may comprise instructions to execute a purchase transaction and/or instructions to access a product or service at an online store. The video clip platform computer system may provide to the user electronic device the machine-readable instructions. In embodiments, a user may select an option to purchase an audio work or an album containing the audio work.

A user may select an option to access a video work via an online streaming or download service. In embodiments, the video clip platform computer system can receive from the user electronic device an electronic request to access from an online video work provider (e.g., Netflix, Amazon, Hulu, HBO GO) a video work that contains a video clip associated with a rendered graphical video clip representation. The electronic request may comprise or be accompanied by user account credentials for the online video work provider. In embodiments, such credentials may already be stored by the video clip platform computer system. The video clip platform computer system may generate machine-readable instructions for accessing the online video work provider, wherein the machine-readable instructions comprise an electronic address at which the video work may be accessed. The video clip platform computer system may then provide to the user electronic device the machine-readable instructions. In embodiments, a user may select an option to access an audio work via an online streaming or download service.

A user may purchase a product or service associated with a video clip, such as a commercial or a product placement in a movie or television show. In embodiments, the video clip platform computer system may receive from the user electronic device an electronic request to purchase a product or service associated with a video clip associated with a rendered graphical video clip representation. The video clip platform computer system may generate machine-readable instructions for accessing an online marketplace for purchasing the product or service, wherein the machine-readable instructions comprise an electronic address. The video clip platform computer system may provide to the user electronic device the machine-readable instructions.

Figure 10A:
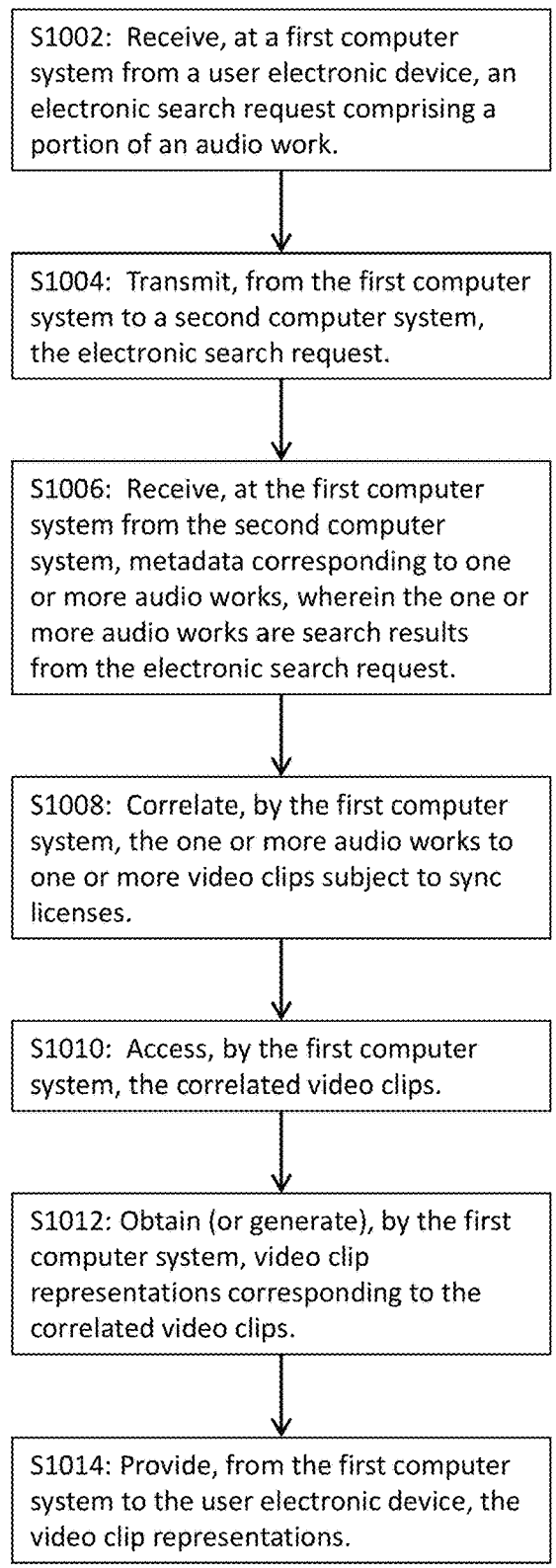
FIGS. 10A-B are flow charts of exemplary processes for searching for video clips in accordance with exemplary embodiments of the present invention.

FIG. 10A is a flow chart of an exemplary process for searching for video clips in accordance with exemplary embodiments of the present invention. In embodiments, a user may search for an electronic audio work on a social media website. The audio work may be converted to a corresponding video clip, as described herein.

An electronic search request may comprise a portion of an audio work, which may be an audio work search sample. Such an audio work search sample may be analyzed and correlated to search results by a second computer system.

In other embodiments, an electronic search request may comprise audio and/or video work metadata, such as an artist name, media work title, persons associated with a video work (e.g., actors and/or directors), and/or portions of text or lyrics, to name a few. A first computer system may perform the search by searching one or more databases of media work metadata.

In a step S1002, a first computer system may receive from a user electronic device an electronic search request comprising a portion of an audio work. The portion of the audio work may be recorded by the user device from ambient sounds (e.g., from speakers, from live singers, and/or from the user singing or humming, to name a few). The first computer system may be a video clip platform computer system.

In a step S1004, the first computer system may transmit to a second computer system (e.g., an audio identification computer system) the electronic search request, including the portion of the audio work or data extracted from it (e.g., audio fingerprint data). Shazam is an exemplary audio identification computer system.

In a step S1006, the first computer system may receive from the second computer system metadata corresponding to one or more audio works, wherein the one or more audio works are search results from the electronic search request.

In a step S1008, the first computer system may correlate the one or more audio works to one or more video clips, which may be video clips subject to sync licenses.

In a step S1010, the first computer system may access the correlated video clips and/or a database of video clip identification information (e.g., metadata).

In a step S1012, the first computer system may obtain (e.g., retrieve from a database) or generate video clip representations corresponding to the correlated video clips.

In a step S1014, the first computer system may provide to the user electronic device the video clip representations.

Figure 10B:
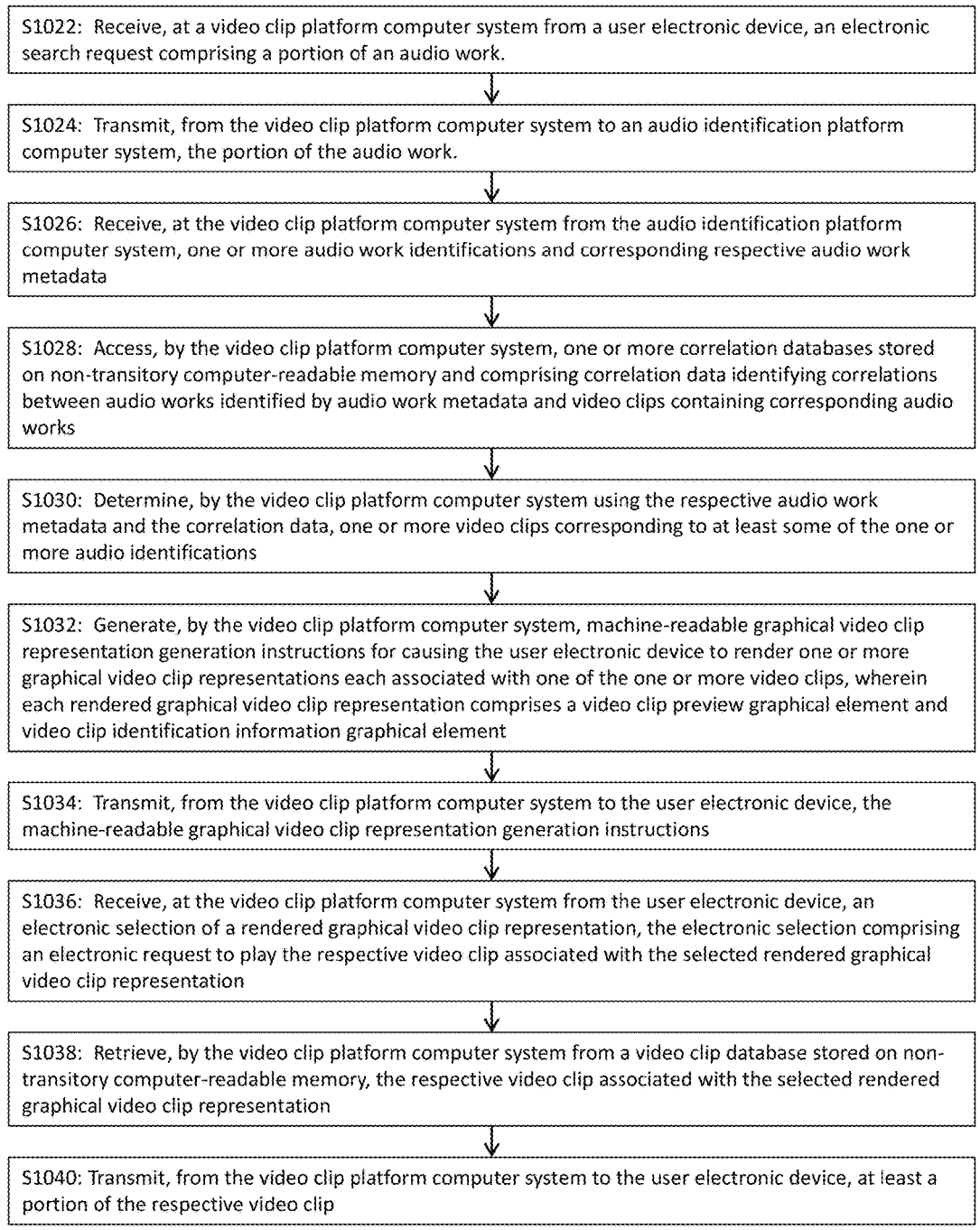

FIG. 10B is another flow chart of an exemplary process for searching for video clips and generating graphical video clip representations in accordance with exemplary embodiments of the present invention.

In a step S1022, a video clip platform computer system may receive from a user electronic device an electronic search request comprising a portion of an audio work (or a rendition thereof).

In a step S1024, the video clip platform computer system may transmit to an audio identification platform computer system the portion of the audio work and/or identifying characteristics (e.g., extracted audio work features, such as comprising an audio work fingerprint).

In a step S1026, the video clip platform computer system may receive from the audio identification platform computer system one or more audio work identifications and corresponding respective audio work metadata. In embodiments, the audio work metadata may be accessed from one or more other data sources, which may be remote or local databases.

In a step S1028, the video clip platform computer system may access one or more correlation databases stored on non-transitory computer-readable memory and comprising correlation data identifying correlations between audio works identified by audio work metadata and video clips containing corresponding audio works.

In a step S1030, the video clip platform computer system may determine using the respective audio work metadata and the correlation data one or more video clips corresponding to at least some of the one or more audio identifications.

In a step S1032, the video clip platform computer system may generate machine-readable graphical video clip representation generation instructions for causing the user electronic device to render one or more graphical video clip representations each associated with one of the one or more video clips, wherein each rendered graphical video clip representation comprises a video clip preview graphical element and video clip identification information graphical element.

In a step S1034, the video clip platform computer system may transmit to the user electronic device the machine-readable graphical video clip representation generation instructions and/or graphical video clip representation data that may be rendered by the user device as a graphical video clip representation.

In a step S1036, the video clip platform computer system may receive from the user electronic device an electronic selection of a rendered graphical video clip representation, the electronic selection comprising an electronic request to play the respective video clip associated with the selected rendered graphical video clip representation.

In a step S1038, the video clip platform computer system may retrieve from a video clip database stored on non-transitory computer-readable memory the respective video clip associated with the selected rendered graphical video clip representation.

In a step S1040, the video clip platform computer system may transmit to the user electronic device at least a portion of the respective video clip. For example, the video clip platform computer system may stream the video clip to the user device.

Figure 11A:
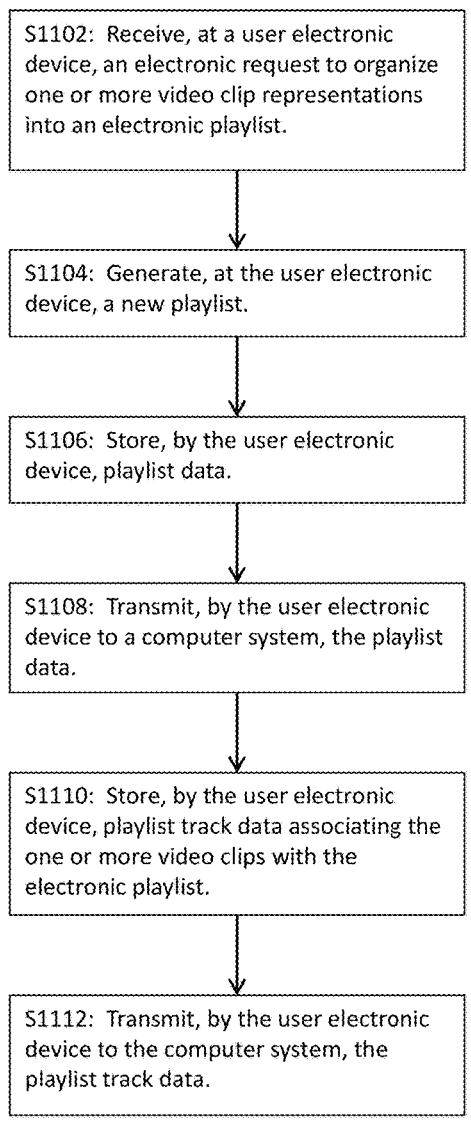
FIGS. 11A-B are flow charts of exemplary processes for creating video clip playlists in accordance with exemplary embodiments of the present invention.
Figure 11B:
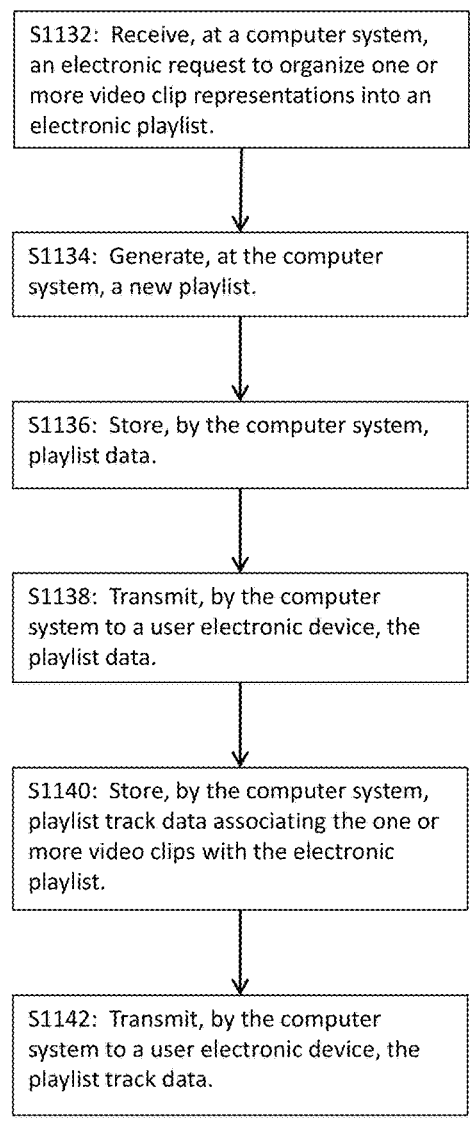

FIGS. 11A-B are flow charts of exemplary processes for creating video clip playlists in accordance with exemplary embodiments of the present invention.

Referring to FIG. 11A, a playlist may be created locally, e.g., on a user electronic device, and then synced with a server.

In a step S1102, in embodiments, the electronic request may be a request to organize one or more video clips into an existing playlist.

In a step S1104, the user electronic device may receive, e.g., via an input device, input data comprising a playlist title.

In a step S1106, the user electronic device may store playlist data, which may comprise a playlist title.

In a step S1112, the user electronic device may transmit to the computer system, the playlist track data. In embodiments, the playlist data and the playlist track data may be transmitted together.

Referring to FIG. 11B, a playlist may be generated and/or edited by accessing a computer system.

Figure 12:
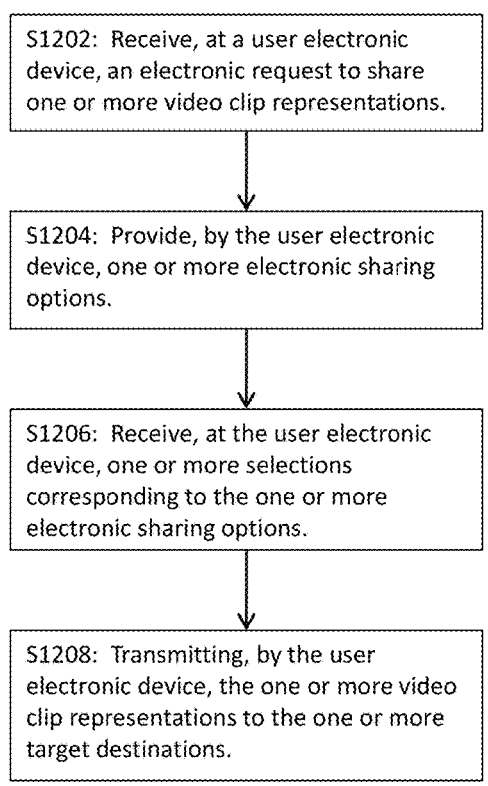
FIG. 12 is a flow chart of an exemplary process for sharing video clips in accordance with exemplary embodiments of the present invention.

FIG. 12 is a flow chart of an exemplary process for sharing video clips in accordance with exemplary embodiments of the present invention.

In a step S1202, a user electronic device may receive an electronic request to share one or more video clip representations. The request can comprise a request to share an electronic video clip playlist.

In a step S1204, the user electronic device may provide one or more electronic sharing options comprising at least one or more target destinations. The one or more electronic sharing options may further comprise one or more communications platforms for sharing electronic data. In embodiments, the one or more communications platforms include any of email, social media providers, or a downloadable application (e.g., a mobile application for a smart phone).

In a step S1206, the user electronic device may receive one or more selections corresponding to the one or more electronic sharing options.

In a step S1208, the user electronic device may transmit the one or more video clip representations to the one or more target destinations. The video clip representations may be transmitted via the one or more communications platforms.

Figure 13:
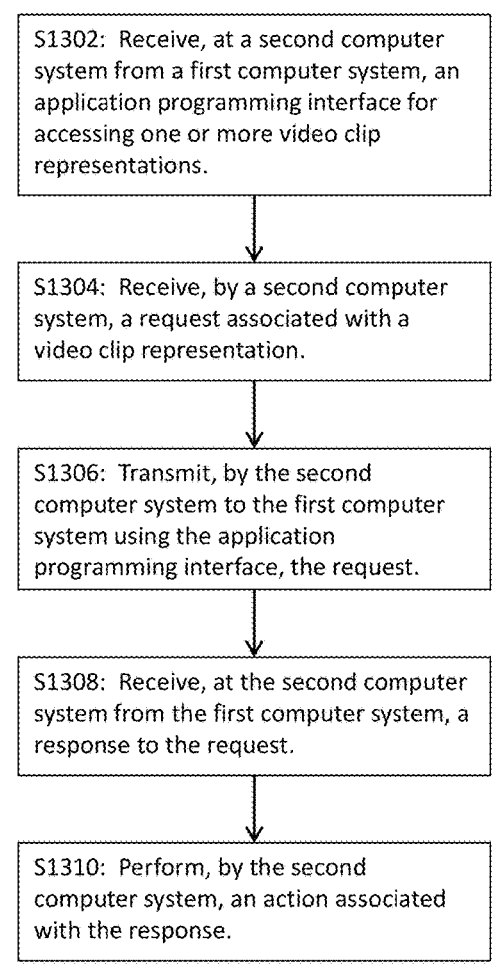
FIG. 13 is a flow chart of an exemplary process for using an API in accordance with exemplary embodiments of the present invention.

FIG. 13 is a flow chart of an exemplary process for using an API in accordance with exemplary embodiments of the present invention.

In a step S1302, the application programming interface may enable interaction with one or more video clip representations.

In a step S1304, the request can comprise a request to play a video clip corresponding to the video clip representation, a request to share the video clip representation with one or more target destinations, a request to submit a comment associated with the video clip representation, a request to access a video work associated with the video clip representation, a request to make a purchase associated with the video clip representation, a request to create an electronic playlist including a video clip associated with the video clip representation, and/or a search. In embodiments, the search may be unrelated to the video clip representation.

In a step S1308, the response can comprise a playable video clip corresponding to the video clip representation, machine-readable instructions to transmit the video clip representation to the one or more target destinations, an updated video clip representation including the comment, machine-readable instructions to access a video work associated with the video clip representation, and/or machine-readable instructions associated with performance of a transaction. The machine-readable instructions can comprise a URL. The response can also comprise an updated electronic playlist including a video clip associated with the video clip representation, one or more search results, which may be video clip representations.

The system may also provide an embeddable video player that plays from the video clip platform database and/or permits interaction with video clip representations. Such a video player may be embedded in a website or a downloadable application and may comprise computer code. An embeddable widget can interact with an application programming interface. An embeddable widget can include a management portal to select and arrange videos (e.g., to manage the widget content).

In embodiments, the user may interact via one or more websites, one or more application programming interfaces ("API") operating on a mobile device or other computing device, dedicated hardware device, to name a few.

Advertisement Services

Figure 1B:
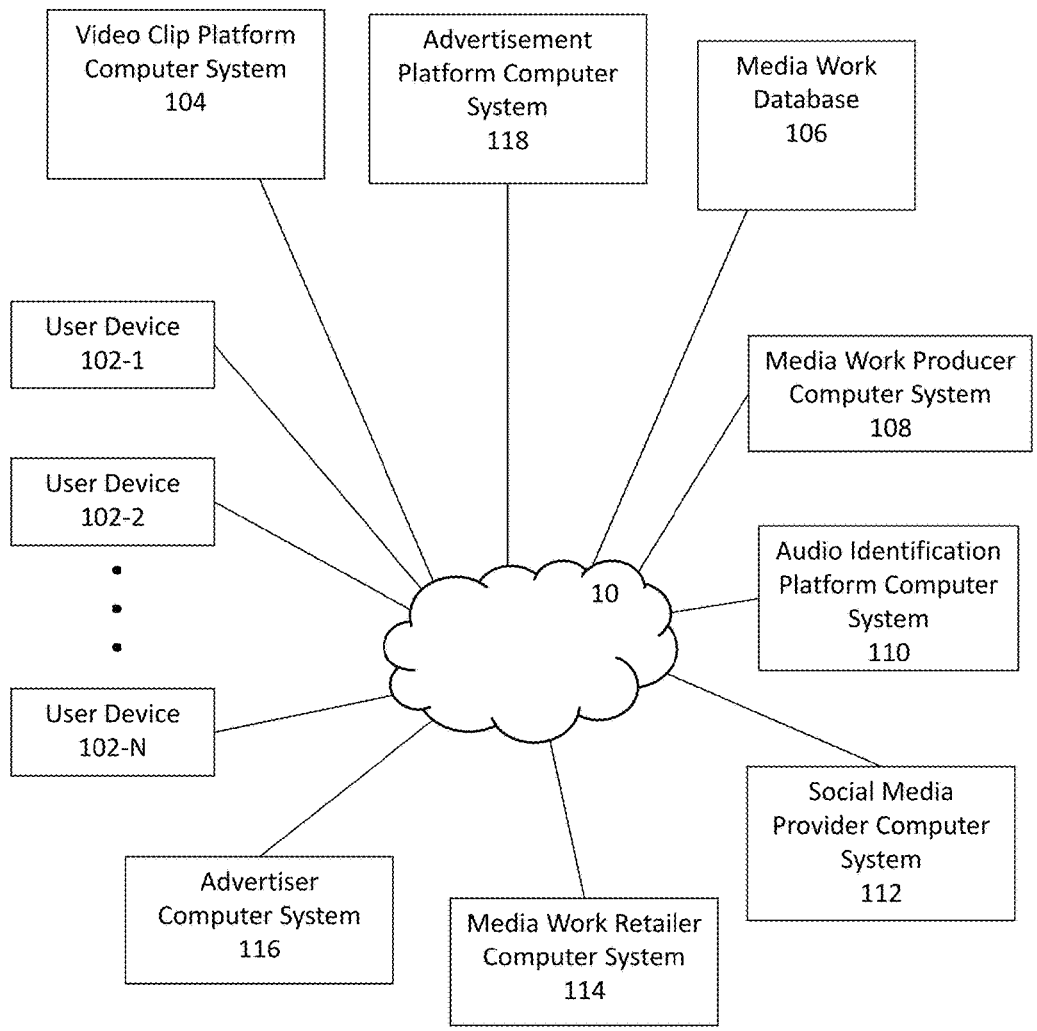
FIG. 1B is a schematic diagram of possible participants in and components of an exemplary system for providing advertising services in connection with sync-licensed electronic audio works in accordance with exemplary embodiments of the present invention.

FIG. 1B is a schematic diagram of possible participants in and components of an exemplary system for providing advertising services in connection with sync-licensed electronic audio works in accordance with exemplary embodiments of the present invention. Such a system can include any of the participants and components described with respect to the system illustrated in FIG. 1A. A system for providing advertising services can also include an advertisement platform computer system 118, which can provide create electronic user profiles for selecting advertisements, track the use of audio works in advertisements, provide guidance on generating advertisements to optimize effect on a target audience, select advertisements for particular users, e.g., based at least upon users' musical preferences, and/or identify target users for a particular advertisement, e.g., based at least upon an audio work contained in the advertisement, as described herein.

Figures 14A, 14B:
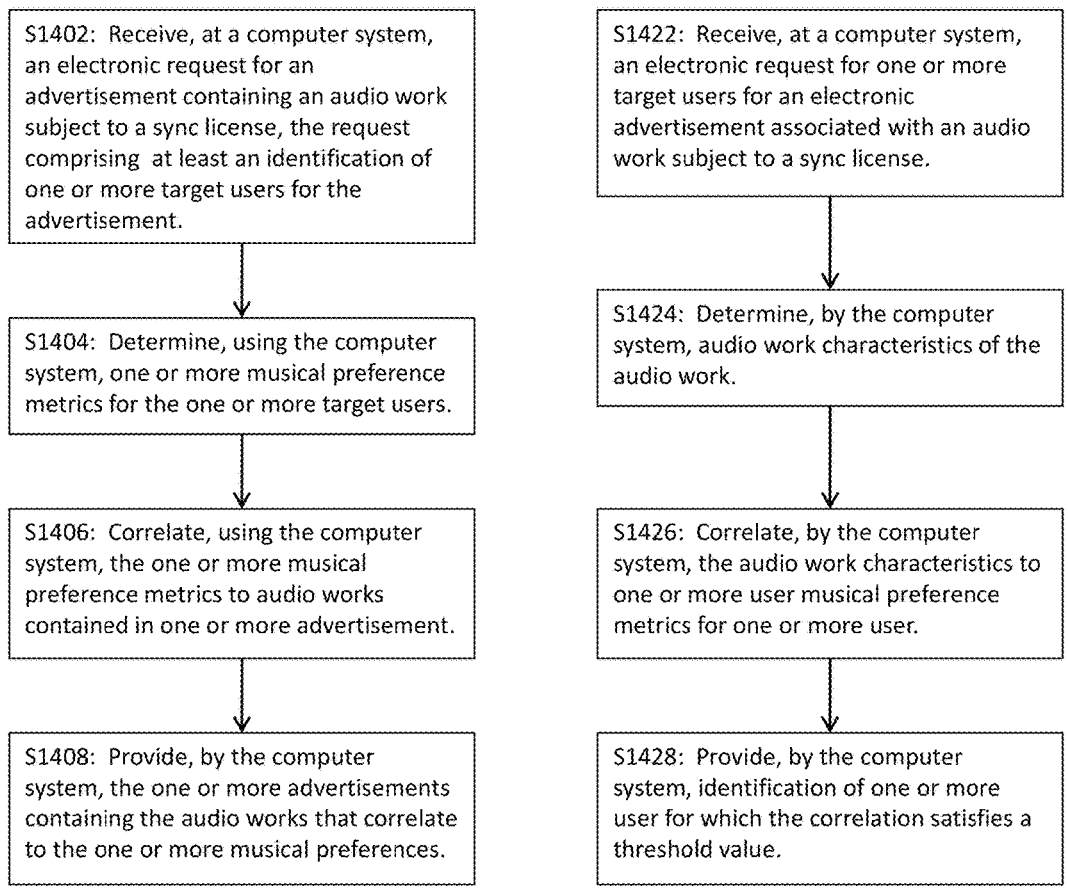
FIG. 14A is a flow chart of an exemplary process for providing advertisements based upon users' musical preferences in accordance with exemplary embodiments of the present invention.
FIG. 14B is a flow chart of an exemplary process for identifying target users for an advertisement in accordance with exemplary embodiments of the present invention.

FIG. 14A is a flow chart of an exemplary process for providing advertisements based upon users' musical preferences in accordance with exemplary embodiments of the present invention.

In embodiments, determining the one or more musical preference metrics can comprise retrieving musical preference metrics from one or more databases. The one or more musical preference metrics may be based upon any of user collections of audio works, user interactions with a video clip system (e.g., which video clips a user has played, which video works a user has purchased), to name a few.

In embodiments, correlating comprises performing a non-exhaustive near neighbor search of advertisement sound tracks for audio works identified by the one or more musical preference metrics and/or analyzing a database of audio works contained in commercials to determine audio works that match the one or more musical preference metrics.

In a step S1402, a computer system may receive an electronic request for an advertisement containing an audio work subject to a sync license, the request comprising at least an identification of one or more target users for the advertisement.

In a step S1404, the computer system can determine one or more musical preference metrics for the one or more target users. In embodiments, determining the one or more musical preference metrics can comprise retrieving musical preference metrics from one or more databases. In embodiments, the one or more musical preference metrics can be based upon user collections of audio works and/or user interactions with a video clip system (e.g., which video clips a user has played, which video works a user has purchased).

In a step S1406, the computer system can correlate the one or more musical preference metrics to audio works contained in one or more advertisement. In embodiments, correlating can comprise performing a non-exhaustive near neighbor search of advertisement sound tracks for audio works identified by the one or more musical preference metrics. In embodiments, correlating can comprise analyzing a database of audio works contained in commercials to determine audio works that match the one or more musical preference metrics.

In a step S1408, the computer system can provide the one or more advertisements containing the audio works that correlate to the one or more musical preferences.

FIG. 14B is a flow chart of an exemplary process for identifying target users for an advertisement in accordance with exemplary embodiments of the present invention.

In a step S1422, a computer system can receive an electronic request for one or more target users for an electronic advertisement associated with an audio work subject to a sync license. The electronic advertisement can contain at least a portion of the audio work.

In a step S1424, the computer system may determine audio work characteristics of the audio work.

In a step S1426, the computer system can correlate the audio work characteristics to one or more user musical preference metrics for one or more user.

In a step S1428 the computer system can provide identifications of one or more user for which the correlation satisfies a threshold value.

Figure 14C:
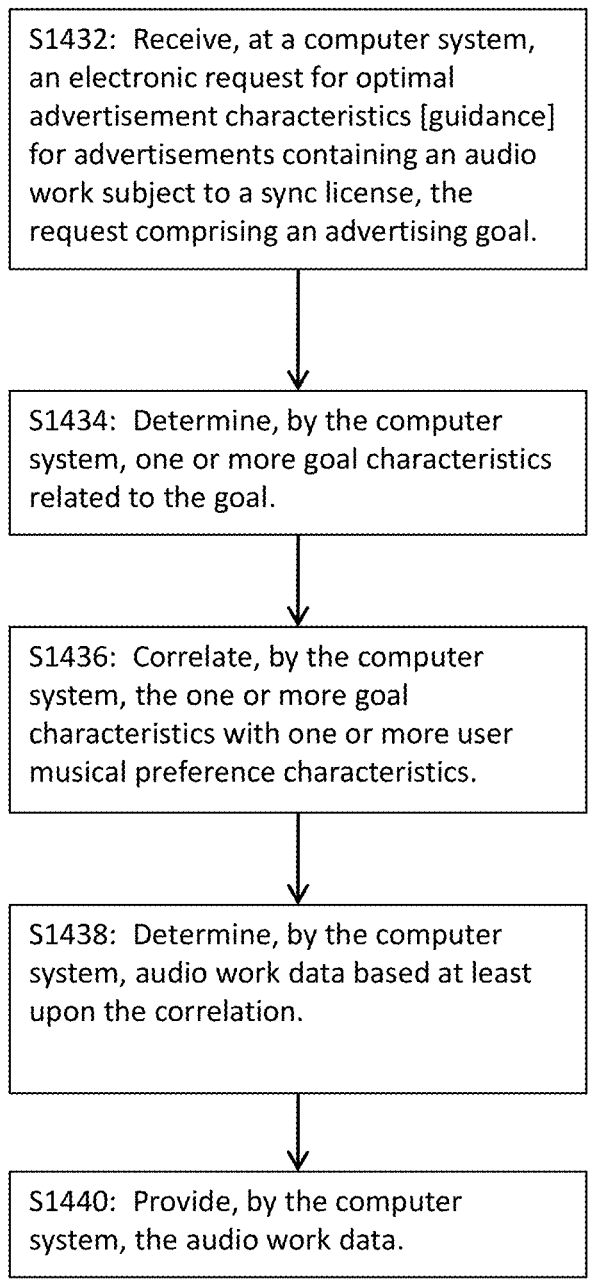
FIG. 14C is a flow chart of an exemplary process for providing optimized advertisement characteristics in accordance with exemplary embodiments of the present invention.

FIG. 14C is a flow chart of an exemplary process for providing optimized advertisement characteristics in accordance with exemplary embodiments of the present invention.

In a step S1432, a computer system can receive an electronic request for optimal advertisement characteristics (e.g., advertising guidance parameters) for advertisements containing an audio work subject to a sync license, the request comprising an advertising goal. In embodiments, the goal can comprise at least an identification of one or more target users for an advertisement, at least an identification of target user demographics for an advertisement, at least an identification of one or more products that are the subject of an advertisement, and/or at least an identification of one or more product categories related to an advertisement. In embodiments, the goal may be to optimize appeal to the most users.

In a step S1434, the computer system may determine one or more goal characteristics related to the goal.

In a step S1436, the computer system may correlate the one or more goal characteristics with one or more user musical preference characteristics.

In a step S1438, the computer system may determine audio work data based at least upon the correlation. The audio work data can comprise an identification of one or more audio works, one or more audio work genres, and/or an identification of one or more audio work artists, to name a few. In embodiments, the audio work data may comprise an identification of one or more audio works, an identification of one or more audio work genres, and/or an identification of one or more audio work artists.

In a step S1440, the computer system may provide the audio work data, e.g., to an advertiser computer system.

In embodiments, the goal can comprise any of at least an identification of one or more target users for an advertisement, at least an identification of target user demographics for an advertisement, at least an identification of one or more products that are the subject of an advertisement, at least an identification of one or more product categories related to an advertisement, and/or optimization of appeal to the most users.

Figure 15A:
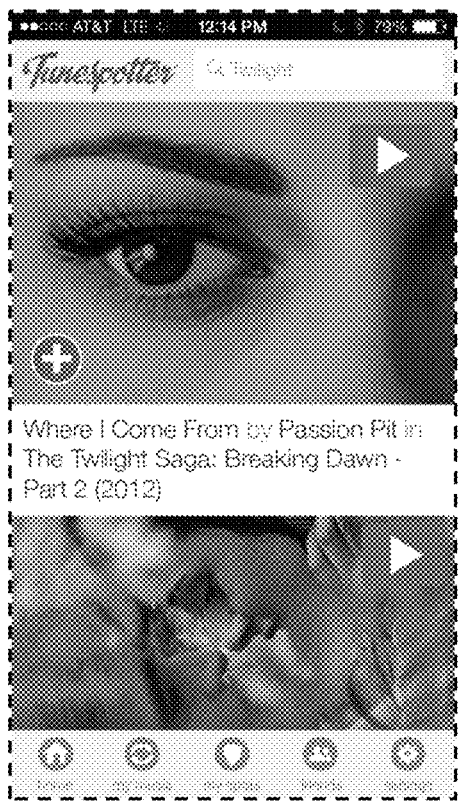
FIG. 15A is an exemplary screen shot of a user interface for displaying video clip representations in accordance with exemplary embodiments of the present invention.

FIG. 15A is an exemplary screen shot of a user interface for displaying video clip representations in accordance with exemplary embodiments of the present invention. It includes a search bar. It also shows a first graphical video clip representation in its entirety and the top portion of a second graphical video clip representation. These video clip representations form part of the results from the search. FIG. 15A also shows a navigation bar with rendered menu elements, such as a home option, my music option (which accesses an audio music library or playlists), my spots option (which accesses saved video clips), friends option, and settings option. There is a plus-icon on the graphical video clip representation which can be used for navigation.

Figure 15B:
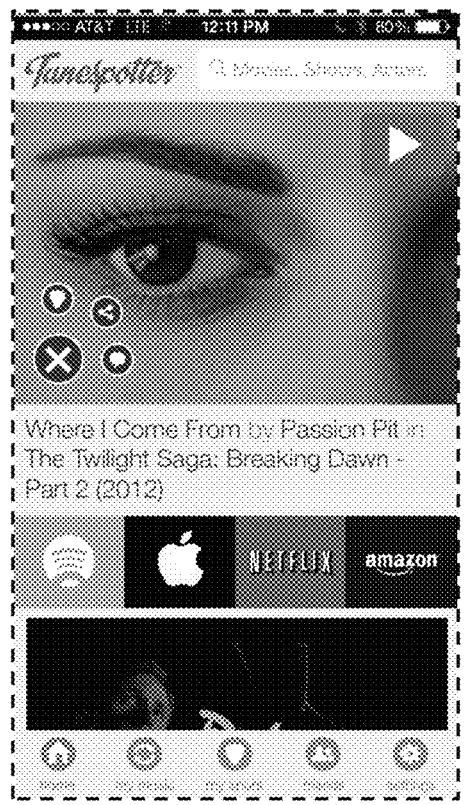
FIG. 15B is an exemplary screen shot of a user interface for displaying video clip representations with action options in accordance with exemplary embodiments of the present invention.

FIG. 15B is an exemplary screen shot of a user interface for displaying video clip representations with action options in accordance with exemplary embodiments of the present invention. It shows the action options that are available as a result of clicking the plus-icon navigation element in FIG. 15A. The action options can include options to save a video clip, share a video clip, and/or comment about a video clip. FIG. 15B also shows links to multiple stores which that can sell products related to the search results (e.g., music streaming services, music download services, video streaming services and/or video download services).

Figure 16A:
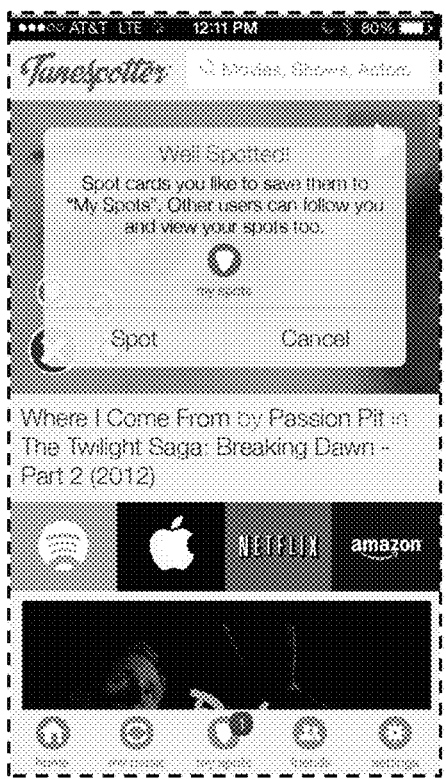
FIGS. 16A-B are exemplary screen shots of user interfaces for saving video clip representations to a collection and viewing saved video clip representations in accordance with exemplary embodiments of the present invention.
Figure 16B:

FIGS. 16A-B are exemplary screen shots of user interfaces for saving video clip representations to a collection and viewing saved video clip representations in accordance with exemplary embodiments of the present invention. FIG. 16A shows an option screen for saving a video clip. FIG. 16B shows graphical video representations (e.g., graphical video clip representation 1652) corresponding to all video clips saved by a user. A badge counter in the navigation bar indicates that there are 28 saved video clips. By selecting sharing options 1654 a user may share their entire library of saved video clips with other users and/or may post a link from which others may access and/or view the user's video clip library.

Figure 17A:
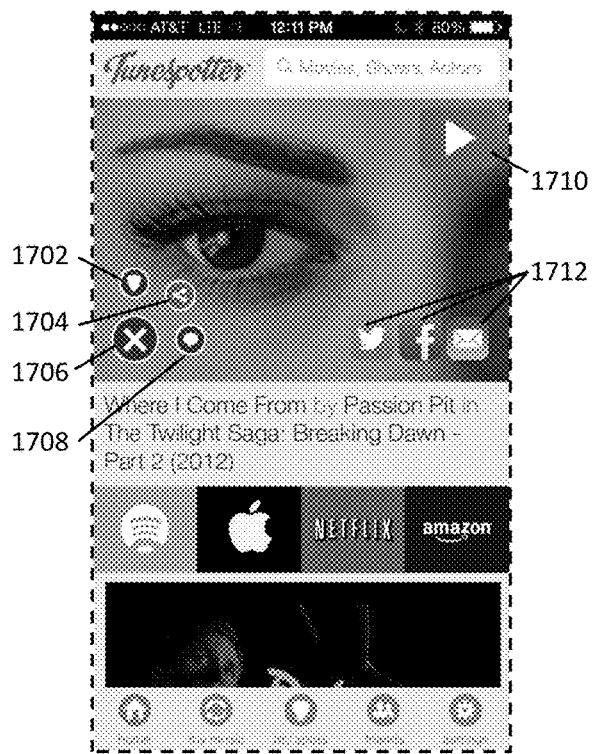
FIGS. 17A-B are exemplary screen shots of user interfaces for sharing video clip representations in accordance with exemplary embodiments of the present invention.
Figure 17B:

FIGS. 17A-B are exemplary screen shots of user interfaces for sharing video clip representations in accordance with exemplary embodiments of the present invention.

Referring to FIG. 17A, a user interface for performing actions on a video clip representation can include a save option 1702, which may electronically save the video clip representation in association with one or more collections of video clip representations. A share option 1704 may provide sharing platform selection buttons 1712, which may be used to select one or more platforms for sharing a video clip representation, such as email and/or social media providers. A close option 1706 may close the action options associated with a video clip representation. A comment option 1708 may enable a user to submit comments about a video clip representation. In embodiments, submitted comments may be displayed to any user, and/or threads of private and/or public comments may be created. A play option 1710 may play a video clip corresponding to a video clip representation.

FIG. 17B illustrates an exemplary video clip representation that has been shared on a third-party social media platform. It shows that both the video clip representation and a brief text description, along with a URL, can be posted to third-party social media platforms.

Figure 18:
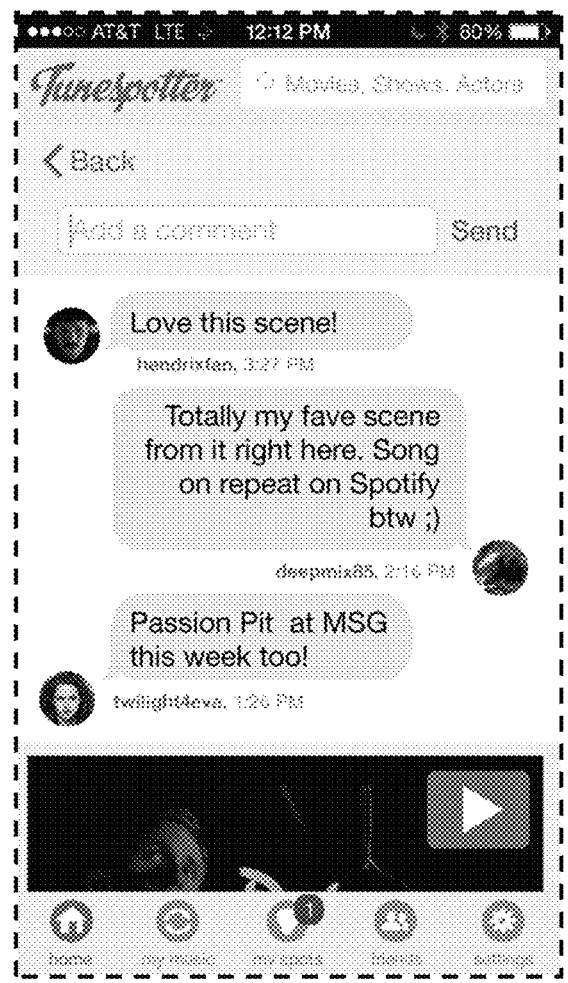
FIG. 18 is an exemplary screen shot of a user interface for reading and submitting comments related to a video clip representation in accordance with exemplary embodiments of the present invention.

FIG. 18 is an exemplary screen shot of a user interface for reading and submitting comments related to a video clip representation in accordance with exemplary embodiments of the present invention. FIG. 18 shows a series of comments submitted by different users, in addition to avatar icons representing each commenting user. It also displays a text box in which a user can input and then submit his or her own comments.

Figure 19A:
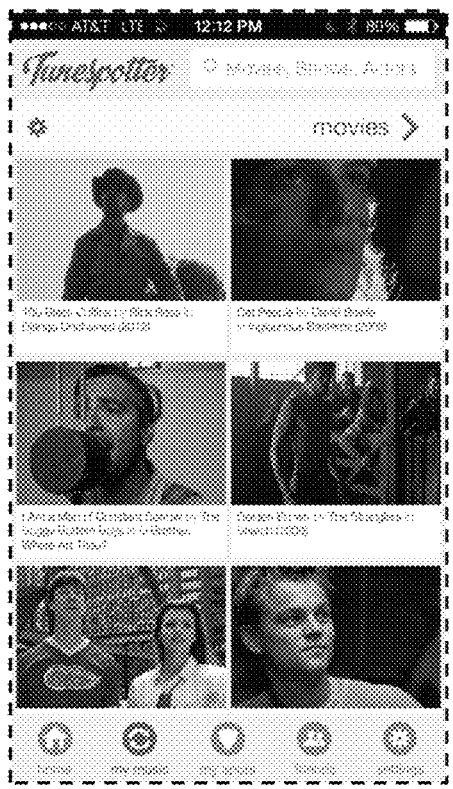
FIGS. 19A-D are exemplary screen shots of user interfaces for video clip representations by category in accordance with exemplary embodiments of the present invention.
Figure 19B:
Figure 19C:
Figure 19D:

FIGS. 19A-D are exemplary screen shots of user interfaces for video clip representations by category in accordance with exemplary embodiments of the present invention. FIG. 19A shows video clips from movies. FIG. 19B shows video clips from commercials. FIG. 19C shows video clips organized by artist and/or band, such as an alphabetical organization. FIG. 19D shows video clips organized by song title, such as an alphabetical organization.

Figure 20A:
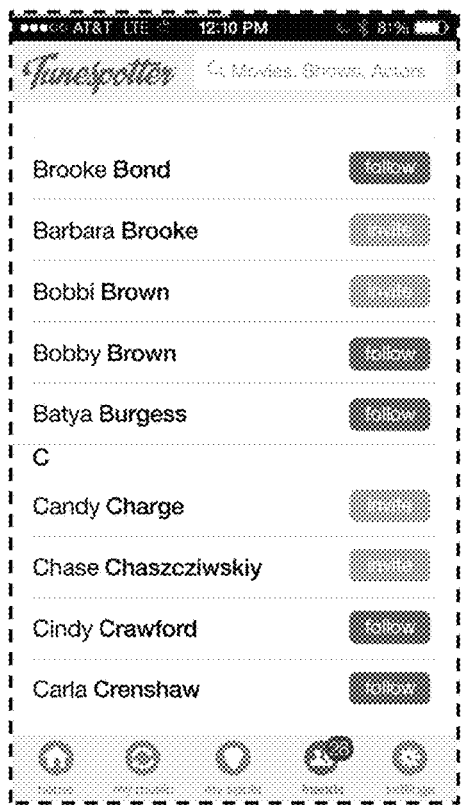
FIGS. 20A-B are exemplary screen shots of user interfaces for following electronic interactions of other users in accordance with exemplary embodiments of the present invention.
Figure 20B:
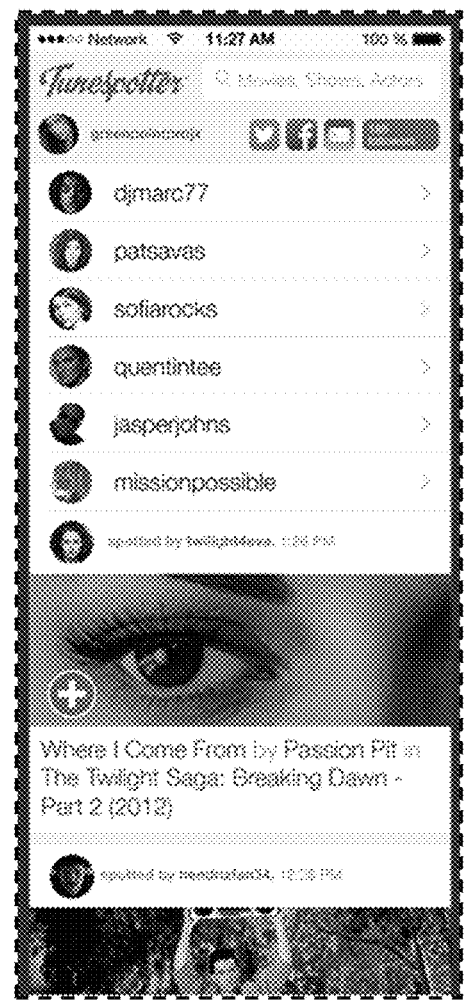

FIGS. 20A-B are exemplary screen shots of user interfaces for following electronic interactions of other users or artists in accordance with exemplary embodiments of the present invention. A user can select an artist to follow as shown in FIG. 20A, such as Cindy Crawford, and see videos incorporating her music in a stream.

Figure 21:
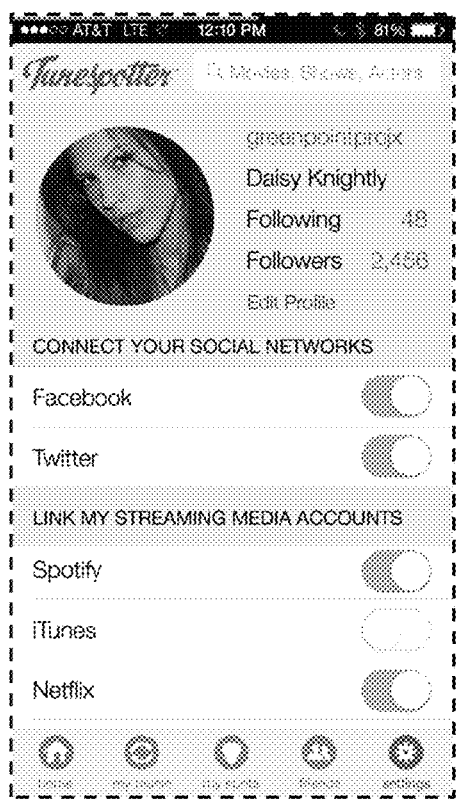
FIG. 21 is an exemplary screen shot of a user interface for managing user settings in accordance with exemplary embodiments of the present invention.

FIG. 21 is an exemplary screen shot of a user interface for managing user settings in accordance with exemplary embodiments of the present invention. It shows the user's account name and actual name. It also displays how many people are following the user in addition to how many others the user follows. There are also options to link the user's account to other social networks or media accounts (e.g., for accessing media streaming or downloading services). Linking accounts can comprise receiving and storing at the video clip platform computer system 104 user login credentials for each account.

Figure 22:
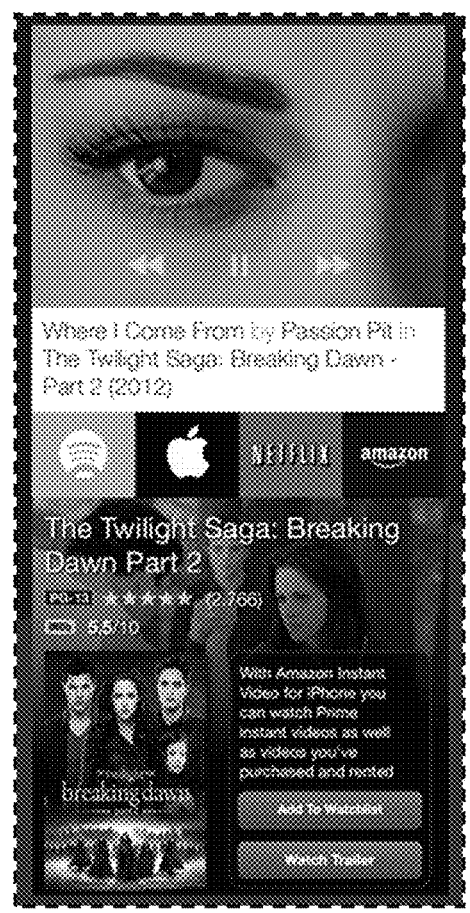
FIG. 22 is an exemplary screen shot of a user interface for viewing and purchase options associated with a video clip representation in accordance with exemplary embodiments of the present invention.

FIG. 22 is an exemplary screen shot of a user interface for viewing and purchase options associated with a video clip representation in accordance with exemplary embodiments of the present invention. FIG. 22 shows an exemplary interface with media service accounts, such as media streaming services and/or media download services. The graphical user interface includes elements corresponding to options to watch a trailer of a movie corresponding to a video clip or to add the movie to a queue (e.g., the watch list). The queue may be located within the particular media service.

Figure 23:
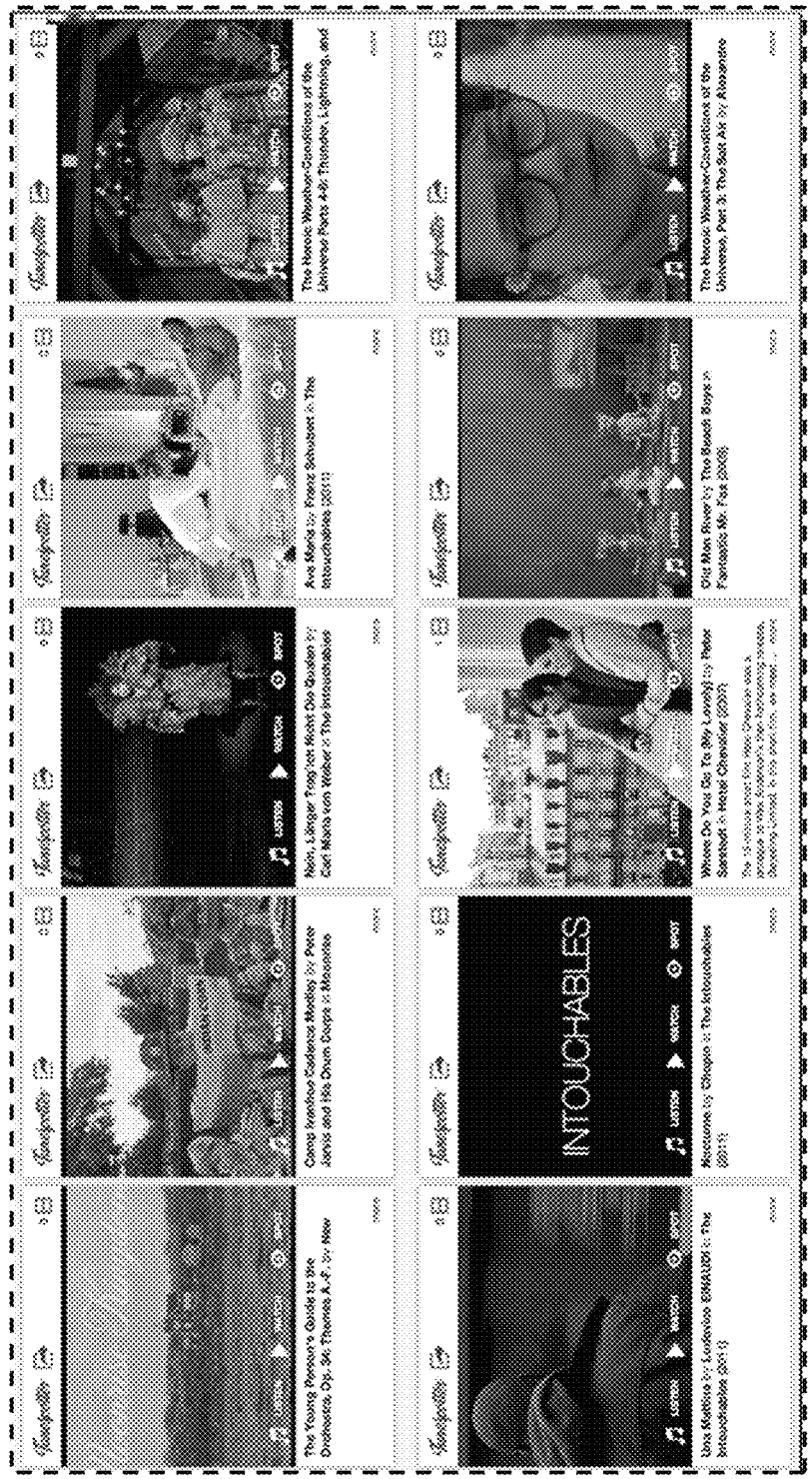
FIG. 23 is an exemplary screen shot of a user interface for displaying video clip representations in accordance with exemplary embodiments of the present invention.

FIG. 23 is an exemplary screen shot of a user interface for displaying video clip representations in accordance with exemplary embodiments of the present invention. FIG. 23 shows a screen which displays all the results for a specific search, such as a search for Wes Anderson films.

Figure 24:
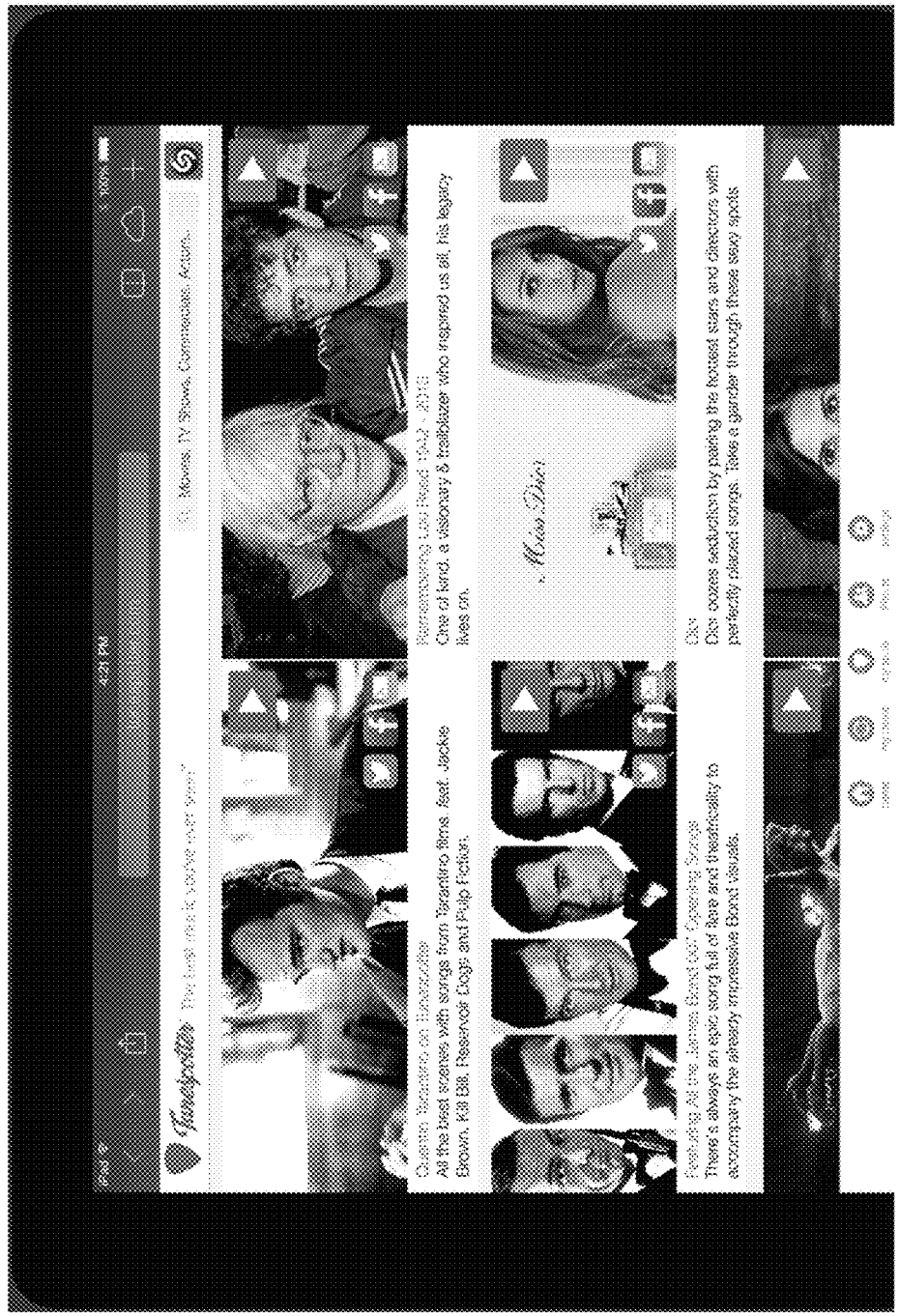
FIG. 24 is an exemplary screen shot of a user interface for displaying collections of video clip representations in accordance with exemplary embodiments of the present invention.

FIG. 24 is an exemplary screen shot of a user interface for displaying collections of video clip representations in accordance with exemplary embodiments of the present invention. In embodiments, system administrators may curate playlists of video clip representations or decks of video clip cards, which may be displayed in a curated section of a website or application for interfacing with the video clip platform. Playlists of video clip representations may be shared in the same manner as sharing individual video clip representations.

FIGS. 25A-F are exemplary screen shots of user interfaces for displaying video clip representations by category in accordance with exemplary embodiments of the present invention.

Figure 25A:
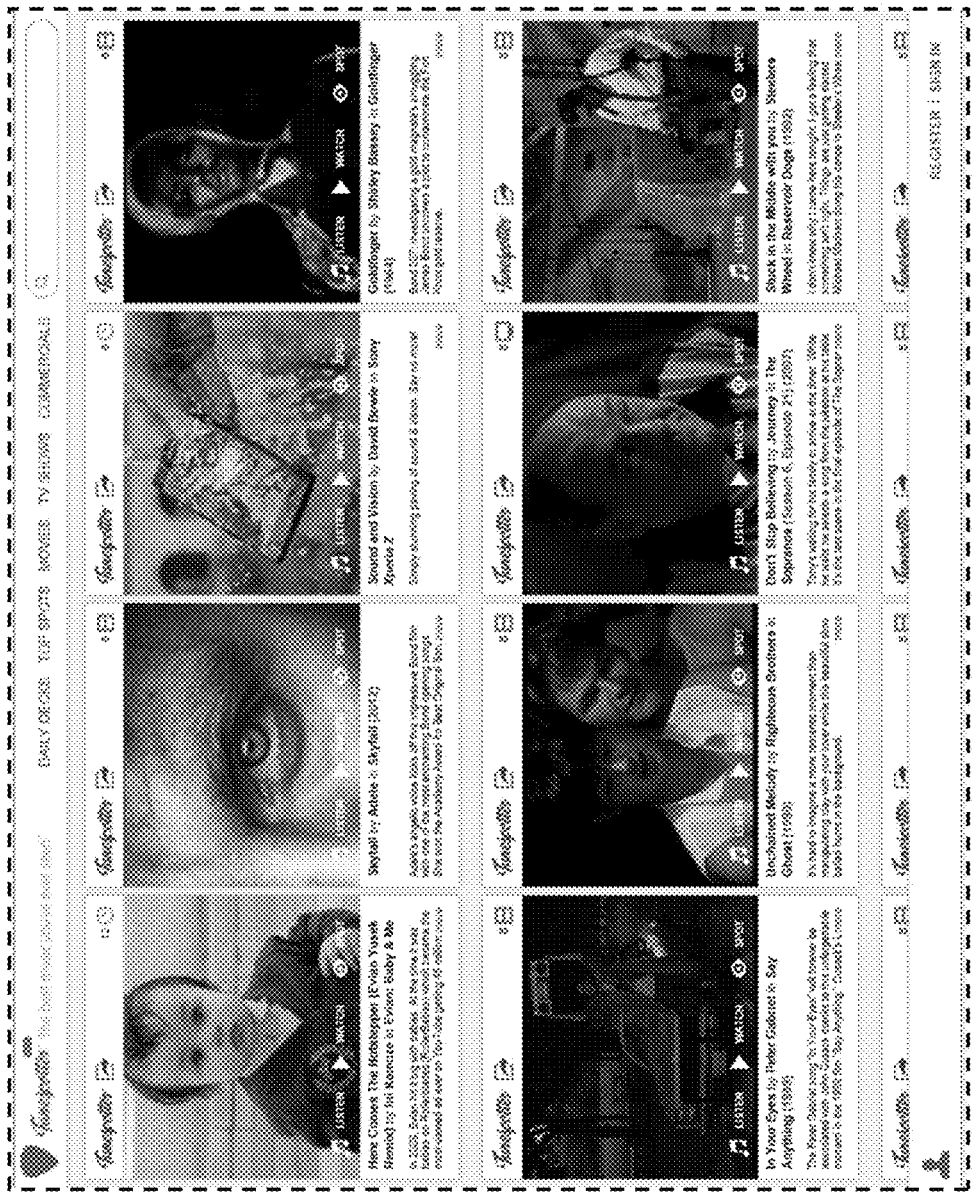
FIGS. 25A-F are exemplary screen shots of user interfaces for displaying video clip representations by category in accordance with exemplary embodiments of the present invention.
Figure 25B:
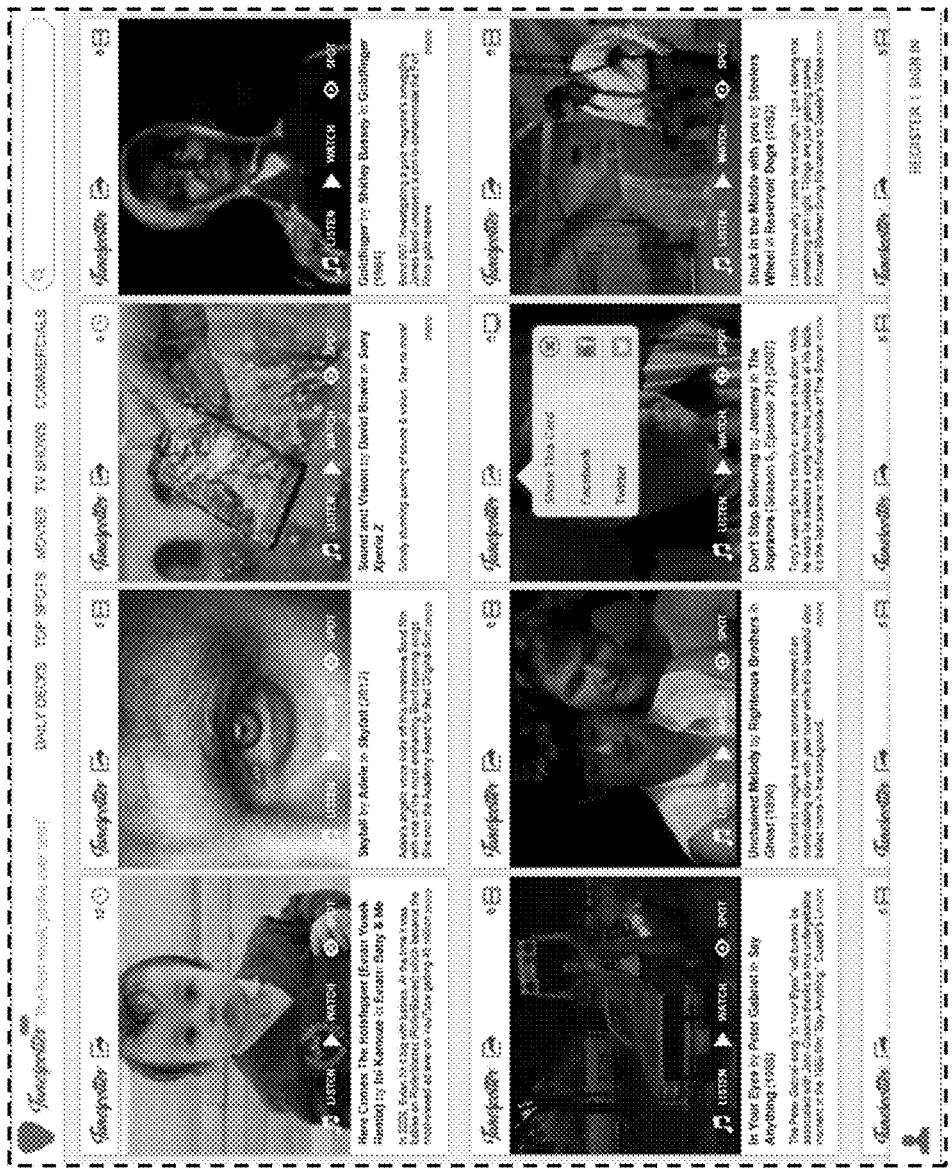
Figure 25C:
Figure 25D:
Figure 25E:
Figure 25F:
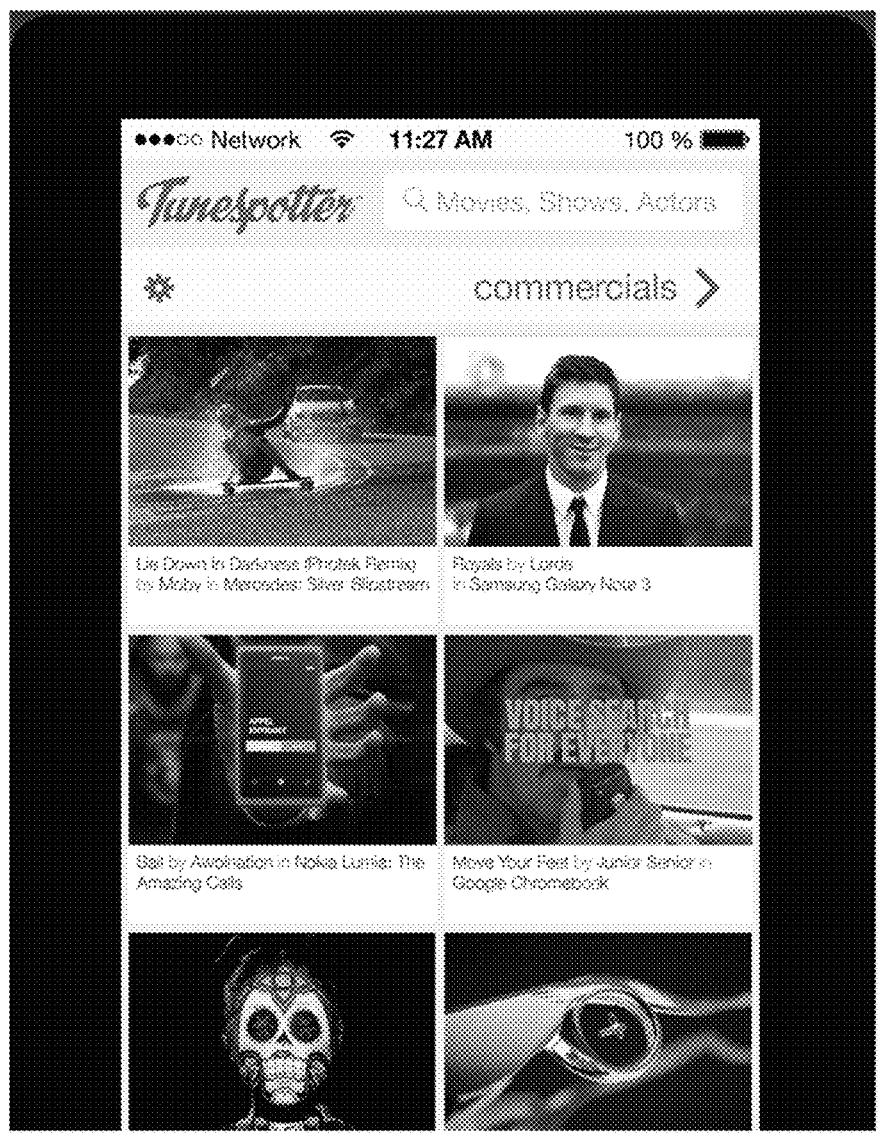

FIG. 25A is an exemplary screen shot illustrating a plurality of exemplary video clip representations. Video clip representations may contain a preview (e.g., an extracted image) of a video clip, metadata associated with the video clip (e.g., artist, title, album, title of larger work containing the clip), and/or interaction options (e.g., a play option, save option, comment option, share option, get more information option), to name a few. Video clip representations may be electronic video cards, which may be saved, shared, and/or posted elsewhere (e.g., on a social media platform). FIG. 25B is an exemplary screen shot illustrating the ability to share a video clip representation via social media. FIGS. 25C-F are exemplary screen shots illustrating the ability to display video clip representations filtered by media variety (e.g., movies in FIG. 25C, TV shows in FIG. 25D, commercials in FIG. 25E and FIG. 25F).

Figure 26A:
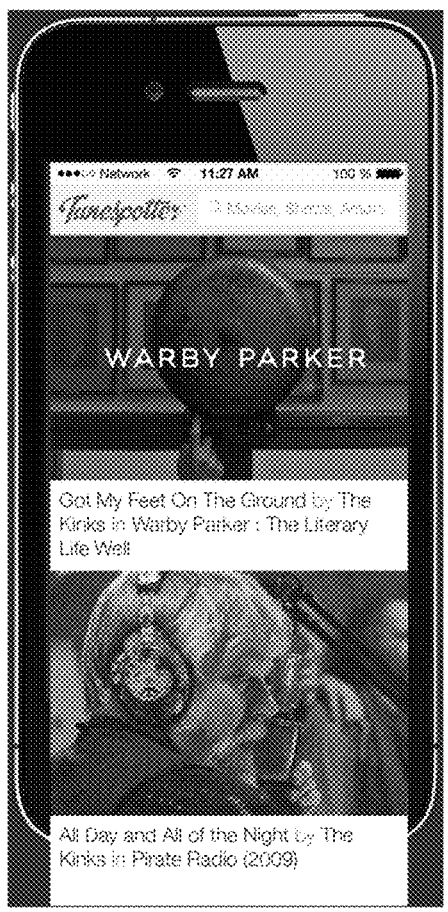
FIGS. 26A-C are exemplary screen shots of user interfaces for displaying streams of video clip representations in accordance with exemplary embodiments of the present invention.
Figure 26B:
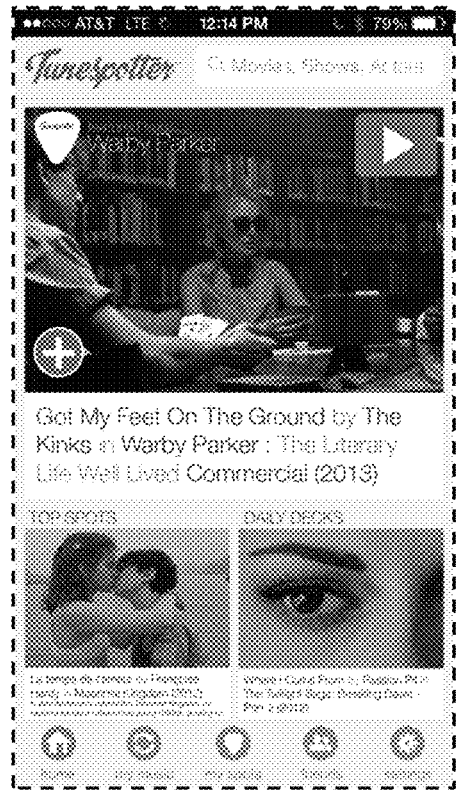
Figure 26C:

FIGS. 26A-C are exemplary screen shots of user interfaces for displaying streams of video clip representations in accordance with exemplary embodiments of the present invention. Display streams of video clip representations can comprise a plurality of video clip representations, which may be a scrollable list. The stream can include video clip representations that have been shared, saved, and/or viewed by other users (e.g., other users being electronically followed by the user whose stream is described). The stream can also include advertisements and/or sponsored content, most popular video clip representations, most viewed video clip representations, highest rated video clip representations, most saved within a time period, and/or video clip representations related to a particular topic, such as the Oscars.

In embodiments, the video clip system can monitor new video clip representations to determine automatically whether to add the video clip representations to a user's stream. For example, a user may set an option to include all video clip representations related to a particular artist. A stream may be tailored to a user based upon a user's past interactions with other video clip representations (e.g., searches, views, and/or saves of video clip representations) and/or based upon a user's musical library.

Figure 27A:
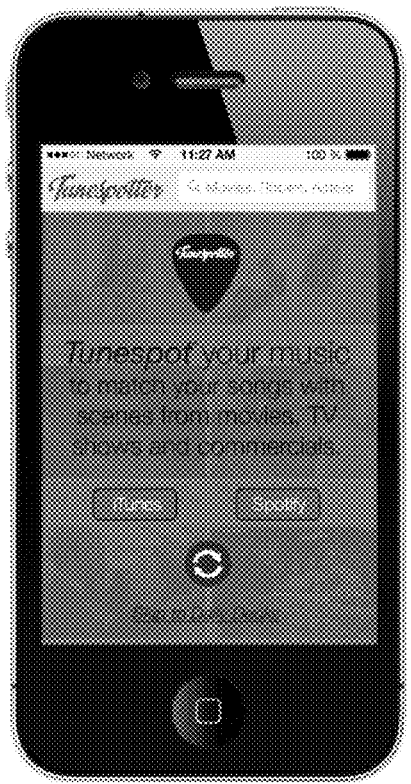
FIGS. 27A-D are exemplary screen shots of user interfaces for syncing a collection of copies of audio works to corresponding video clip representations in accordance with exemplary embodiments of the present invention.
Figure 27B:
Figure 27C:
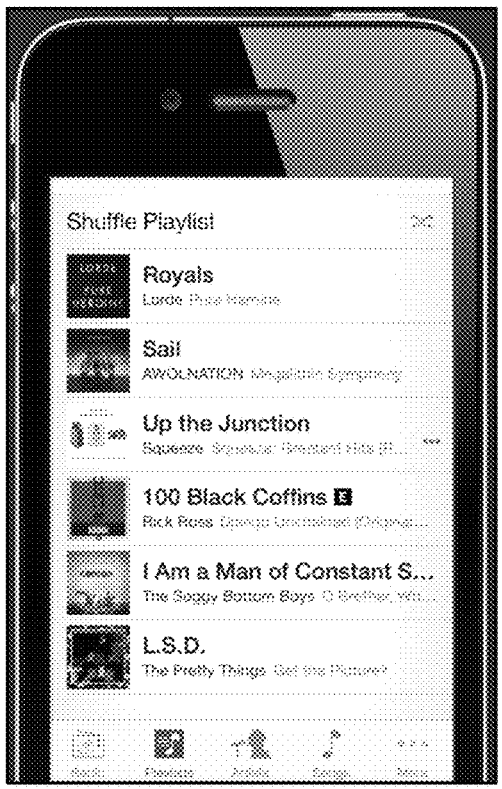
Figure 27D:

FIGS. 27A-D are exemplary screen shots of user interfaces for syncing a collection of copies of audio works to corresponding video clip representations in accordance with exemplary embodiments of the present invention. FIG. 27A shows the user interface for selecting a particular media source (e.g., iTunes, Spotify) hosting an audio work library to sync to video clips. FIG. 27B shows a synced library of video clip representations corresponding to a user's own musical libraries. The navigation bar at the bottom of the display screen comprises a badge notification that the user's musical library comprises 86 audio works that are synced to video clips. FIG. 27C shows a playlist from the media source that can be synced. A user can select one or more particular playlists, one or more particular albums, audio works from one or more particular artists, and/or one or more particular songs to sync. FIG. 27D shows the exemplary audio playlist of FIG. 27C after syncing to video clips. Each video clip is depicted as a graphical video clip representation.

Figure 28A:
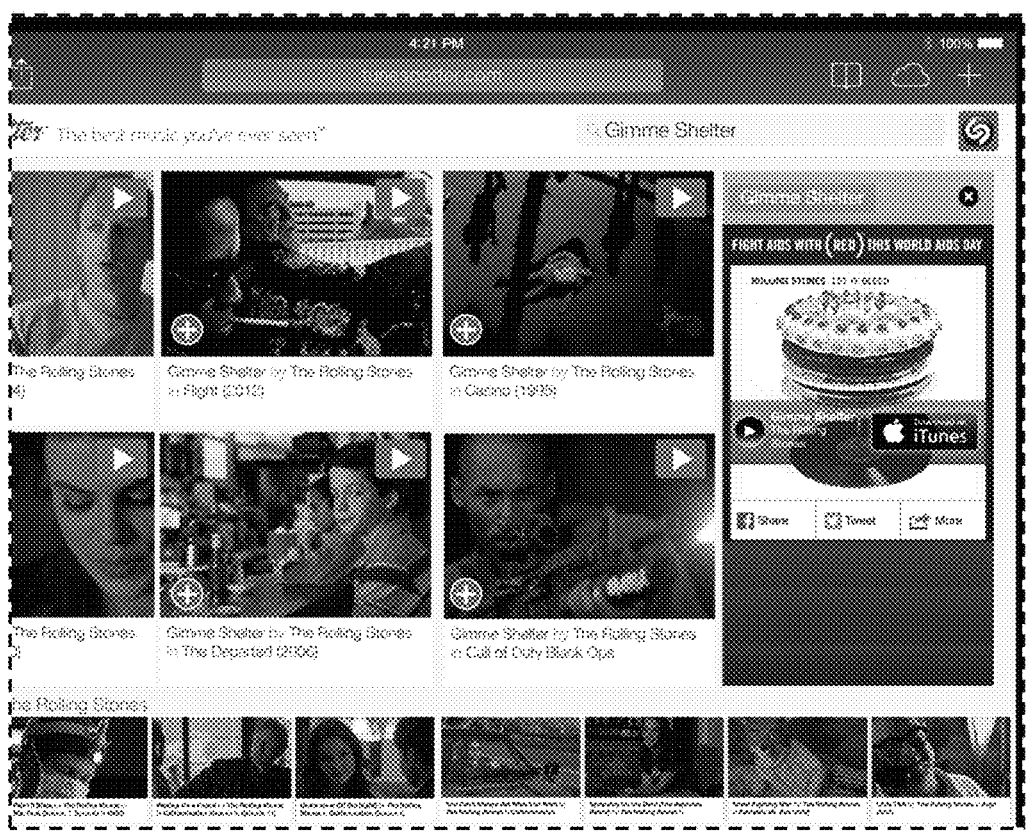
FIGS. 28A-J are exemplary screen shots of user interfaces for performing searches for video clip representations in accordance with exemplary embodiments of the present invention.
Figure 28B:
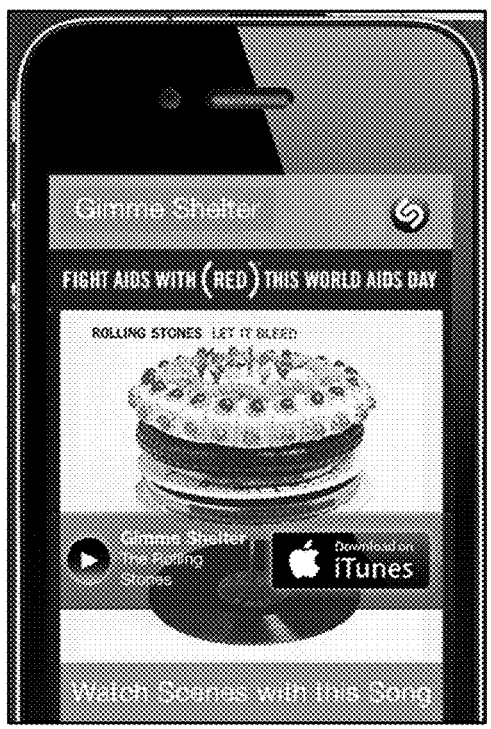

FIGS. 28A-J are exemplary screen shots of user interfaces for performing searches for video clip representations in accordance with exemplary embodiments of the present invention. FIGS. 28A-B show the integration of an audio identification computer system (e.g., Shazam). An audio identification computer system may be a third-party computer system. An audio search may determine a song name, which may be searched on the video clip platform computer system to return one or more corresponding video clips, each shown as a video clip representation. FIGS. 28C, 28D, 28F, 28G, 28H, 28I and 28J shows search results from various queries.

Figure 28C:

FIG. 28C shows a search for a company or product type, e.g., Dior. Commercials related to Dior products that contain video clips comprising audio works are returned in the search results. Search result indicator 2822 may show the number of video clip representations that are returned as search results.

Figure 28D:
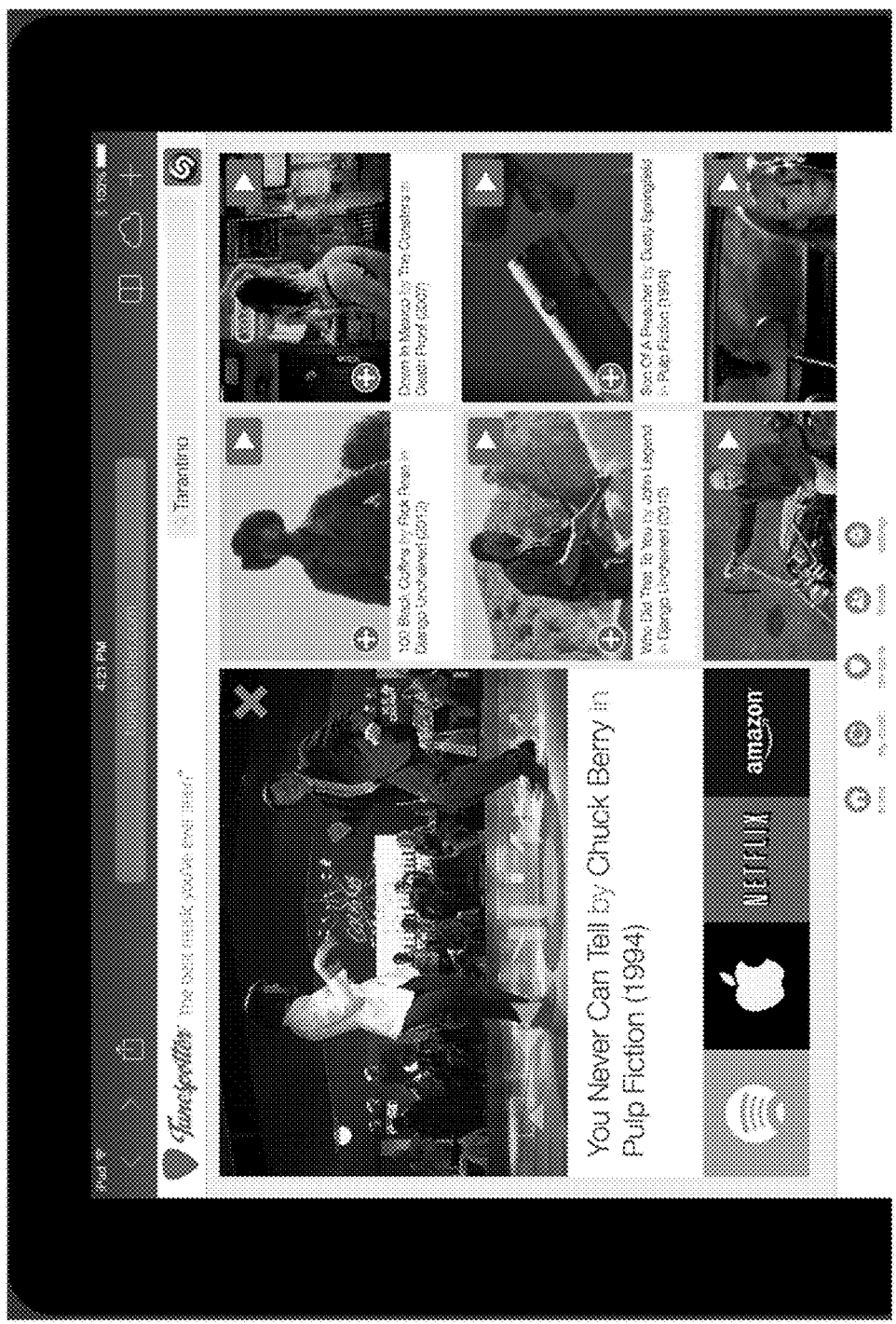

FIG. 28D shows search results for a query of an individual's name, e.g., Tarantino, who may be a movie director, movie producer, and/or actor in various video works. Video clips corresponding to video works associated with the individual are returned in the search results and displayed as graphical video clip representations.

Figure 28E:
Figure 28F:
Figure 28G:
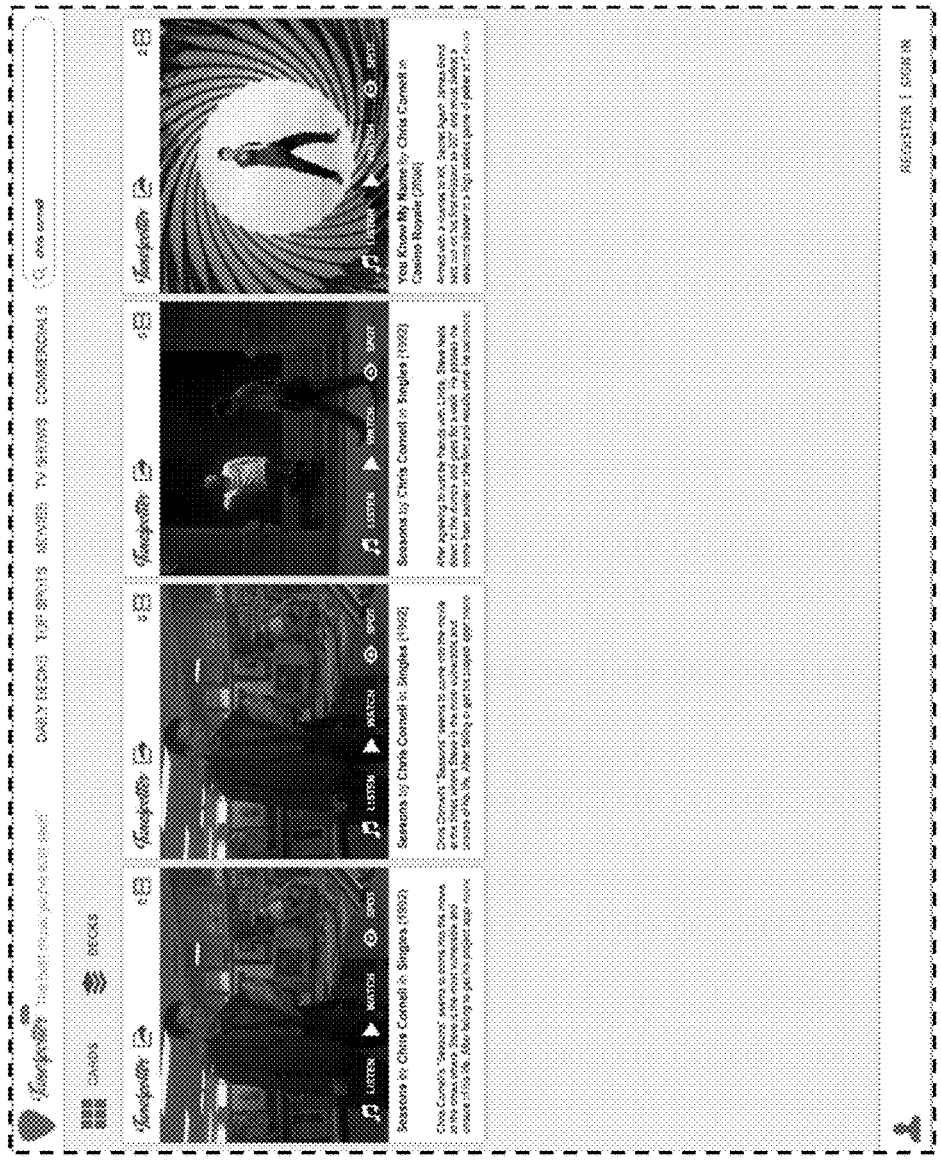

FIGS. 28F-G show search results for musical artists, e.g., Bob Dylan, Chris Cornell. Musical artists can include performers, singers, and/or song writers, to name a few.

Figure 28H:
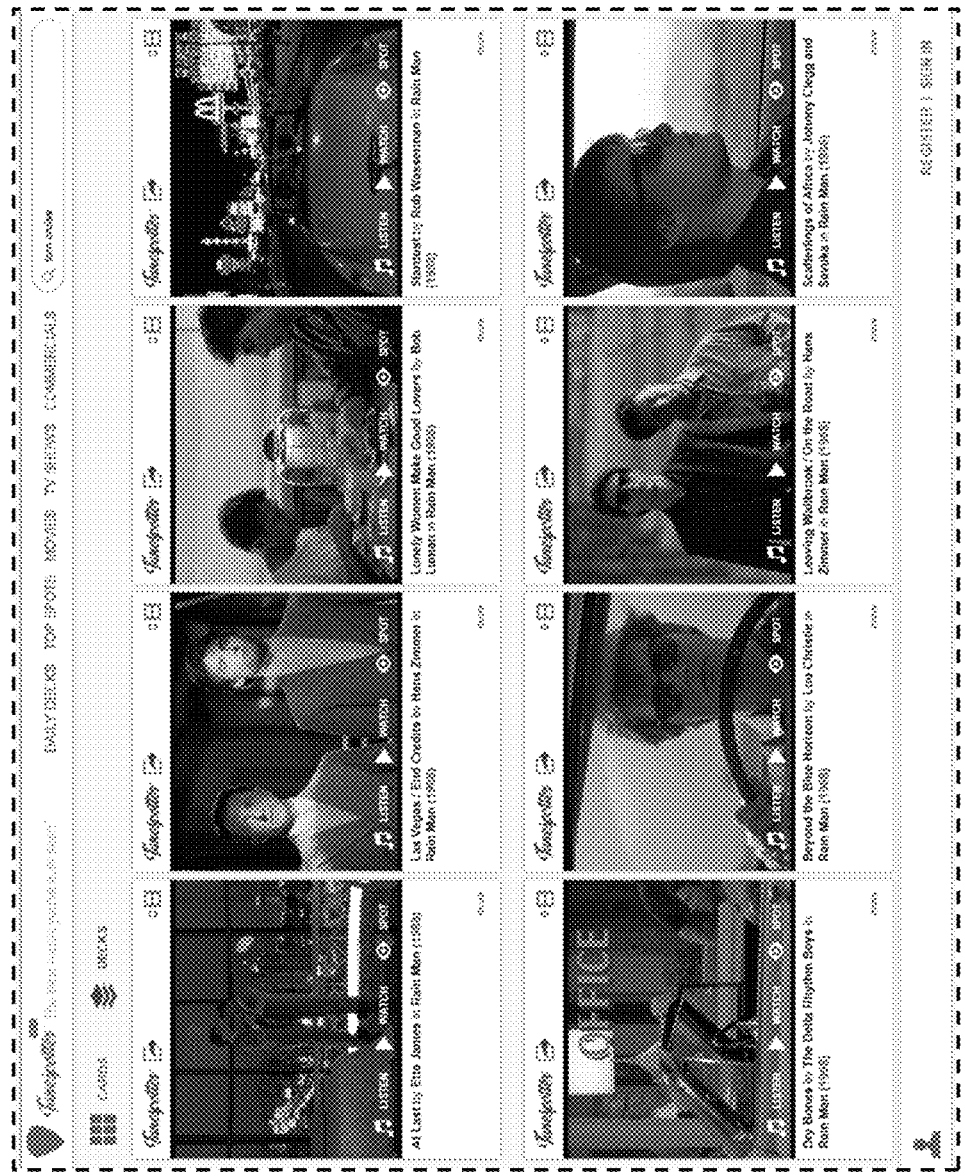

FIG. 28H shows search results for an actor, e.g., Tom Cruise. Video clips that are excerpts from video works (e.g., films) in which Tom Cruise appeared are returned in the search results. In embodiments, only video clips actually showing the particular actor may be returned.

Figure 28I:
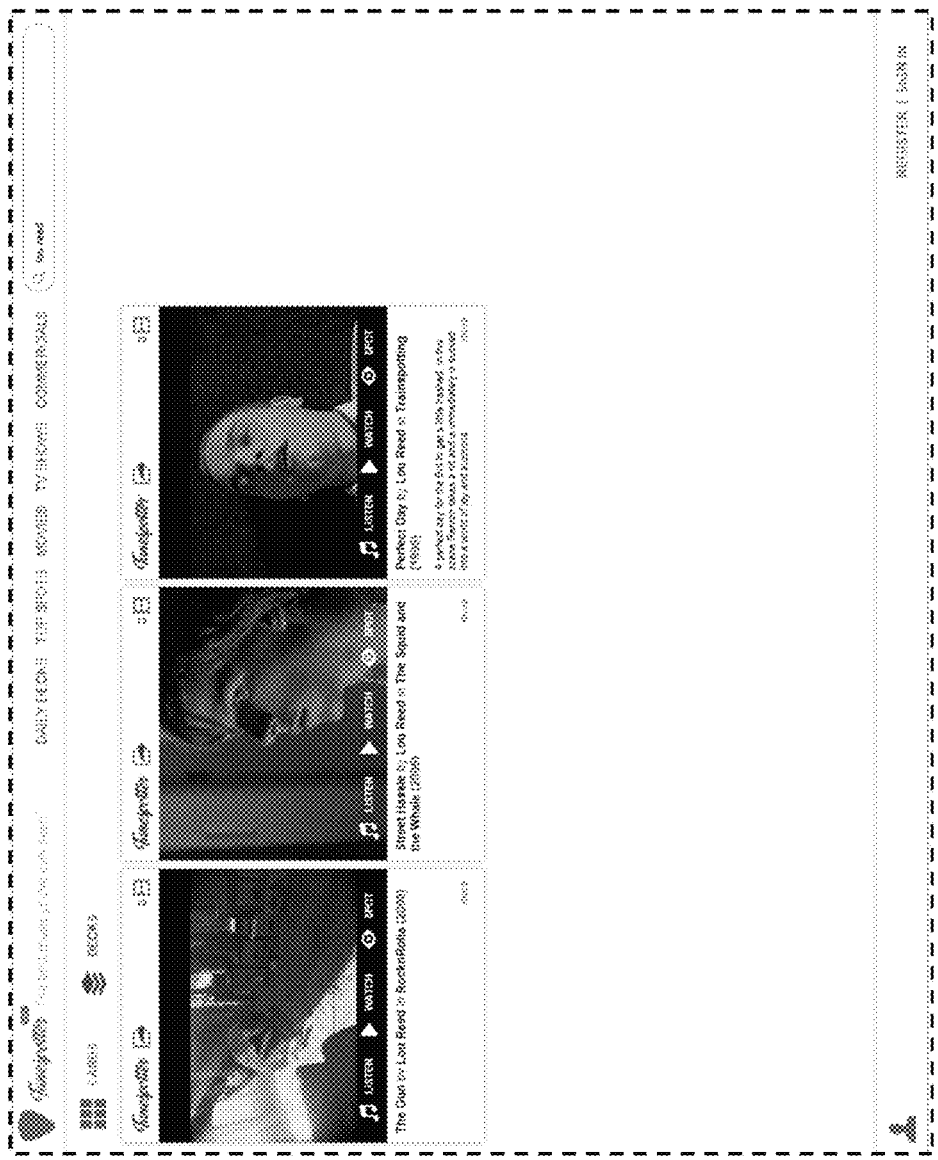
Figure 28J:
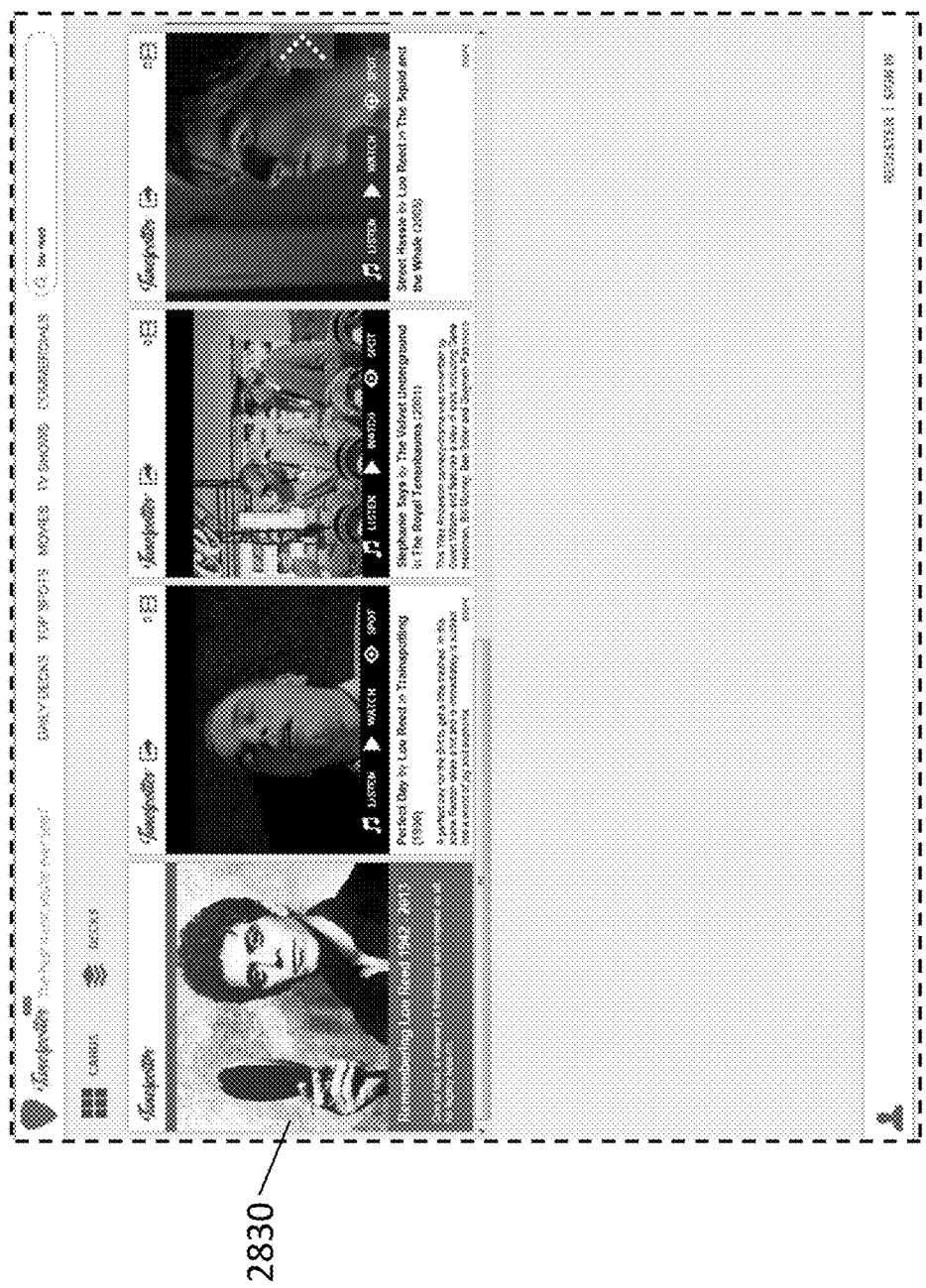

FIGS. 28I-J show different displays of graphical video clip representations. In FIG. 28I, graphical video clip representations are shown as individual video cards. FIG. 28J shows a deck or collection of video clip representations related to the search query, e.g., Lou Reed. Element 2830 is an exemplary collection cover, serving as a front page for a collection and providing information about the collection, such as a collection title, collection description, and/or indication of the number of video clips in the collection. The graphical video clip representations to the right of element 2830 show the video clips in the collection. In embodiments, collection contents may be accessed by selecting the collection cover 2830.

Referring to FIG. 28E, search requests may be submitted by selecting metadata provided as part of a video clip representation. For example, using a user electronic device the name Dior may be selected (e.g., clicked or touched on a touch screen device) from a video clip representation of an advertisement for Dior. In response to the query for "Dior" the user electronic device may display a plurality video clip representations corresponding to Dior advertisements. The user may select an artist, e.g., "Marvin Gaye," from another video clip representation that is one of the search results. In response to such a query, the user electronic device may perform another search for "Marvin Gaye" and display one or more video clip representations associated with the artist. From those search results, the user may select a movie title, e.g., "Jerry Maguire," from a video clip representation corresponding to a movie excerpt containing a Marvin Gaye song. The resulting search may lead to a display of one or more video clip representations from the movie. In like fashion, users may submit electronic search requests based upon any metadata displayed as part of a video clip representation.

Figure 29A:
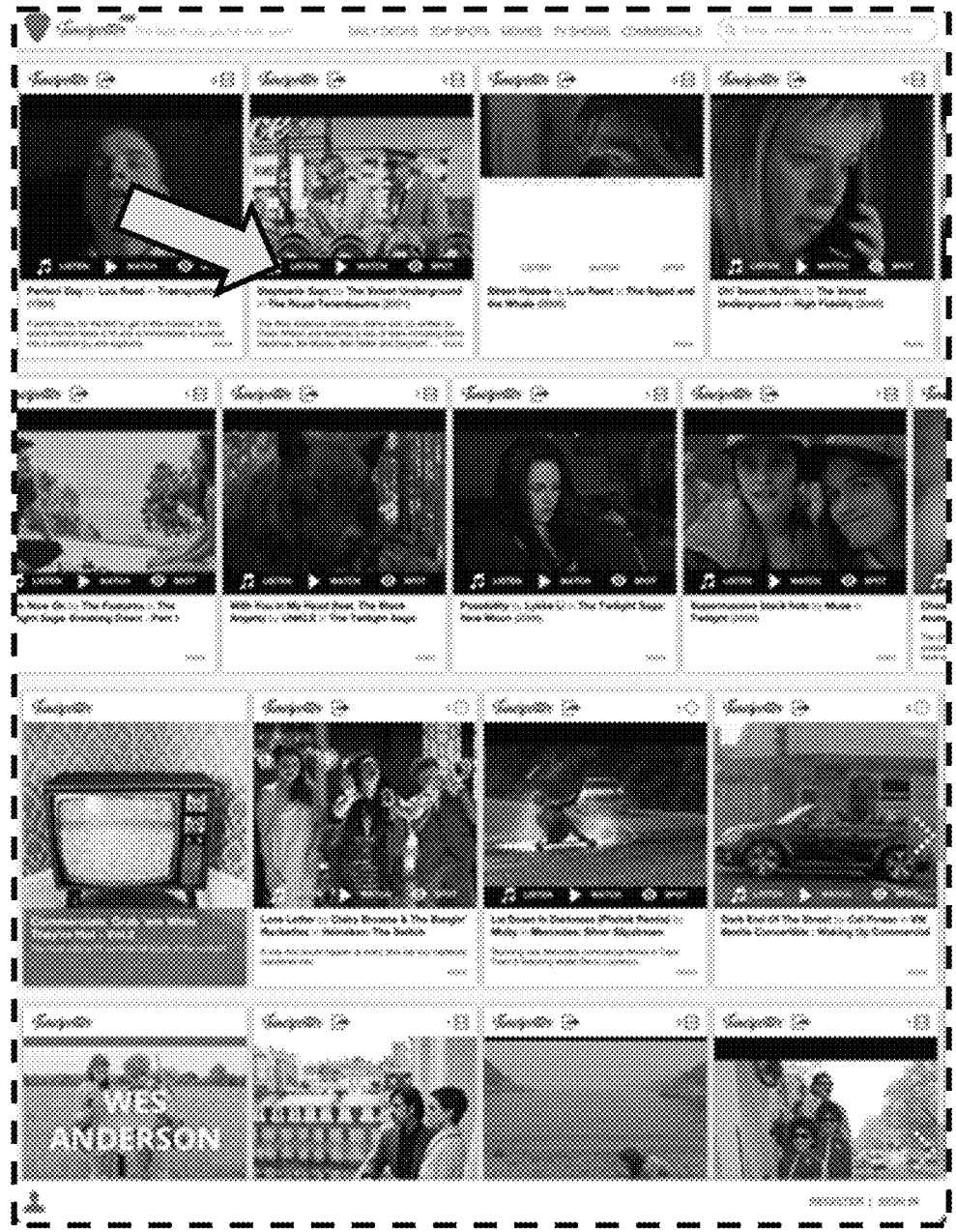
FIGS. 29A-B are exemplary screen shots of user interfaces for performing searches for video clip representations in accordance with exemplary embodiments of the present invention.
Figure 29B:
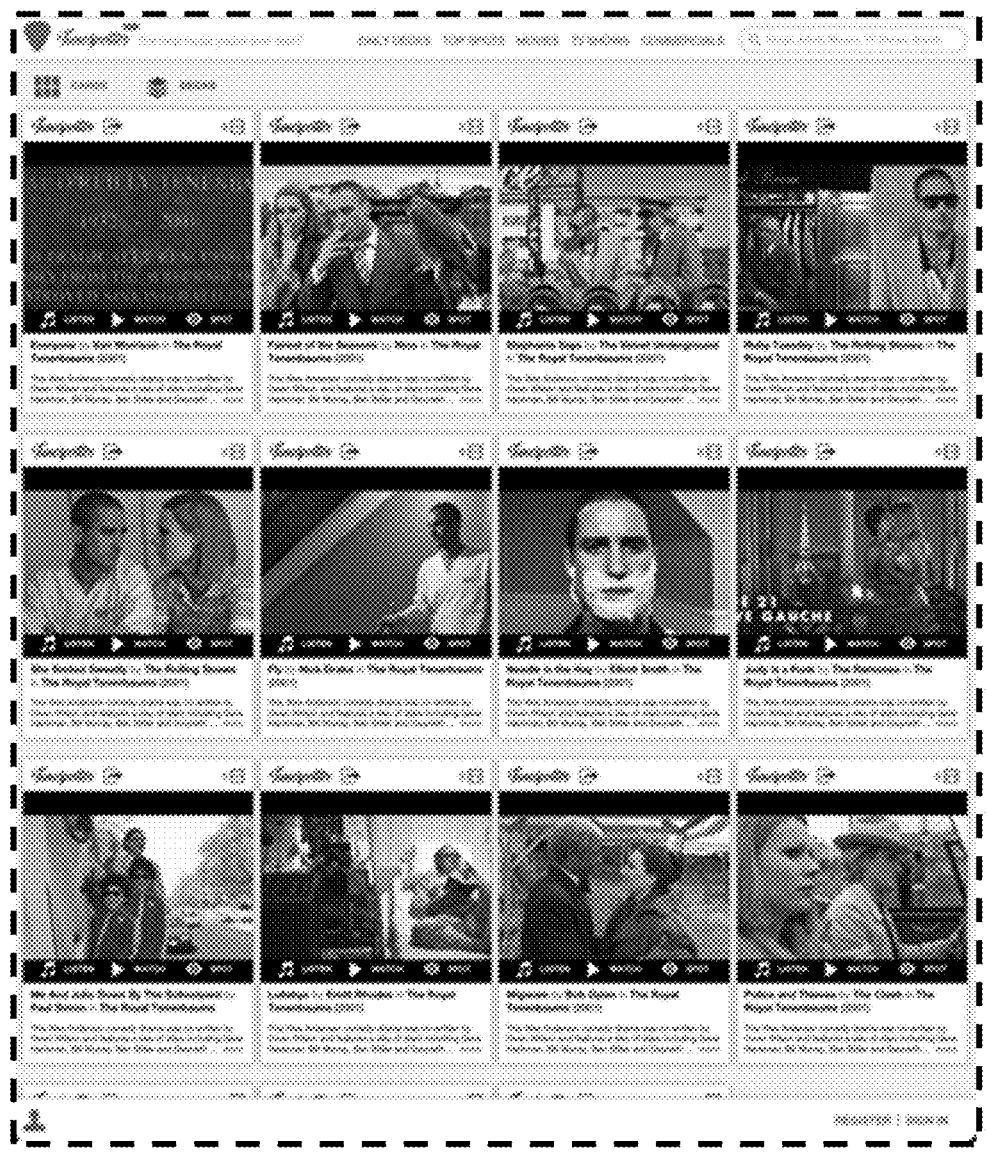

FIGS. 29A-B are exemplary screen shots of user interfaces for performing searches for video clip representations in accordance with exemplary embodiments of the present invention. Both figures show search results as a series of video clip representations. Action icons are included in each video clip representation to listen to the clip, watch the clip, or save (e.g., spot) the clip. In FIG. 29A, video clip identification information may be selected to perform a search with a search query based on and/or comprising the video clip identification information. For example, selecting "The Royal Tenenbaums" may return video clips associated with The Royal Tenenbaums movie. Accordingly, FIG. 29B shows search results related to "The Royal Tenenbaums".

Figure 30A:
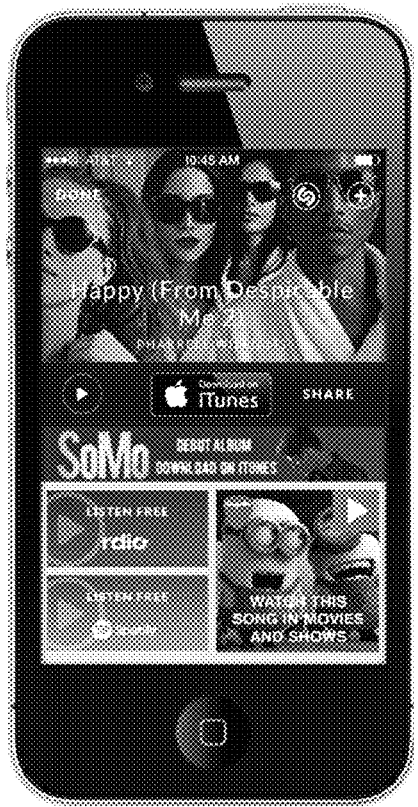
FIGS. 30A-C are exemplary screen shots of user interfaces for viewing video clips associated with video clip representations in accordance with exemplary embodiments of the present invention.
Figure 30B:
Figure 30C:
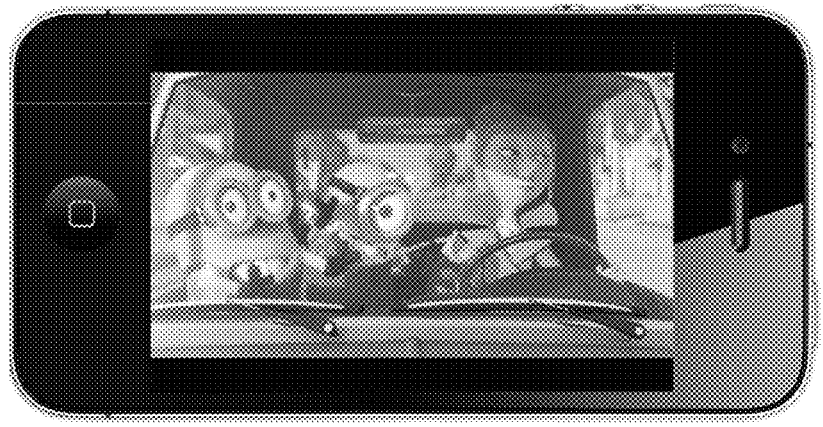

FIGS. 30A-C are exemplary screen shots of user interfaces for viewing video clips associated with video clip representations in accordance with exemplary embodiments of the present invention. FIG. 30A shows results from a search interface with an audio identification computer system. The audio identification computer system may provide audio work information, e.g., based upon a portion of an audio work that comprises an audio search query. FIG. 30B shows a graphical video clip representation for a video clip corresponding to an audio work identified by the audio identification computer system. The electronic display includes music and/or video service options, which may be selected to access music or video streaming and/or download services from which the song or the video work that contains the video clip may be accessed, purchased, streamed, downloaded, and/or played. FIG. 30C shows a video clip displayed on a user electronic device, which video clip corresponds to the song from the audio identification computer system. The video clip may be displayed in response to a user selection of a video control element, such as a video clip play option. In embodiments, the video work that contains the video clip may be displayed after it is obtained from a video service.

Figure 31C:
FIGS. 31A-D are exemplary screen shots of user interfaces for accessing third-party services related to video clip representations in accordance with exemplary embodiments of the present invention.
Figure 31B:
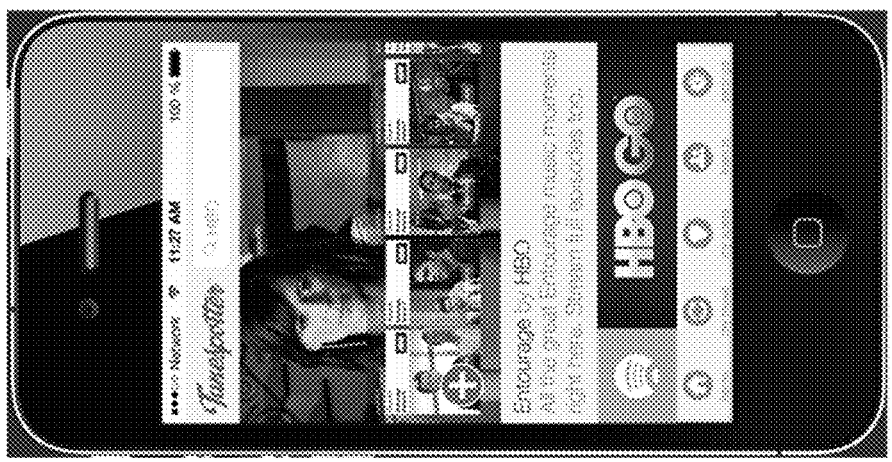
Figure 31A:
Figure 31D:
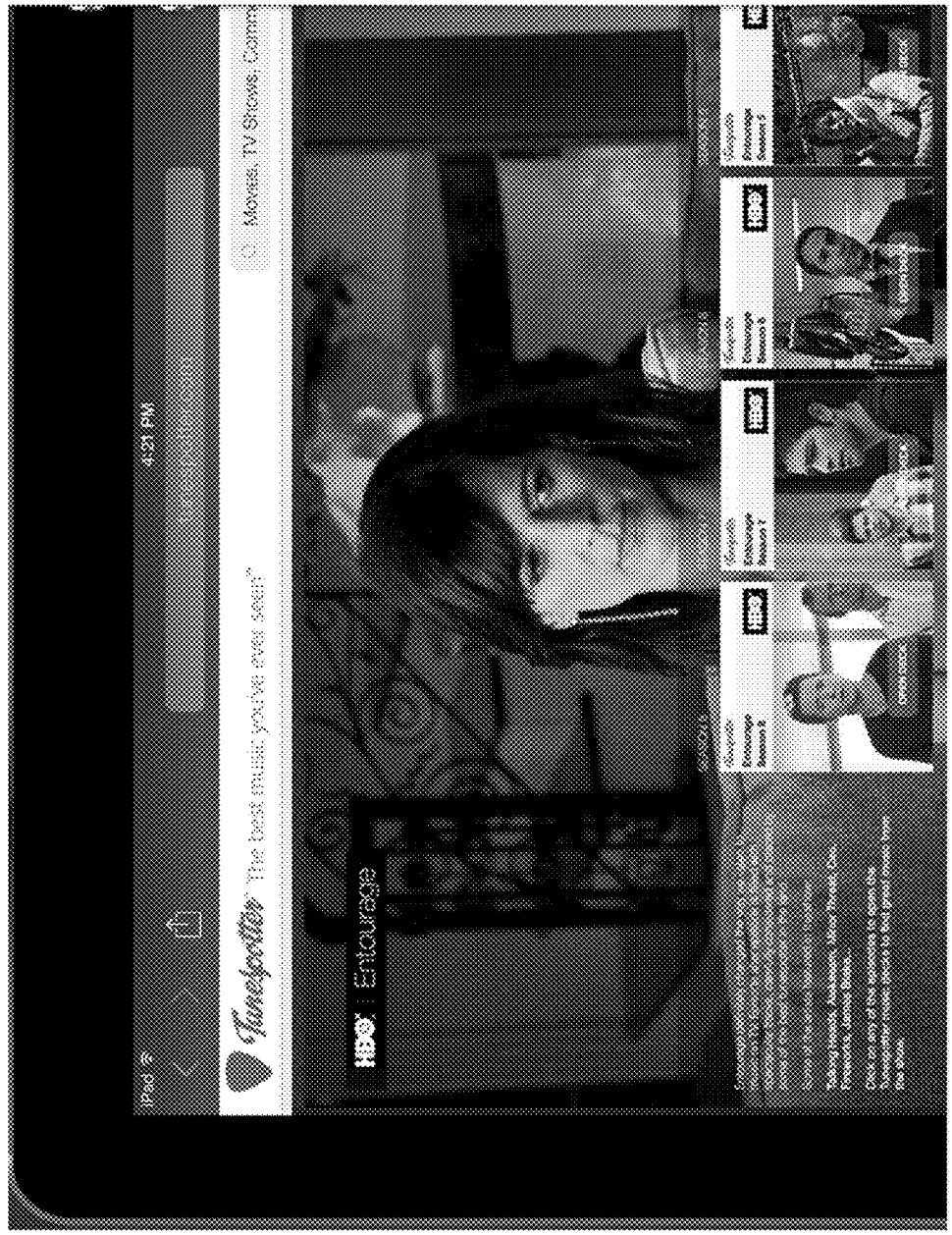

FIGS. 31A-D are exemplary screen shots of user interfaces for accessing third-party services related to video clip representations in accordance with exemplary embodiments of the present invention. FIG. 31A shows a particular video clip representation and media service access options (e.g., selectable icons corresponding to different media services, such as Spotify, iTunes, Netflix, and Amazon). FIG. 31B shows a collection of video clip representations for video clips associated with the search query "HBO". A media service access option for an associated media service (e.g., HBO GO) is provided to access video works associated with the video clips. In the example, the collection comprises video clips from a TV series (e.g., "Entourage") produced and/or aired on the network that the search query (e.g., HBO). FIG. 31C shows a music service access option (e.g., Spotify icon) related to a video clip representation that contains an audio work available from the music service. FIG. 31D shows a plurality of related collections, e.g., each collection comprising video clips from a particular season of a television show, such as "Entourage." Graphical collection representations, located in the exemplary embodiment along the bottom of the display screen, may be selected by a user to open the respective collection and view the video clip representations in the collection. In embodiments, media service options may also be provided related to the content of the collection or the content of video clips in the collection.

Figure 32A:
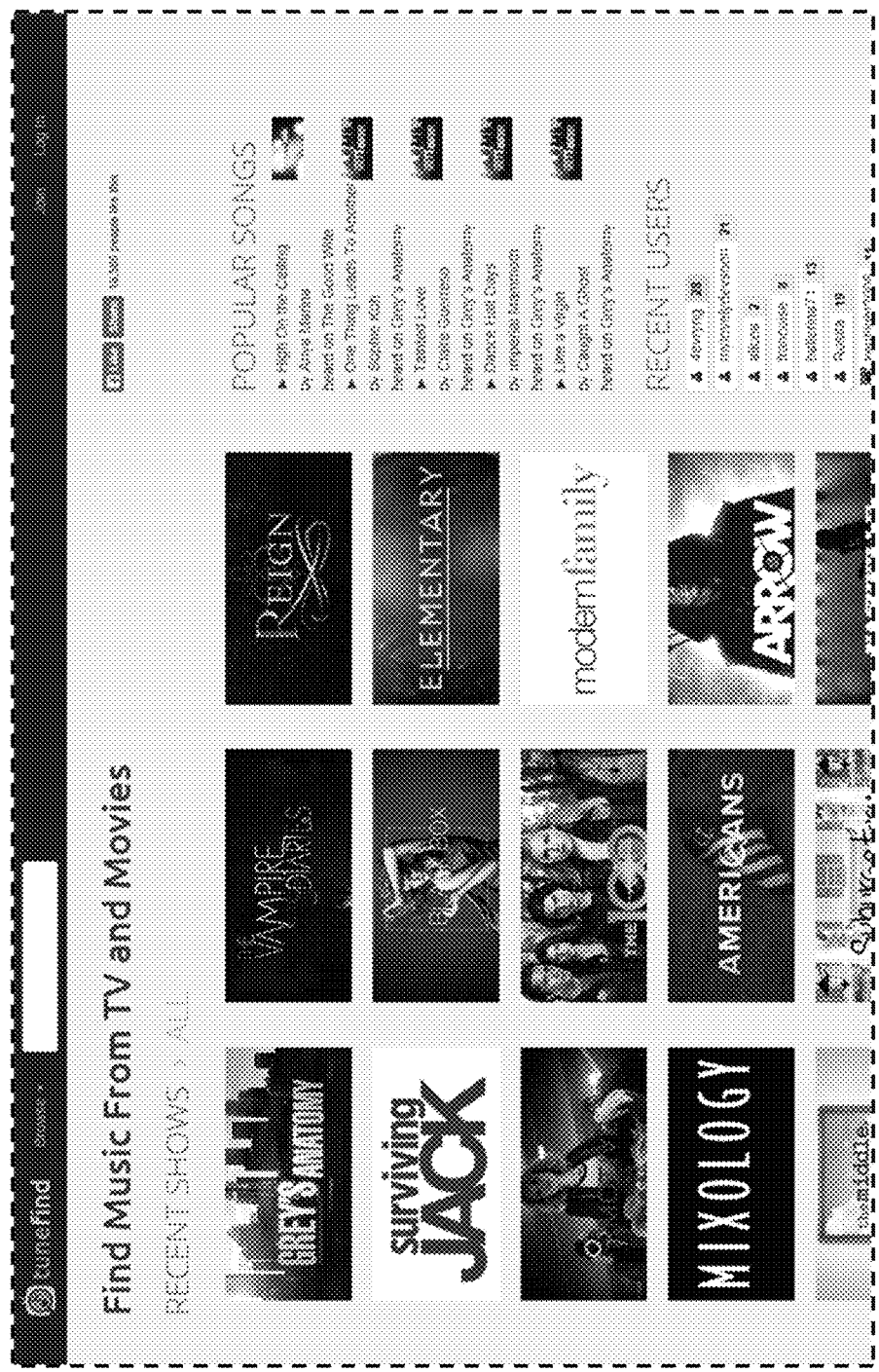
Figure 32B:
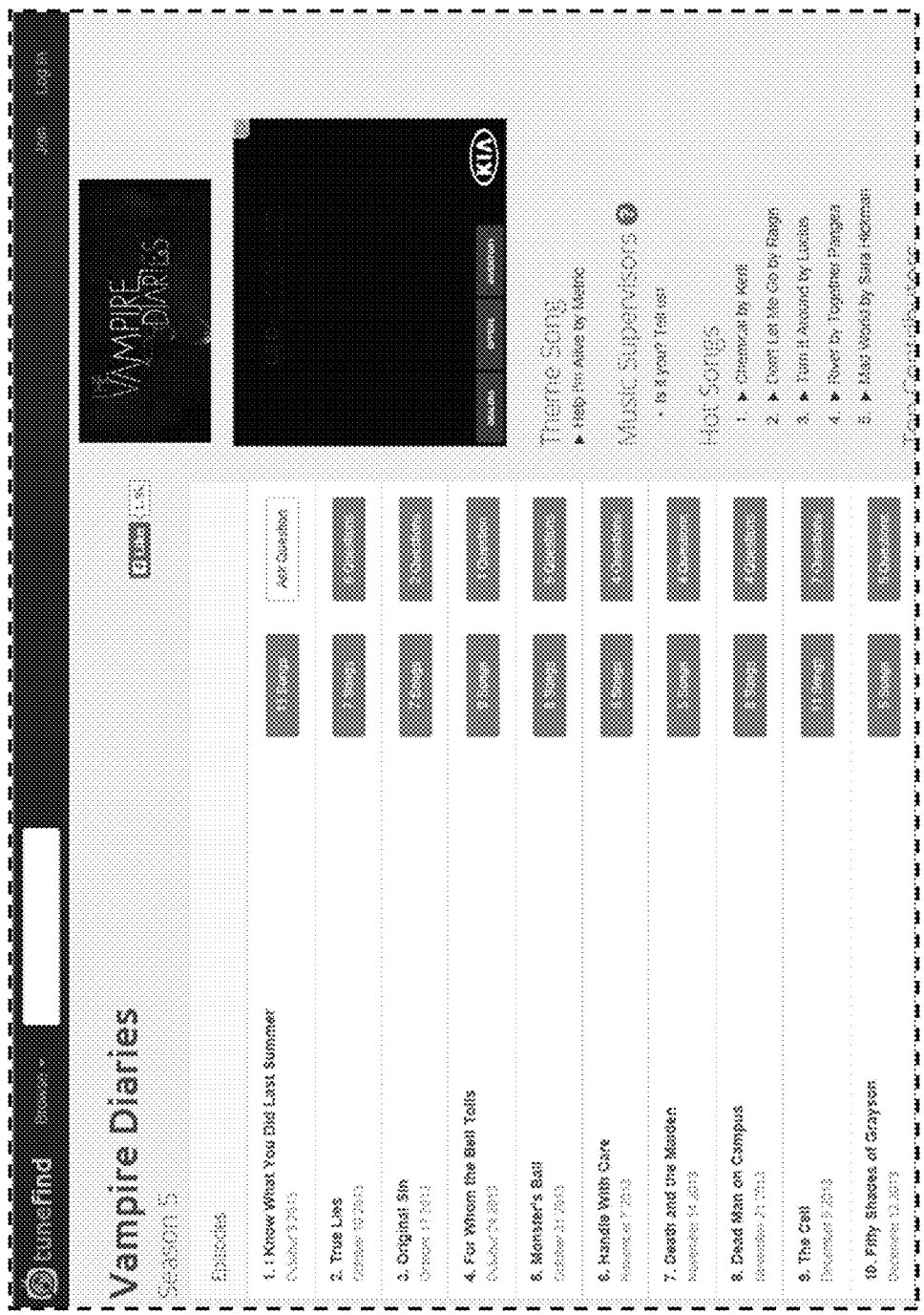
Figure 32C:
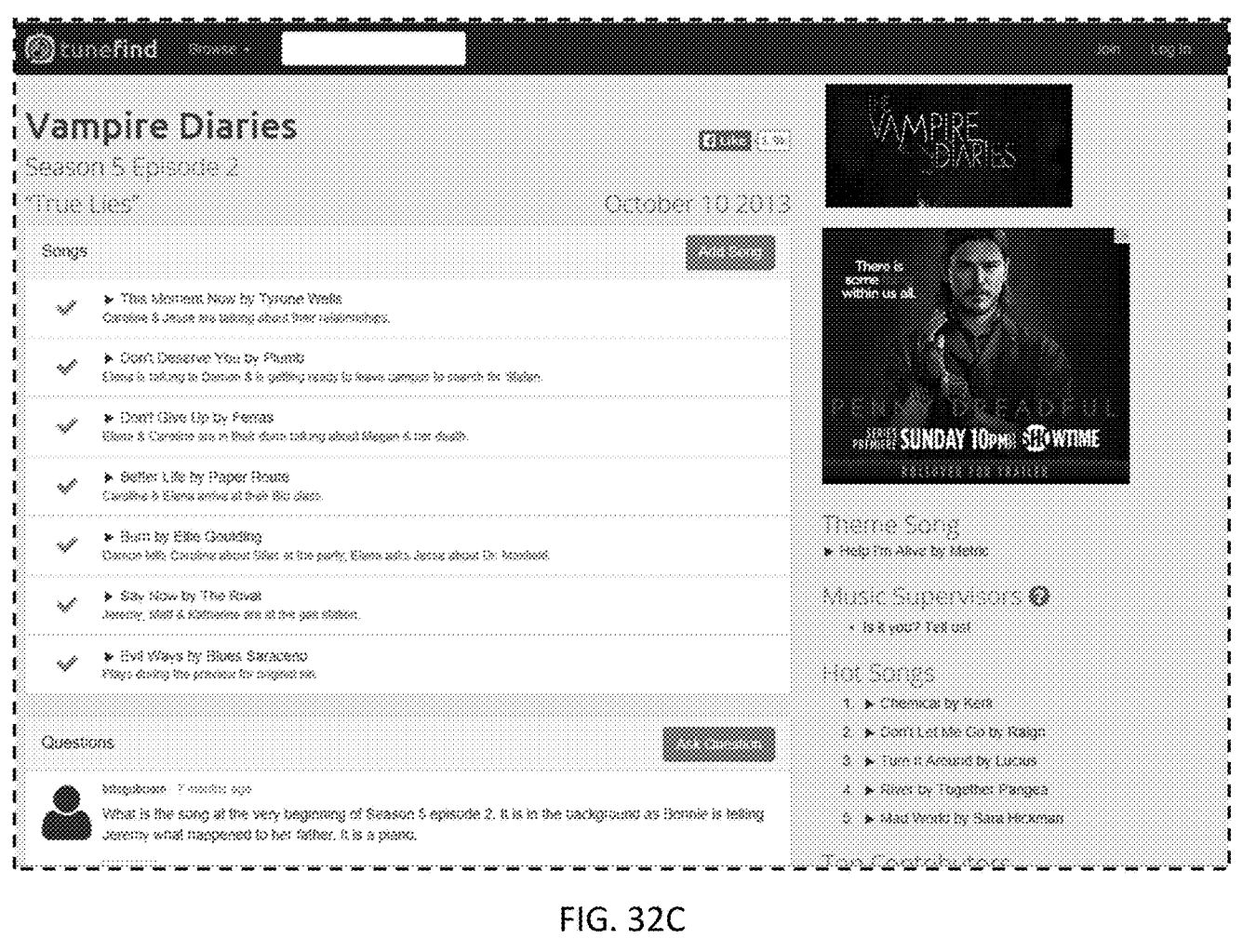
Figure 32D:
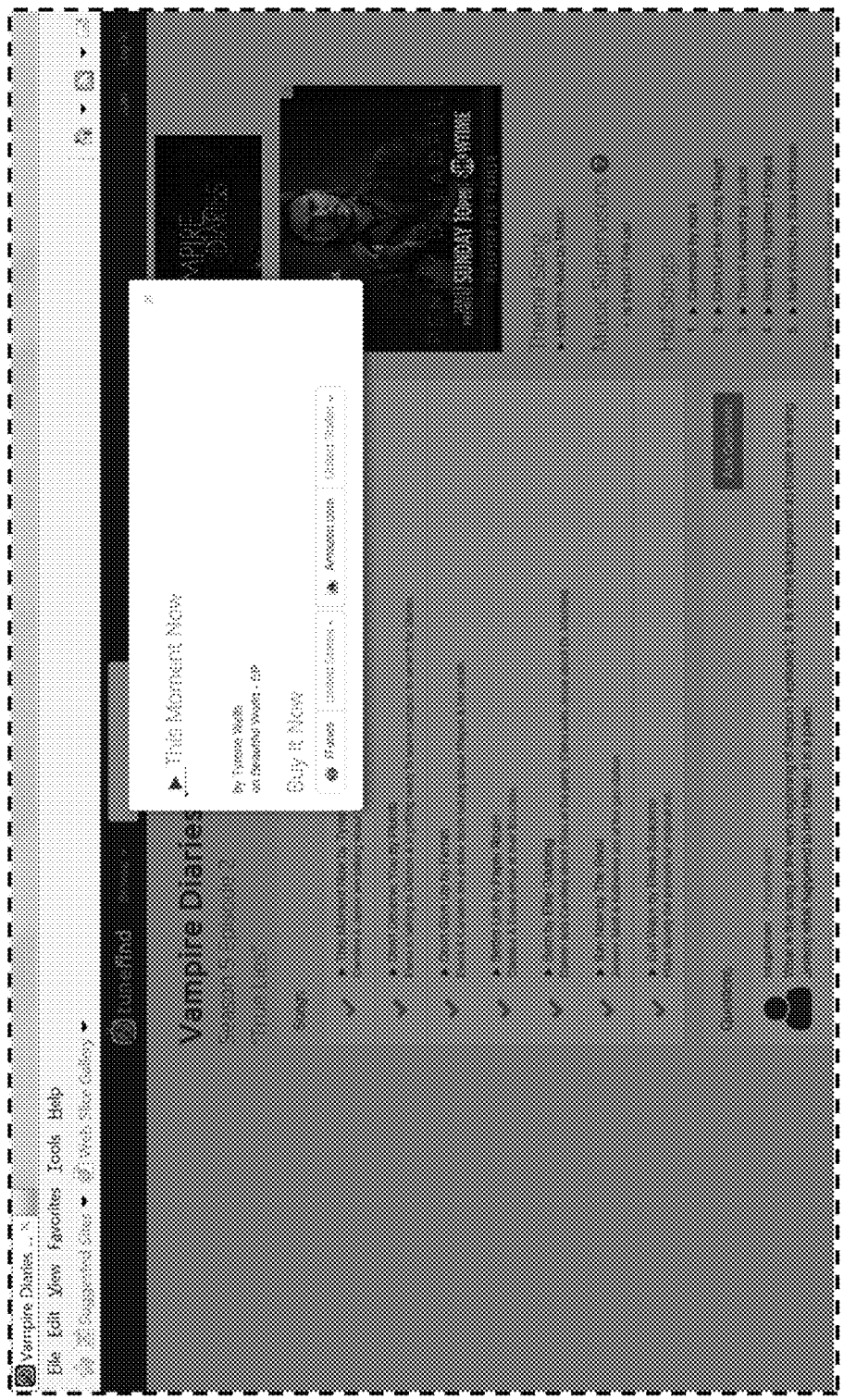
Figure 32E:
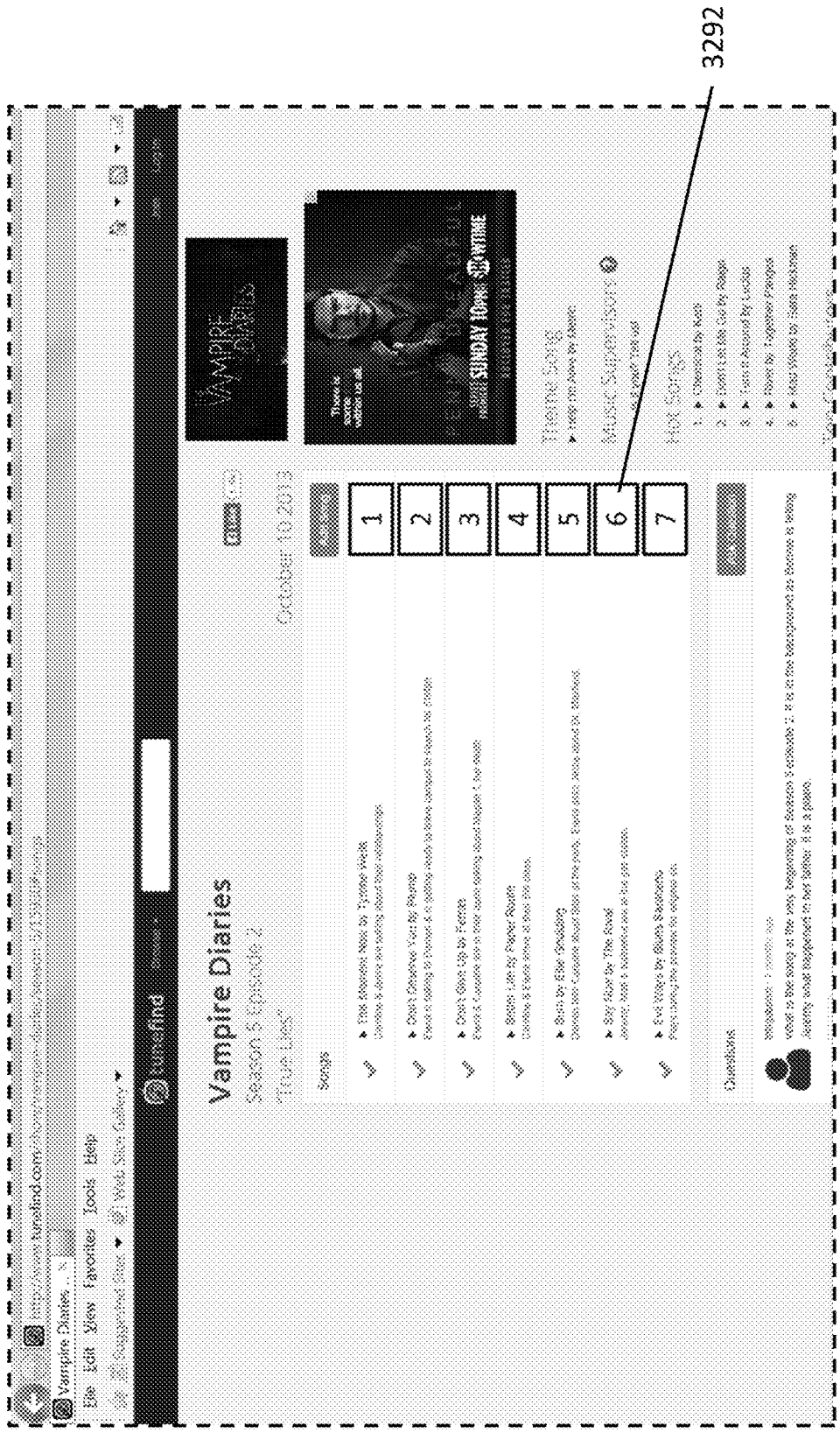
Figure 32F:

FIGS. 32A-F are exemplary screen shots of user interfaces for accessing video clip representations corresponding to audio works contained in a video work in accordance with exemplary embodiments of the present invention. In embodiments, a third party music identification system, such as TuneFind may provide video clip information, such as identifications of songs in episodes of TV shows. A video clip platform computer system may obtain such video clip information to update media work data and/or media work correlation data. The video clip platform computer system can also interface with the music identification system to provide video clip access to users of the music identification system. FIG. 32A shows an interface from which a user can select a video work for finding songs contained in the video work. The interface may include categorized graphical elements, e.g., from a TV show category. A user may select an element associated with a particular TV show to access available video clips related to the TV show, e.g., containing songs that were in the TV show soundtrack for one or more episodes. In embodiments, the interface may show recently updated collections, such as a TV show for which a new episode aired and for which video clips are available. FIG. 32B shows an interface identifying a series of related video works that have corresponding audio works. For example, the video works may be episodes of a television show, e.g., from a particular season. The interface may indicate a number of video clips available for each episode and/or a number of audio works contained within each episode. A user may navigate the menu to select a specific video clip for playback. FIG. 32C shows an interface listing audio works that were featured in a specific video work, such as a particular episode of a TV show. In embodiments, an audio work may be selected to retrieve the associated video clip excerpt from the video work. The interface can include an advertisement, a list of frequently tagged songs, and/or comments related to the video work. FIG. 32D shows a selected audio work and the action icons available once an audio work is selected. Action icons include options to play and/or purchase the song. Other options can include playing the video clip, which may be accessed from the video clip platform computer system. FIG. 32E shows an interface displaying audio works that were featured in a specific video work. Indicator 3292 is an icon that enables the user to open a video clip that contains the audio work. FIG. 32F shows that a selection of an audio work or a video clip via a music identification interface (e.g., a first web site) can access a video clip platform interface (e.g., a second website) to display video clip representations to the user.

Figure 33:
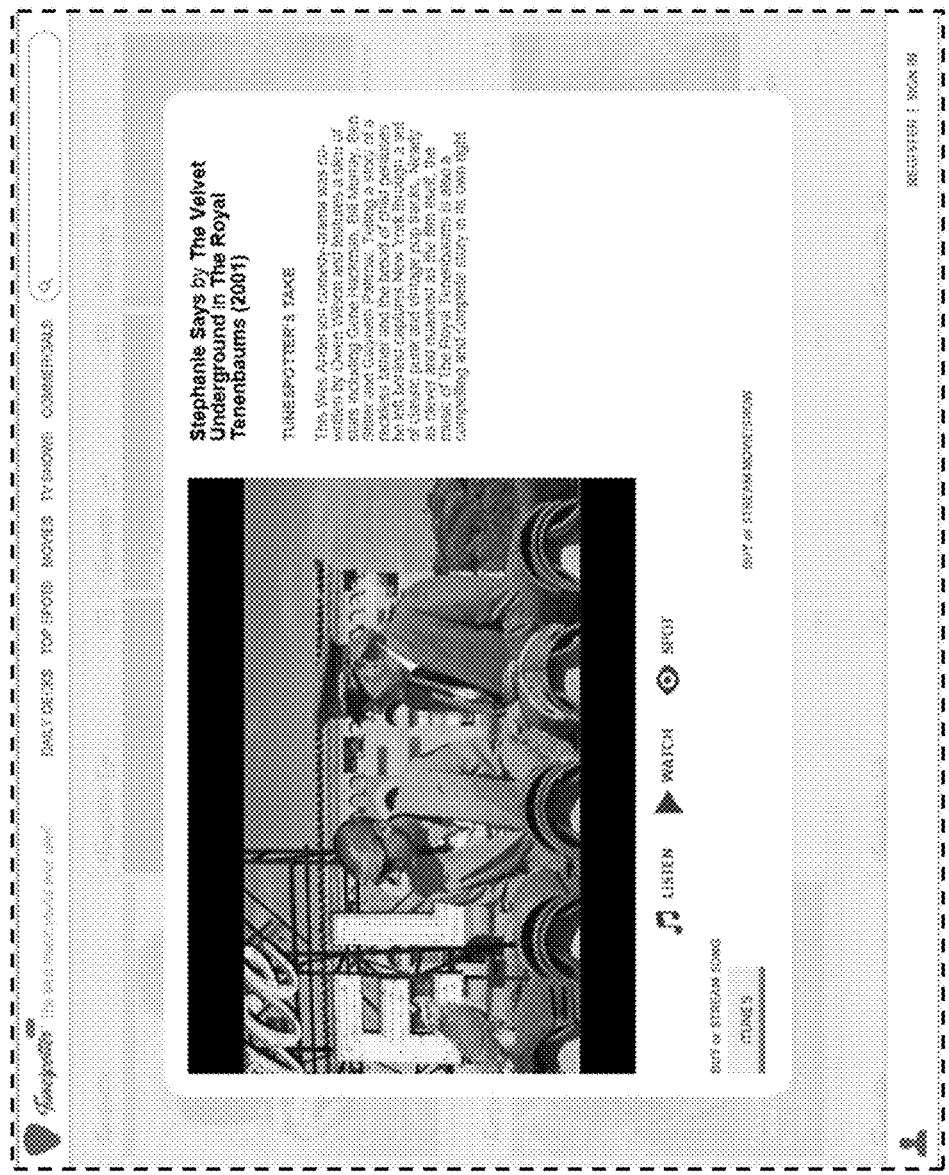
FIG. 33 is an exemplary screen shot of a user interface for viewing a version of a video clip representation in accordance with exemplary embodiments of the present invention.

FIG. 33 is an exemplary screen shot of a user interface for viewing a version of a video clip representation in accordance with exemplary embodiments of the present invention. FIG. 33 illustrates an exemplary video clip player. It also shows a description of the video clip.

Figure 34:
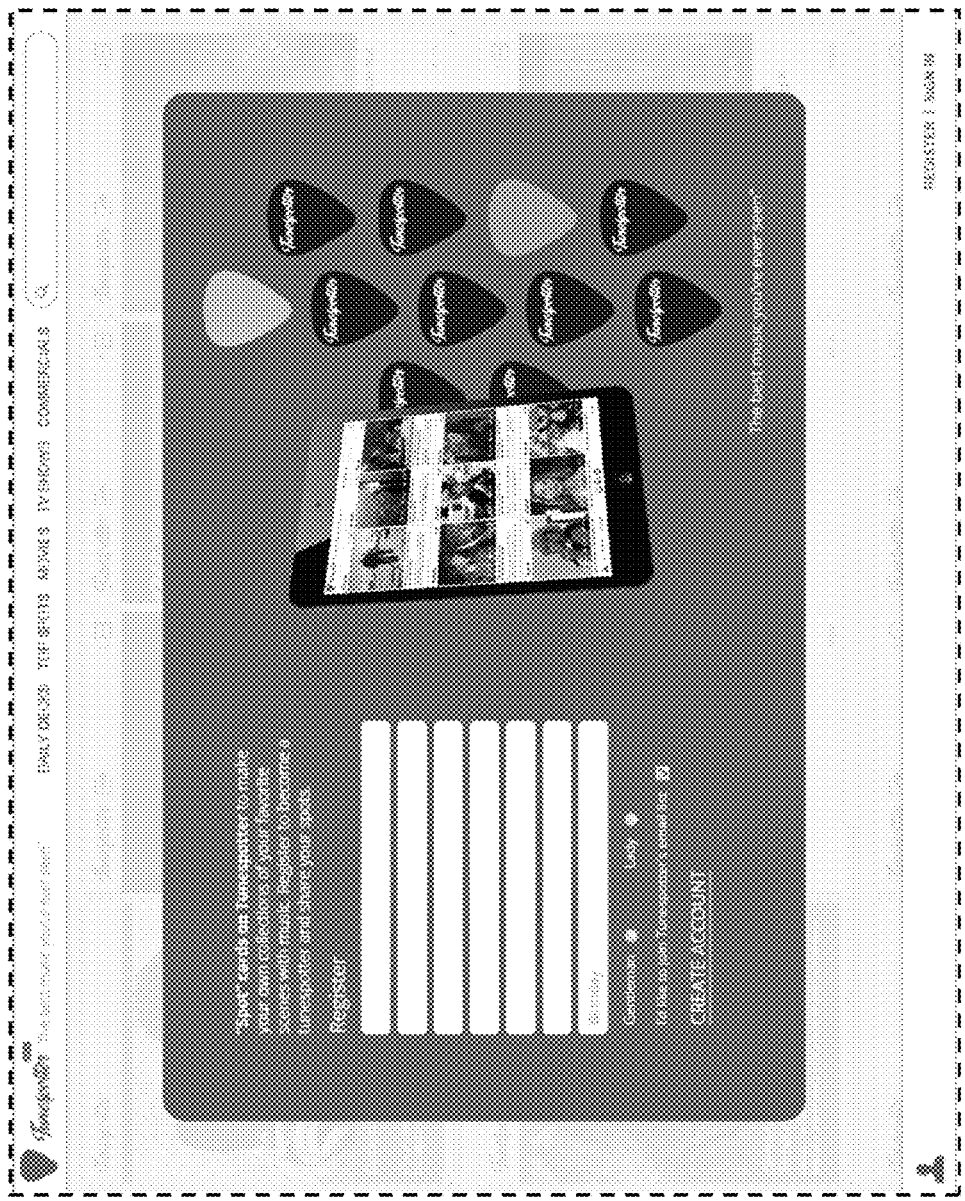
FIG. 34 is an exemplary screen shot of a user interface for creating an account to access services from a video clip platform in accordance with exemplary embodiments of the present invention.

FIG. 34 is an exemplary screen shot of a user interface for creating an account to access services from a video clip platform in accordance with exemplary embodiments of the present invention. It shows a screen in which the user can create an account. It includes various input elements (e.g., text boxes, check boxes) for the user to enter user account information.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method comprising:
   (a) accessing, by a video clip platform computer system, comprising one or more computers, a first database of audio work metadata corresponding to one or more audio works;
   (b) accessing, by the video clip platform computer system, a second database of video work metadata corresponding to one or more video works comprising synchronized video content and audio content, wherein the first and second databases are stored on non-transitory computer-readable memory;
   (c) determining, using the video clip platform computer system, location information for locations within the one or more video works wherein the audio content corresponds to a presence of the one or more audio works;
   wherein determining location information, for a first video work of the one or more video works, comprises:
   (i) accessing, by the video clip platform computer system, the first video work comprising synchronized video content and audio content;
   (ii) determining, by the video clip platform computer system, video feature information from the first video work;
   (iii) determining, by the video clip platform computer system, audio feature information from the first video work;
   (iv) generating, by the video clip platform computer system, segment bookmarks for the start and stop positions of one or more segments in the first video work to be extracted based on the video feature information and the audio feature information; and
   (v) extracting, by the video clip platform computer system, at least one video clip from the first video work based on the segment bookmarks;
   (d) obtaining, by the video clip platform computer system, video clip data identifying one or more video clips, including the at least one video clip, corresponding to portions of the one or more video works at the locations corresponding to the presence of the one or more audio works;
   (e) generating, by the video clip platform computer system, correlation data correlating the video clip data to the one or more audio works based at least in part upon the determined location information;
   (f) storing, by the video clip platform computer system, the correlation data at one or more correlation databases stored on non-transitory computer-readable memory and associated with the video clip platform computer system.

2. The method of claim 1, further comprising:
   (g) accessing, by the video clip platform computer system, user information associated with a specific user; and
   (h) generating, by the video clip platform computer system, a list of user-specific recommendations for video clips to be watched based on the user information.

3. The method of claim 2, wherein the user information that is accessed comprises at least one of user preferences, user settings, or user profile information.

4. The method of claim 1, wherein step (c) further comprises:
   (vi) generating, by the video clip platform computer system, an electronic identifier for each of the one or more segments in the first video work.

5. The method of claim 1, wherein the segment bookmarks generated by the video clip platform computer system are user-adjustable.

6. The method of claim 1, wherein the audio feature information and the video feature information are correlated for the first video work.

7. The method of claim 1, wherein the video feature information comprises video location data comprising start and/or end locations of at least one of scene changes, color changes, black screens, and/or fades within the first video work.

8. The method of claim 1, wherein the step of determining video feature information comprises
   (I) identifying, by the video clip platform computer system, a presence of text in a first portion of the first video work;
   (II) extracting, by the video clip platform computer system, the text in the first portion of the first video work;
   (III) correlating, by the video clip platform computer system, the text to fields in the second database of video work metadata; and
   (IV) storing, by the video clip platform computer system, the text in the second database.

9. The method of claim 1, wherein the audio feature information comprises audio location data comprising start and/or end locations of at least one of the one audio works, locations of periods of silence, variations in decibel level, pitch, or rhythm within the first video work.

10. The method of claim 1, further comprising:
    (g) obtaining, by the video clip platform computer system, a video clip representation to be associated with the one or more video clips to be stored with the correlation data at the one or more correlation databases.

11. The method of claim 1, wherein the step of obtaining the one or more video clips comprises extracting a video portion from one of the one or more video works or accessing the one or more video clips from a video clips database stored on non-transitory computer-readable memory.

12. The method of claim 1, wherein at least one of the one or more audio works corresponds to a plurality of video clips.

13. The method of claim 1, further comprising verifying, by the video clip platform computer system, that each of the one or more audio works is authorized for correlation to one or more corresponding video clips.

14. The method of claim 1, further comprising the step of determining, by the video clip platform computer system, that each of the one or more video clips comprises a respective audio work pursuant to a valid sync license.

15. The method of claim 1, wherein the one or more video clips comprise portion of at least one of a movie, a television show, a commercial, or a video game.

* * * * *